United States Patent
Ohshima

(10) Patent No.: US 11,132,789 B2
(45) Date of Patent: Sep. 28, 2021

(54) CALCULATION SYSTEM, CALCULATION METHOD, PROGRAM, AND TARGET

(71) Applicant: NIKON-TRIMBLE CO., LTD., Tokyo (JP)

(72) Inventor: Yuichi Ohshima, Kawasaki (JP)

(73) Assignee: NIKON-TRIMBLE CO., LTD., Tokyo (JP)

( * ) Notice: Subject to any disclaimer, the term of this patent is extended or adjusted under 35 U.S.C. 154(b) by 23 days.

(21) Appl. No.: 16/620,775

(22) PCT Filed: Jun. 14, 2017

(86) PCT No.: PCT/JP2017/022024
§ 371 (c)(1),
(2) Date: Dec. 9, 2019

(87) PCT Pub. No.: WO2018/229917
PCT Pub. Date: Dec. 20, 2018

(65) Prior Publication Data
US 2020/0175666 A1 Jun. 4, 2020

(51) Int. Cl.
*G06T 7/70* (2017.01)
*G06T 7/00* (2017.01)
*G06T 7/60* (2017.01)

(52) U.S. Cl.
CPC ............... *G06T 7/001* (2013.01); *G06T 7/60* (2013.01); *G06T 7/70* (2017.01); *G06T 2207/10004* (2013.01)

(58) Field of Classification Search
CPC .. G06T 7/001; G06T 7/70; G06T 7/60; G06T 2207/10004; G06T 2207/30132;
(Continued)

(56) References Cited

U.S. PATENT DOCUMENTS 5,074,480 A * 12/1991 Aeppli ................ B65H 63/003
242/486.3
7,408,569 B1 * 8/2008 Yamaguchi ............ G03B 27/73
348/125
(Continued)

FOREIGN PATENT DOCUMENTS

JP 200018921 A 1/2000
JP 2001280960 A 10/2001
(Continued)

OTHER PUBLICATIONS

Office Action dated Dec. 1, 2020 for Japanese Patent Application No. 2019-524643, including English ranslation (6 pages).
(Continued)

*Primary Examiner* — Sheela C Chawan
(74) *Attorney, Agent, or Firm* — Brandon V. Zuniga; James R. Gourley; Carstens & Cahoon, LLP

(57) ABSTRACT

A target including a reference object of a known size is prepared. The reference object from target image data, which is generated by photographing the target using a survey instrument, is detected through image processing to calculate first size data on dimensions of the reference object. A defect from external appearance image data, which is generated by photographing an external appearance of a structure using the survey instrument, is detected through image processing to calculate defect data on dimensions of the defect. The first size data is compared with second size data on actual dimensions of the reference object to calculate correction data, which is used to correct the defect data.

17 Claims, 25 Drawing Sheets

(58) Field of Classification Search
CPC . G06T 2207/30204; G06T 7/62; G01C 25/00; G01C 11/04; G01C 15/002; G01N 2021/8887; G01B 11/02
USPC ........ 382/100, 141, 145, 149; 702/1, 33, 35; 714/699, 710, 711
See application file for complete search history.

(56) References Cited

U.S. PATENT DOCUMENTS

| | | | | |
|---|---|---|---|---|
| 8,873,837 | B2* | 10/2014 | Jahanshahi | G06K 9/00624 382/155 |
| 2005/0207621 | A1 | 9/2005 | Murai | |
| 2009/0154789 | A1* | 6/2009 | Wolfe | G01N 21/90 382/141 |
| 2014/0132965 | A1* | 5/2014 | Chang | G01B 11/02 356/634 |
| 2015/0214000 | A1* | 7/2015 | Hirai | H01J 37/222 382/141 |
| 2015/0332452 | A1* | 11/2015 | Tsuchiya | G06T 7/0008 382/147 |

FOREIGN PATENT DOCUMENTS

| | | |
|---|---|---|
| JP | 2003065959 A | 3/2003 |
| JP | 2004163292 A | 6/2004 |
| JP | 2009053126 A | 3/2009 |
| JP | 2015172498 A | 10/2015 |

OTHER PUBLICATIONS

Office Action dated Jul. 7, 2020 for Japanese Patent Application No. 2019-524643, including English translation (7 pages).

English translation of International Preliminary Report on Patentability for International Application No. PCT/JP2017/022024 dated Dec. 17, 2019 (7 pages).

J. Valenca et al: "Automatic crack monitoring using photogrammetry and image processing", Measurement, Aug. 7, 2012 (Aug. 7, 2012), pp. 433-441, XP055690794, Retrieved from the Internet: URL:https://www.sciencedirect.com/science/article/pii/S0263224112002941[retrieved on Apr. 30, 2020] (10 pages).

Partial Supplementary European Search Report for Application No. EP17913998.5 dated Dec. 22, 2020 (15 pages).

* cited by examiner

CALCULATION SYSTEM, CALCULATION METHOD, PROGRAM, AND TARGET

TECHNICAL FIELD

The present invention relates to a calculation system, a calculation method, a program, and a target for detecting a defect from external appearance image data captured by a survey instrument and correcting defect data on the detected defect.

BACKGROUND ART

Patent Document 1 describes an apparatus that detects minute cracks in the external appearance of a concrete structure by photographing the cracks with a super-telephoto camera provided in a survey instrument, and by performing image analysis on the captured images.

PRIOR ART DOCUMENT

Patent Document

Patent Document 1: Japanese Laid-Open Patent Publication No. 2009-53126

SUMMARY OF THE INVENTION

In accordance with one aspect of the present invention, a calculation system is provided that includes a first calculation portion, a second calculation portion, and a correction data calculation portion. The first calculation portion is configured to detect, through image processing, a reference object, which has a known size, from target image data, which is generated by photographing a target including the reference object using a survey instrument, to calculate first size data on dimensions of the reference object. The second calculation portion is configured to detect, through image processing, a defect from external appearance image data, which is generated by photographing an external appearance of a structure using the survey instrument, to calculate defect data on dimensions of the defect. The correction data calculation portion is configured to compare the first size data with second size data on actual dimensions of the reference object to calculate correction data, which is used to correct the defect data.

In accordance with another aspect of the present invention, a calculation method is provided that includes: preparing a target including a reference object of a known size; detecting, through image processing, the reference object from target image data, which is generated by photographing the target using a survey instrument, to calculate first size data on dimensions of the reference object; detecting, through image processing, a defect from external appearance image data, which is generated by photographing an external appearance of a structure using the survey instrument, to calculate defect data on dimensions of the defect; and comparing the first size data with second size data on actual dimensions of the reference object to calculate correction data, which is used to correct the defect data.

In accordance with another aspect of the present invention, a program is provided that includes: a step of detecting, through image processing, a reference object, which has a known size, from target image data, which is generated by photographing a target including the reference object using a survey instrument, to calculate first size data on dimensions of the reference object; a step of detecting, through image processing, a defect from external appearance image data, which is generated by photographing an external appearance of a structure using the survey instrument, to calculate defect data on dimensions of the defect; and a step of comparing the first size data with second size data on actual dimensions of the reference object to calculate correction data, which is used to correct the defect data.

In accordance with another aspect of the present invention, a target is provided that is configured to be photographed by a survey instrument. The target includes: a region including a short-distance reference object that is configured to be detected by the survey instrument when the target is at a first distance from the survey instrument; and a region including a long-distance reference object that is configured to be detected by the survey instrument when the target is at a second distance, from the survey instrument, the second distance being longer than the first distance.

MODES FOR CARRYING OUT THE INVENTION

A defect calculation system is now described that can detect a defect in the external appearance of a structure and correct data on the detected defect.

Figure 1A:
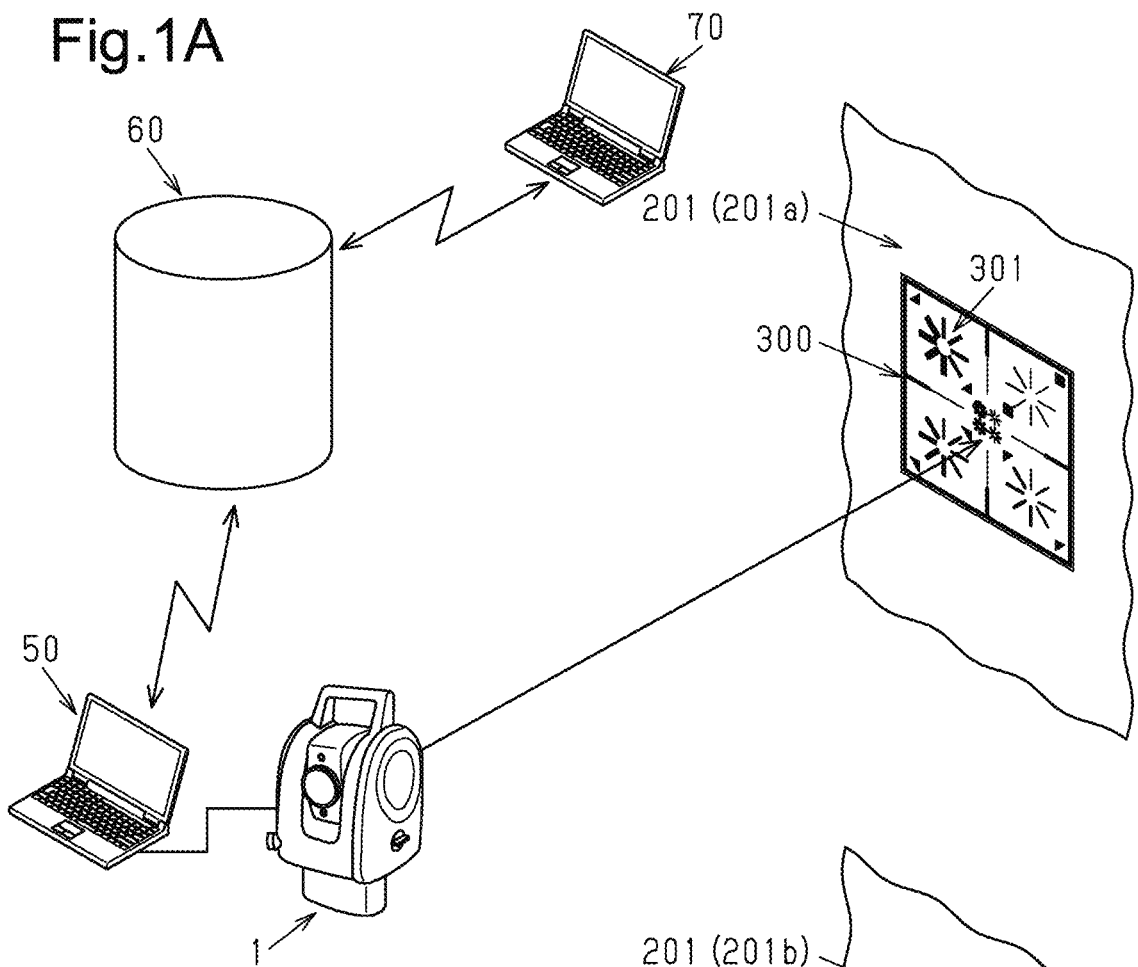
FIGS. 1A and 1B are diagrams showing configurations of a calculation system.

As shown in FIG. 1A, the defect calculation system includes a survey instrument 1, a controller 50, a server unit 60, and an information processing terminal device 70. In one example, the survey instrument 1 is an instrument for surveying an object of survey and measures the angles and distance to the object of survey. In one example, the survey instrument 1 is an instrument in which an electro-optical distance measuring instrument, which measures distances, and a theodolite, which measures angles, are combined. In one example, the survey instrument 1 simultaneously measures the angles and the distance to the object of survey. In one example, the survey instrument 1 is a total station.

When a prism method is used, the object of survey may be a first target, which is a reflection prism, such as a prism, a mirror, or a reflector sheet. The object of survey may also be referred to as a measurement mark or an object.

In one example, the survey instrument 1 uses a non-prism method, which does not use a reflection prism, such as a prism, a mirror, or a reflector sheet. In the non-prism method, the object of survey is directly irradiated with distance measuring light such as laser, and the reflected light that is reflected back from the measurement plane of the object of survey is detected to measure the distance to the measurement plane. The non-prism method may be used for an object of survey that is a wall surface 201 of a structure, such as a bridge, a dam, a building, a tunnel, a steel frame, a road, a train, an airplane, a power transmission line, or an ancient tomb. When the survey instrument 1 is driven by a motor to change its vertical and horizontal angles and to be sighted on the sighting object by an autofocus function, the user does not have to access the site and can perform survey from a distant position, once the survey instrument 1 is set in the site. In one example, the survey instrument 1 includes a photographing device, such as a camera, and photographs a wall surface 201 on which a measurement plane of the structure is set as the object of survey. In one example, an image of the wall surface 201 is an external appearance image of the structure. The survey instrument 1 outputs the position data of the photographed wall surface 201, which is the measurement plane, and the captured external appearance image data.

The survey instrument 1 receives power from a power source. Examples of the power source include a power source that is embedded in the survey instrument 1, a power source that is detachable from the survey instrument 1, and an external power source that supplies power to the survey instrument 1 from the outside. Other examples of the power source include rechargeable batteries, such as nickel-hydrogen batteries and lithium-ion batteries, grid power, and a power generator.

In one example, the controller 50 is a general-purpose information processing device, such as a computer or a tablet. In one example, the controller 50 is connected to the survey instrument 1 by wire (e.g., connection cable) or wirelessly. The controller 50 has software installed. In one example, the controller 50 is the controller of the survey instrument 1. The controller 50 outputs instructions to the survey instrument 1 to photograph the external appearance of a structure and controls the operation of the survey instrument 1. In one example, the controller 50 rotates the survey instrument 1 about the vertical axis and the horizontal axis and controls the survey instrument 1 to photograph the external appearance of a structure.

In one example, the controller 50 is a defect detection device. In one example, the controller 50 has a defect detection program installed to detect a defect of a structure from an image. The controller 50 executes the defect detection program to control the survey instrument 1 and to detect a defect of a structure from external appearance image data. When external appearance image data and the position data of the observation point in the external appearance image data are input from the survey instrument 1, the controller 50 detects a defect in the external appearance of the structure from the external appearance image data. In one example, a defect may be a crack or a depression in the external appearance of a structure caused by deterioration. In one example, a defect may be rust, fracture, or depression in the surface of a steel member. The controller 50 serves as a calculation portion that detects a defect of a structure from external appearance image data and calculates defect data on the defect by referring to the position data. The defect data includes position data indicating the position of the defect, and defect length data and defect width data, which relate to the dimensions of the defect. In one example, the defect data is preferably coordinate data according to a global coordinate system (a coordinate system other than a local coordinate system, world geodetic system, and Japan geodetic system). In one example, the controller 50 uploads and saves external appearance image data and defect data in the server unit 60 connected to a network.

In one example, the controller 50 serves as a correction portion that corrects defect width data. Factors such as slight variation in the photographic portion, such as variation in the telescope magnification, and the measurement environment, such the measurement distance, lighting condition, and the weather, may affect the defect detection accuracy of the survey instrument 1. Since a defect may be rust, a fracture, or a depression in the external appearance of the structure caused by deterioration, the defect tends to be shaded when in the sun, providing greater contrast. When the defect is in the shade, the contrast tends to be smaller between the shaded section of the defect and the area around the defect. Further, when the region including the defect is wet, the contrast tends to be smaller than when the region is dry. As described above, when a defect is detected using contrast, the value of contrast affects the accuracy in calculation of the length and width of the defect depending on the measurement environment.

For this reason, the controller 50 detects a correction target 300 from image data captured by the survey instrument 1 and calculates first line width data, which is first size data of reference objects 301 in the correction target 300. The reference object of the correction target 300 has known second line width data, which is second size data of the actual line width of the reference object. The controller 50 functions as a calculation portion that compares the first line width data with the second line width data, and calculates correction data for correcting defect data. Further, the controller 50 functions as a correction portion that applies correction data to defect data and corrects the defect width data in the defect data. The defect data that is actually calculated is thus corrected with consideration given to the influence of the measurement environment.

The server unit 60 can be accessed from the controller 50 and the information processing terminal device 70, which differs from the controller 50, via a network. For example, the server unit 60 includes a storage portion, which may be a large-capacity hard disk. The storage portion stores external appearance image data and defect data, which are sent from the controller 50 and associated with survey instrument identification data, which is uniquely allocated to each survey instrument 1. The server unit 60 can also function as a correction portion that corrects defect width data in the same manner as the controller 50. The server unit 60 can also function as a calculation portion that compares the first line width data with the second line width data, calculates correction data for correcting defect width data, and saves the correction data in the storage portion. Further, the controller 50 can function as a correction portion that applies correction data to defect width data and saves the correct defect width data in the storage portion. In addition to the controller 50 and the server unit 60, the information processing terminal device 70 may perform the process of calculating correction data and the process of correcting defect width data using correction data. In one example, the controller 50 and the information processing terminal device 70 operate the server unit 60 to perform the process of calculating first line width data and the process of correcting defect width data using correction data.

Further, the function of the controller 50 and the server unit 60 may be performed by the survey instrument 1. That is, the survey instrument 1 may correlate external appearance image data and defect data with the survey instrument identification data of the survey instrument 1, and saves these data in the integral storage portion or a removable storage media connected to the survey instrument 1. The survey instrument 1 may compare the first line width data with the second line width data, calculate correction data for correcting defect width data, and save the correction data in the integral storage portion or a removable storage media connected to the survey instrument 1. Further, the survey instrument 1 may apply correction data to defect width data and save the corrected defect width data in the integral storage portion or a removable storage media connected to the survey instrument 1.

The information processing terminal device 70 is a general-purpose information processing device, such as a computer or a tablet, and can access the server unit 60 via a network. In one example, the information processing terminal device 70 is set not at a position near the structure where defect detection is performed but at a position distant from the structure, such as a supervision facility. The information processing terminal device 70 may be operated by a supervisor. By accessing the server unit 60, the information processing terminal device 70 allows for checking of the external appearance image data and the defect data including the defect width data sent from the controller 50. Further, the information processing terminal device 70 can perform the process of applying correction data to defect width data. In one example, the information processing terminal device 70 functions as a calculation portion that calculates correction data, and also functions as a correction portion that corrects defect width data.

A correction target 300 may be set on a wall surface 201. In one example, when it is impossible to set the correction target 300 on a wall surface 201 that is the actual measurement plane on which defect detection is performed, the correction target 300 may be set on an equivalent wall surface 201a, which is similar to the actual measurement area on which defect detection is performed. In one example, the equivalent wall surface 201a is a wall surface located at a different place away from the actual measurement area. In one example, the equivalent wall surface 201a is a wall surface in an experiment facility or a research facility. In one example, the equivalent wall surface 201a is located in the structure on which defect measurement is performed but is separated from the measurement area.

Figure 1B:
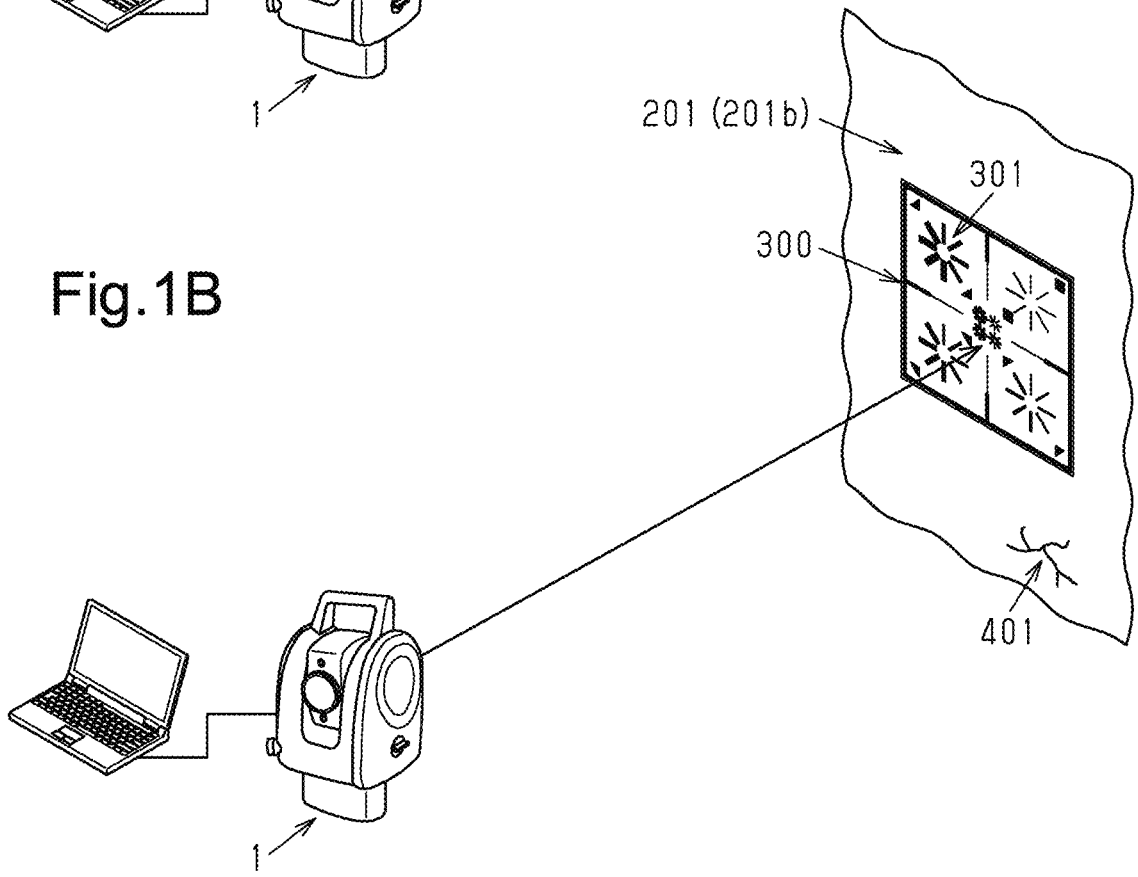

As shown in FIG. 1B, in one example, the correction target 300 is set on the actual wall surface 201b on which detection of a defect 401 is performed. In one example, the correction target 300 is placed in the measurement area. In one example, the correction target 300 is set so as to be within the same angle of view as the defect 401. In one example, the correction target 300 is set so as to extend over multiple external appearance images adjacent to each other. In one example, the correction target 300 is set so as to be included in one or more external appearance images including the defect 401.

[Concept and Configuration of Correction Target]

Figure 2A:
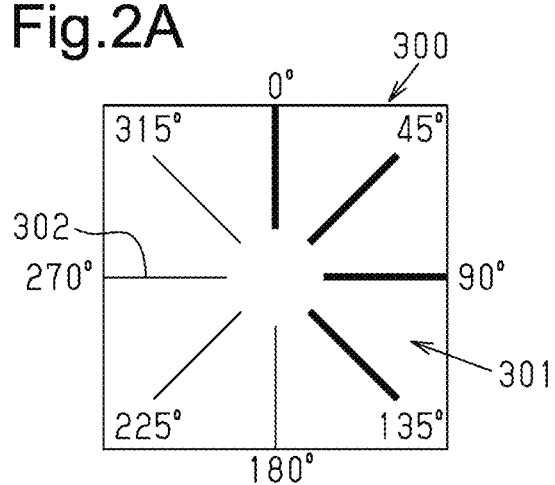
FIG. 2A is a diagram showing a reference object in which line segment objects are arranged radially.
Figure 2B:
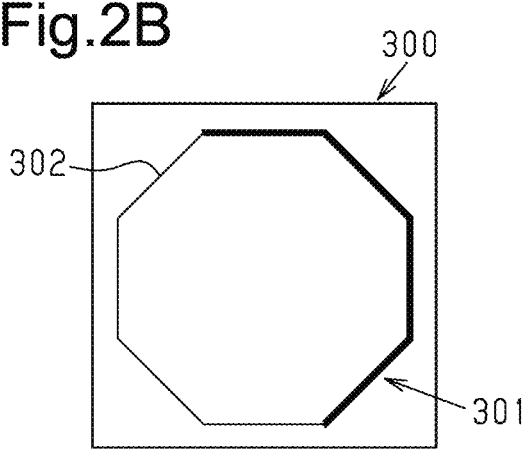
FIG. 2B is a diagram showing a reference object in which line segment objects are arranged in an octagonal shape.

As shown in FIGS. 2A and 2B, a correction target 300 includes a reference object 301. The reference object 301 includes a plurality of line segment objects 302. In one example, the line segment objects 302 are arranged in vertical, lateral, and diagonal directions in consideration of factors such as the dimensions of an actual defect to be detected and the direction in which the defect extends.

FIG. 2A shows line segment objects 302 including line segments extending in various directions. In one example, the line segment objects 302 are arranged radially at equal angular intervals. In one example, the line segment objects 302 include eight line segments extending at an angle of 0°, 45°, 90°, 135°, 180°, 225°, 270° and 315°. The number of line segments is not limited to eight. The line segments do not have to be arranged radially or at equal angular intervals.

FIG. 2B shows line segment objects 302 including eight line segments arranged in a regular octagonal shape. The line segment objects 302 may have the shape of other polygons, such as a triangle, a quadrangle, a pentagon, or a regular hexagon.

The line segment objects 302 shown in FIGS. 2A and 2B may include line segments having different line widths. This allows for calculation of the line widths of line segments having different line widths and extending in different directions. Details of line segment objects 302 having different line widths will be described below referring to FIGS. 4A and 4B.

Figure 3:
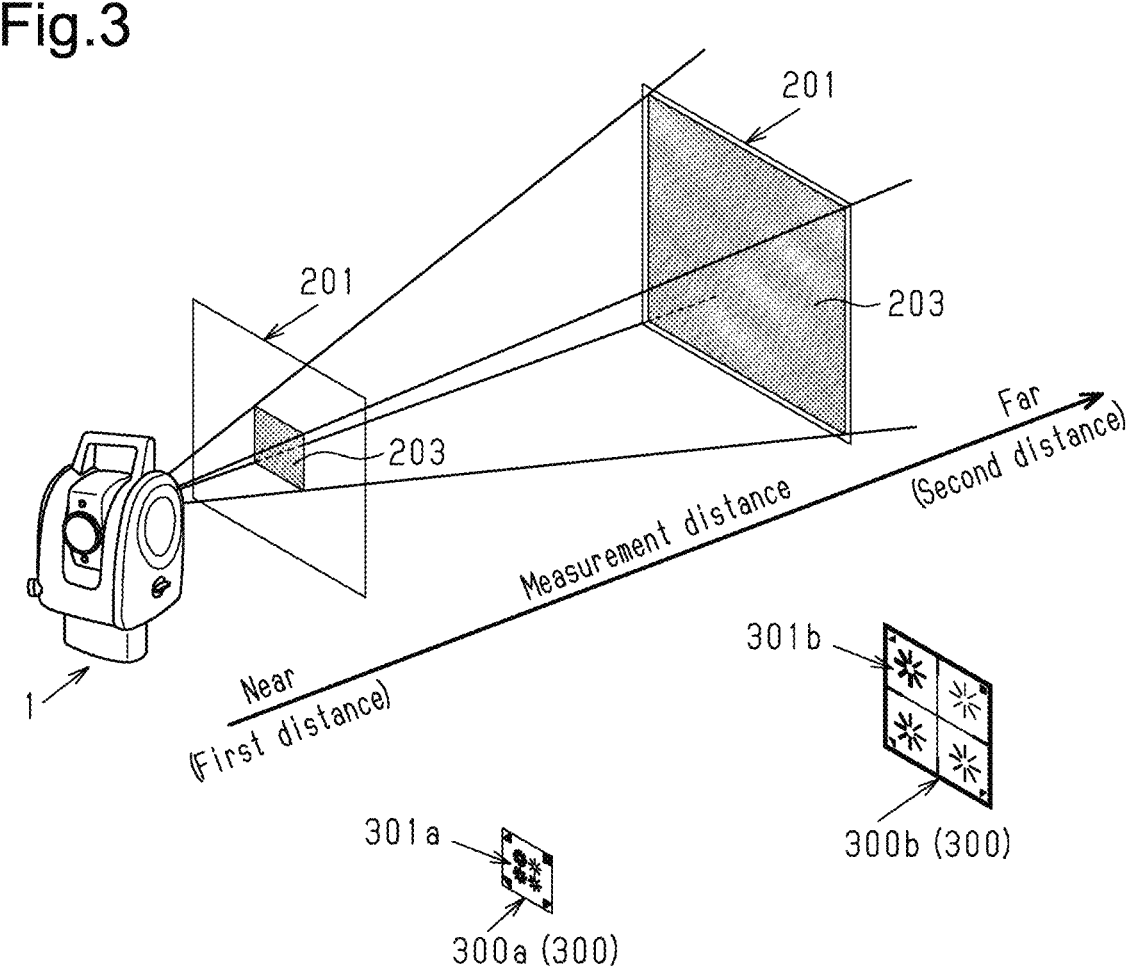
FIG. 3 is a diagram for illustrating a correction target that is at a first distance from a survey instrument and a correction target that is at a second distance from the survey instrument.

FIG. 3 shows an example in which the survey instrument 1 performs measurement on a wall surface 201 that is located at a relatively short distance to the survey instrument 1 (a first distance, which may be several meters). In this case, the image area 203 of the photographic portion is small, and a correction target is required that has a size corresponding to the small image area 203. For this reason, a short-distance correction target 300a is used that includes short-distance reference objects 301a sized to be within the angle of view when an image is captured at a short distance.

In contrast, when the wall surface 201 is located at a relatively long distance to the survey instrument 1 (a second distance, which may be several tens of meters), the image area 203 of the photographic portion is large, and a correction target is required that has a size corresponding to the large image area. For this reason, a long-distance correction target 300b is used that includes long-distance reference objects 301b, which are larger than the short-distance reference objects 301a. This allows for calculation of correction data for long and short distances from the survey instrument 1.

As a correction target 300, a middle-distance target may also be prepared. Further, the short-distance reference objects 301a and the long-distance reference objects 301b may be combined on one target. In this case, the use of the single type of correction target 300 facilitates handling by operators and also reduces the manufacturing cost.

In one example, the short-distance reference objects 301a are smaller than the long-distance reference objects 301b. However, the short-distance reference objects 301a may be larger than the long-distance reference objects 301b.

Figure 4A:
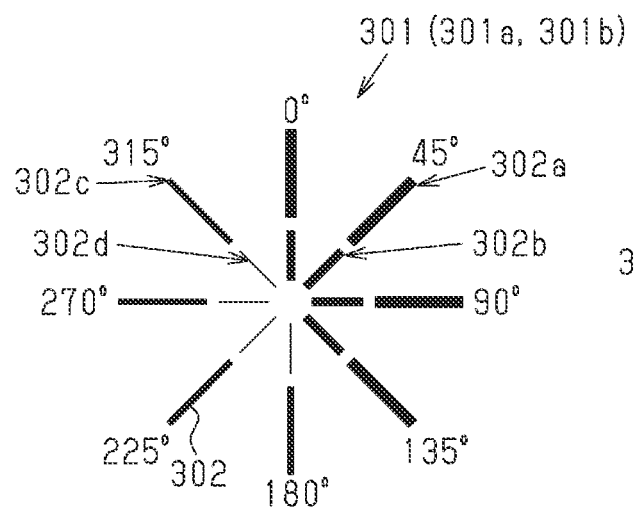
FIG. 4A is a diagram showing a reference object in which line segment objects having different line widths are radially arranged.

As shown in FIG. 4A, in one example, line segment objects 302 of a reference object 301 are a plurality of line segments having different line widths. A plurality of line segments having different line widths may be used for a short-distance reference object 301a and a long-distance reference object 301b. The line segment objects 302 of FIG. 4A are arranged radially. Each of the line segment objects 302 at 0°, 45°, 90° and 135° has a first line width section 302a and a second line width section 302b. The first line width section 302a has a larger line width than the second line width section 302b. Each of the line segment objects 302 at 180°, 225°, 270° and 315° has a third line width section 302c and a fourth line width section 302d. The third line width section 302c has a larger line width than the fourth line width section 302d. In one example, the first line width section 302a is largest in line width, followed by the second line width section 302b, the third line width section 302c, and the fourth line width section 302d. Alternatively, the first line width section 302a may be smallest in line width, followed by the second line width section 302b, the third line width section 302c, and the fourth line width section 302d. That is, the first to fourth line width sections 302a to 302d may have any line widths as long as they have mutually different line widths.

Figure 4B:
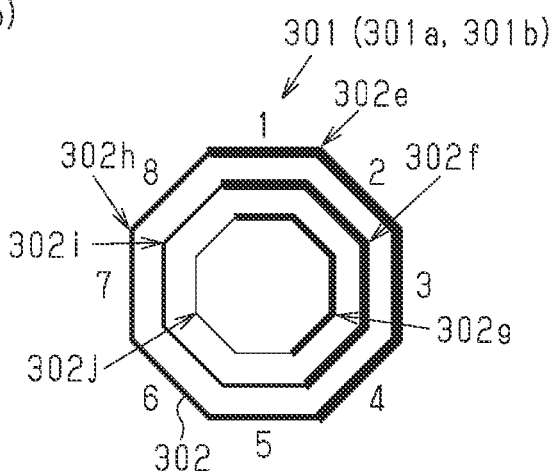
FIG. 4B is a diagram showing a reference object in which line segment objects having different line widths are arranged in octagons.

FIG. 4B shows line segment objects 302 that are arranged in regular octagons. The line segment objects 302 form a plurality of (three in this example) concentric regular octagonal objects of different sizes. The first to fourth sides of the outermost regular octagonal object are formed by first line width sections 302e, which have the same line width but differ in angle. The first to fourth sides of the middle regular octagonal object are formed by second line width sections 302f, which have a smaller line width than the first line width sections 302e. The first to fourth sides of the innermost regular octagonal object are formed by third line width sections 302g, which have a smaller line width than the first and second line width sections 302e and 302f. The fifth to eighth sides of the outermost regular octagonal object are formed by fourth line width sections 302h, which have a smaller line width than the first to third line width sections 302e to 302g. The fifth to eighth sides of the middle regular octagonal object are formed by fifth line width sections 302i, which have a smaller line width than the first to fourth line width sections 302a to 302h. The fifth to eighth sides of the innermost regular octagonal object are formed by sixth line width sections 302j, which have a smaller line width than the first to fifth line width sections 302a to 302i. In one example, the first line width section 302e is largest in line width, followed by the second line width section 302f, the third line width section 302g, the fourth line width section 302h, the fifth line width section 302i, and the sixth line width section 302j. As such, the defect width data of eight different directions can be corrected for each of the sixth types of line widths. Alternatively, the first line width section 302e may be smallest in line width, followed by the second line width section 302f, the third line width section 302g, the fourth line width section 302h, the fifth line width section 302i, and the sixth line width section 302j. That is, the first to sixth line width sections 302e to 302j may have any line widths as long as they have mutually different line widths.

Figure 5A:
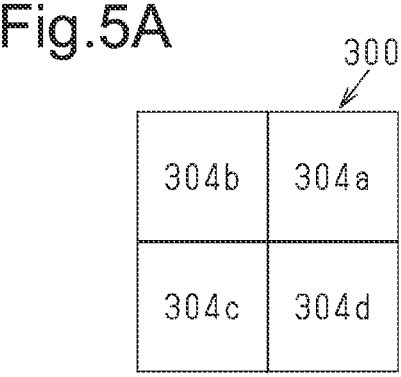
FIGS. 5A to 5D are diagrams each showing a correction target divided into a plurality of regions.

A correction target 300 may be divided into a plurality of regions. FIG. 5A shows a correction target 300 having a square outline shape. The correction target 300 has first to fourth regions 304a to 304d divided by median lines extending from vertical and lateral sides. The reference object 301 shown in FIG. 4A or 4B is set in each of the first to fourth regions 304a to 304d, and the correction targets 300 in the regions differ from one another in line widths of the line segment objects 302. Accordingly, line segment objects 302 of 16 types of line widths are set when the reference object 301 of FIG. 4A is used, and the line segment objects 302 of 24 types of line widths are set when the line segment objects of FIG. 4B are used.

Figure 5B:
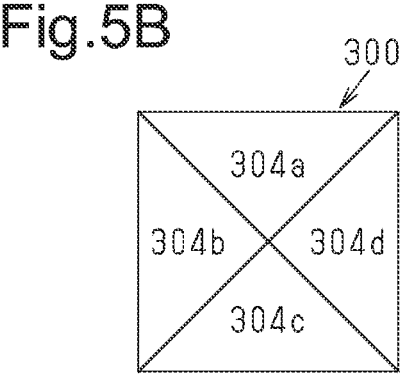

FIG. 5B shows a correction target that has a square outline shape and is divided into first to fourth regions 304a to 304d by two diagonal lines. In this example, the reference object 301 shown in FIG. 4A or 4B is also set in each of the first to fourth regions 304a to 304d, and the reference objects 301 in the regions differ from one another in line widths of the line segment objects 302. This example thus has the same advantage as the example of FIG. 5A.

Figure 5C:
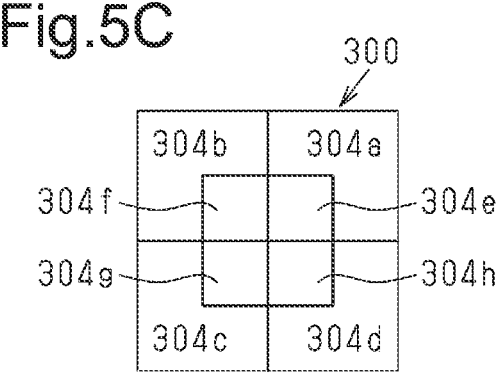

FIG. 5C shows an example in which a square frame is added to the example of FIG. 5A, thereby setting additional fifth to eighth regions 304e to 304h. The square frame is concentric with the outline shape. The fifth to eighth regions 304e to 304h are smaller than the first to fourth regions 304a to 304d. The fifth to eighth regions 304e to 304h thus accommodate smaller reference objects 301. In one example, a short-distance reference object 301a, which is small, is placed in the fifth to eighth regions 304e to 304h. In one example, a long-distance reference object 301b, which is larger than a short-distance reference object 301a, is placed in the first to fourth regions 304a to 304d.

Figure 5D:
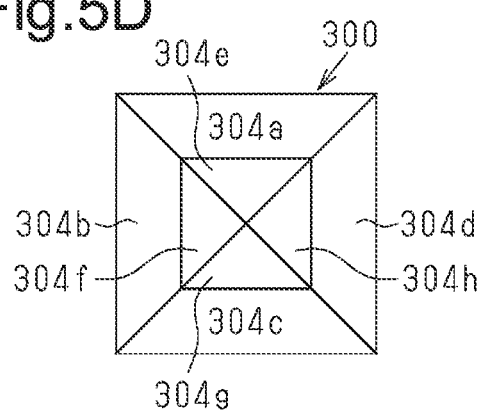

FIG. 5D shows an example in which a square frame is added to the example of FIG. 5B, thereby setting additional fifth to eighth regions 304e to 304h. The square frame is concentric with the outline shape. The fifth to eighth regions 304e to 304h of FIG. 5D are also smaller than the first to eighth regions. As such, a short-distance reference object 301a is placed in the fifth to eighth regions 304e to 304h, while a long-distance reference object 301b is placed in the first to fourth regions 304a to 304d.

When one correction target 300 includes short-distance reference objects 301a and long-distance reference objects 301b, the correction target 300 may be divided into a plurality of regions in a manner different from the examples shown in FIGS. 5A to 5D. In one example, a correction target 300 may be divided into upper and lower regions. One of the upper and lower regions may include a short-distance reference object 301a, and the other may include a long-distance reference object 301b. In one example, a correction target 300 may be divided into right and left regions. One of the right and left regions may include a short-distance reference object 301a, and the other may include a long-distance reference object 301b.

In some cases, a correction target 300 placed on a wall surface 201 does not directly face the survey instrument 1. In other words, the correction target 300 may be inclined with respect to a plane perpendicular to the collimation axis O3 of the survey instrument 1. In one example, when the wall surface 201 is inclined with respect to the survey instrument 1 in a horizontal direction or in a vertical direction, the correction target 300 is inclined with respect to the survey instrument 1. Further, even when the correction target 300 is fixed to the wall surface 201 in a correct manner, the survey instrument 1 may be inclined with respect to the wall surface 201 in a horizontal or vertical direction due to the setting conditions, such as an unevenness or inclination of the surface on which the survey instrument 1 is set. When the correction target 300 does not directly face the survey instrument 1, a rearward object in image data (e.g., an actual vertical straight line object 306a on the right side in FIG. 6B) has a shorter length than a frontward object in the image data (e.g., an actual vertical straight line object 306a on the left side in FIG. 6B). In addition, the rearward object has a smaller line width than the frontward object. For this reason, in one example, a correction target 300 includes an inclination detection object, which enables detection of any inclination of the correction target 300 with respect to the survey instrument 1. The inclination detection object is formed by at least one actual straight line or an imaginary straight line. In one example, the controller 50 detects the inclination detection object through image processing from the image data captured by the survey instrument 1, and detects an inclination of the inclination detection object to detect an inclination of the correction target with respect to the survey instrument 1. The controller 50 calculates the lengths and the line widths of line segment objects 302 according to the inclination of the correction target.

Figure 6A:
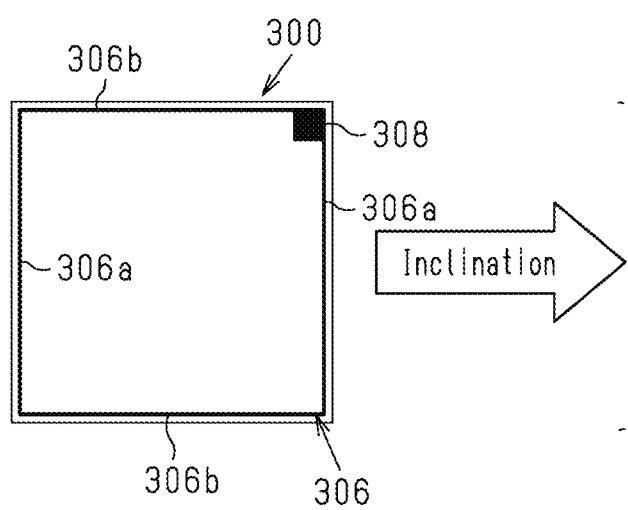
FIG. 6A is a diagram showing a correction target including an inclination detection object positioned along the periphery.

As shown in FIG. 6A, in one example, a correction target 300 includes an inclination detection object 306, which allows the line widths of the line segment objects 302 to be measured referring to any inclination of the correction target 300 in vertical and horizontal directions. The inclination detection object 306 is formed by an actual line extending along the periphery. In FIG. 6A, the correction target 300 has a rectangular shape, and the inclination detection object 306 is arranged along the periphery of the correction target 300. The inclination detection object 306 includes two actual vertical straight line objects 306a extending in the vertical direction parallel to each other and two actual lateral straight line objects 306b extending in the lateral direction parallel to each other. In one example, when image data captured by the survey instrument 1 is input, the controller 50 detects any inclination of the two actual vertical straight line objects 306a and the two actual lateral straight line objects 306b through image processing.

Figure 6B:
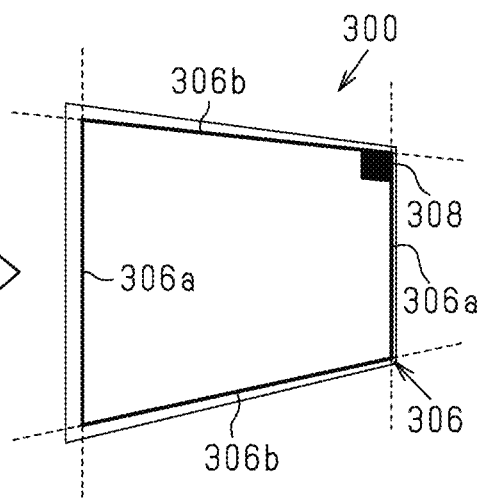
FIG. 6B is a diagram showing a state in which the correction target is inclined with respect to the survey instrument.

FIG. 6B shows a state in which the correction target 300 is inclined with respect to the survey instrument 1 in a horizontal direction. In this state, the correction target 300 may be inclined with respect to a plane perpendicular to the collimation axis O3 of the survey instrument 1. When the correction target 300 set on the wall surface 201 does not directly face the survey instrument 1 and is inclined with respect to the survey instrument 1, the actual lateral straight line object 306b on the upper side as viewed in FIG. 6B is inclined downward with respect to the horizontal direction of the image data, whereas the actual lateral straight line object 306b on the lower side as viewed in FIG. 6B is inclined upward with respect to the horizontal direction of the image data. Further, the actual vertical straight line object 306a on the right side as viewed in FIG. 6B is shorter in length than the actual vertical straight line object 306a on the left side. When image data captured by the survey instrument 1 is input, the controller 50 detects any inclination of two imaginary vertical straight line objects 307a and two imaginary lateral straight line objects 307*b* through image processing. The controller 50 thus detects an inclination of the correction target 300 with respect to the survey instrument 1. The controller 50 may calculate the line widths of the frontward reference objects 301 and the rearward reference objects 301 taking the inclination into account. Additionally, in one example, the inclination of the correction target 300 with respect to the survey instrument 1 is also taken into account in the calculation of the lengths of the frontward reference objects 301 and the rearward reference objects 301.

When the correction target 300 is inclined with respect to the survey instrument 1 in a vertical direction, the two actual vertical straight line objects 306*a* are inclined such that their upper or lower ends are closer to each other and the other ends are farther from each other. In addition, the actual lateral straight line object 306*b* corresponding to the closer ends of the two actual vertical straight line objects 306*a* is shorter in length than the actual lateral straight line object 306*b* corresponding to the farther ends of the actual vertical straight line objects 306*a*. When image data captured by the survey instrument 1 is input, the controller 50 detects any inclination of the two imaginary vertical straight line objects 307*a* and the two imaginary lateral straight line objects 307*b* through image processing. The controller 50 thus detects an inclination of the correction target 300 with respect to the survey instrument 1. The controller 50 may calculate the line widths of the frontward reference objects 301 and the rearward reference objects 301 taking the inclination into account. Additionally, in one example, the inclination of the correction target 300 with respect to the survey instrument 1 is also taken into account in the calculation of the lengths of the frontward reference objects 301 and the rearward reference objects 301.

Figure 6C:
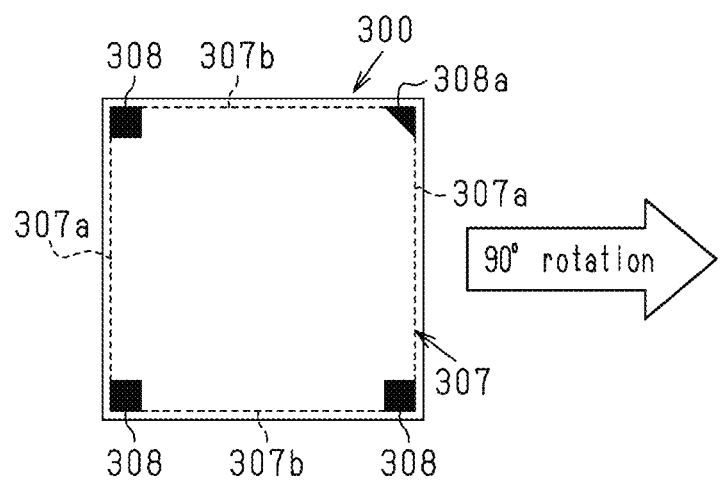
FIG. 6C is a diagram showing a configuration in which an inclination detection object is formed by imaginary straight lines.

As shown in FIG. 6C, graphic objects 308 may be set at the corners, and an imaginary inclination detection object 307 connecting the adjacent graphic objects 308 may be calculated. The imaginary inclination detection object 307 includes two imaginary vertical straight line objects 307*a* extending in the vertical direction parallel to each and two imaginary lateral straight line objects 307*b* extending in the lateral direction parallel to each other. When image data captured by the survey instrument 1 is input, the controller 50 detects any inclination of the two imaginary vertical straight line objects 307*a* and the two imaginary lateral straight line objects 307*b* through image processing.

In addition to the controller 50, the inclination detection of the inclination detection object 306 and the imaginary inclination detection object 307 may be performed by the survey instrument 1 or the server unit 60 based on the image data captured by the survey instrument 1.

Figure 6D:
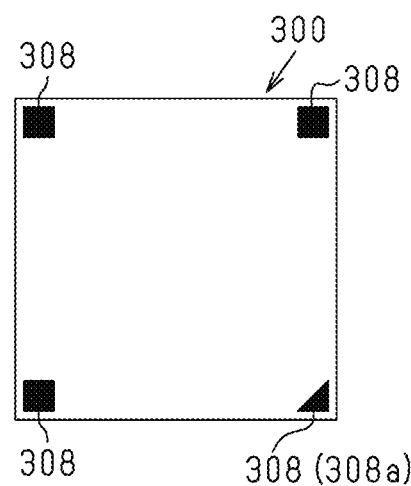
FIG. 6D is a diagram showing a state in which the correction target of FIG. 6C is rotated 90°.

In addition to the graphic objects 308 (e.g., quadrangular objects), the correction target 300 may include a variant object 308*a* (e.g., a triangular object), which differs from the graphic objects 308 in shape. As shown in FIGS. 6C and 6D, in one example, when the correction target 300 is rotated on the wall surface 201, the position of the variant object 308*a* changes. In other words, the position of the variant object 308*a* changes when the correction target 300 is rotated about the collimation axis O3 of the survey instrument 1 in a plane perpendicular to the collimation axis O3 of the survey instrument 1. When image data captured by the survey instrument 1 is input, the controller 50 thus detects the rotation of the correction target 300 on the wall surface 201 through image processing.

Specifically, when the correction target 300 has a flat planar shape and is rotated about the collimation axis O3 of the survey instrument 1 in the plane including the first surface of the correction target 300 that directly faces the survey instrument 1 (in the plane perpendicular to the collimation axis O3 of the survey instrument 1), the position of the variant object 308*a* is different from that in the non-rotated state. In one example, the state shown in FIG. 6C is a normal state in which the correction target 300 is not rotated (the rotation amount is 0°). In this normal state, the quadrangular graphic objects 308 are located at the upper left, lower left, and lower right, and the triangular variant object 308*a* is located at the upper right. As shown in FIG. 6D, when the correction target 300 is rotated 90° clockwise about the collimation axis O3 of the survey instrument 1, the quadrangular graphic objects 308 are located at the upper left, lower left, and upper right. The triangular variant object 308*a* is located at the lower right. The controller 50 stores the position of the variant object 308*a* in the normal state shown in FIG. 6C in the memory, and detects any change in the position of the variant object 308*a* to calculate the amount of rotation of the correction target 300 from the normal state. That is, the controller 50 stores in the memory the position of the variant object 308*a* at the upper right in the normal state. When the variant object 308*a* is positioned at the lower right, the controller 50 detects the rotation state in which the correction target 300 is rotated 90° clockwise. In one example, the controller 50 may detect rotation states of 0°, 90°, 180°, and 270° in 90° increments. In one example, the controller 50 may detect rotation states of 0°, 45°, 90°, 135°, 180°, 225°, 270°, and 315° in smaller increments of 45°. Further, the controller 50 may define rotation states using further smaller increments for detection of the rotation state of the correction target 300.

The controller 50 may store in the memory the arrangement pattern of the graphic objects 308 and the variant object 308*a* in the normal state shown in FIG. 6C, and detects any change in the arrangement pattern to calculate the amount of rotation of the correction target 300 from the normal state. That is, the controller 50 stores in the memory the arrangement pattern in the normal state shown in FIG. 6C, in which a triangle, a quadrangle, a quadrangle, and a quadrangle are arranged clockwise from the upper right. As shown in FIG. 6D, when the correction target 300 is rotated 90° clockwise, the arrangement pattern changes to a quadrangle, a triangle, a quadrangle, and a quadrangle arranged clockwise from the upper right. The controller 50 may also detect the rotation state of the correction target 300 by detecting this arrangement pattern.

Instead of detecting the rotation state of the correction target 300 using increments of 45° or 90°, the rotation amount (angle) of the variant object 308*a* from the normal state may be calculated to detect the accurate rotation amount.

In addition to the controller 50, the detection of the rotation state of the correction target 300 may be performed by the survey instrument 1 or the server unit 60 based on the image data captured by the survey instrument 1.

In the example shown in FIGS. 6C and 6D, the four graphic objects 308 include three quadrangles and one triangle. Including at least one variant object 308*a* in a plurality of graphic objects 308 allows the controller 50 to identify the type of the correction target 300 from the graphic shape pattern by performing image processing on image data captured by the survey instrument 1. That is, the graphic objects 308 and the variant object 308*a* also function as identification objects indicating the type of the correction target. In one example, the combination pattern of FIG. 6C including three quadrangular graphic objects 308 and one triangular variant object 308a may be set as a short-distance correction target 300a. In one example, this combination pattern may be set as a long-distance correction target 300b. Furthermore, in one example, a correction target 300 may be identified as a target including line segment objects having a large line width and line segment objects having a small line width. The shape of the graphic objects 308 or the variant object 308a is not limited to a quadrangle shape and may be a circular shape or an X shape, for example. The greater the number of graphic types, the more the possible patterns, allowing for setting of a greater number of correction target types. As long as at least one variant object 308a is included in the graphic objects 308, the number of the variant objects 308a may be two or more.

As in the example of FIGS. 6A and 6B, the correction target 300 may include only one graphic object 308 for identification of rotation of the correction target 300 on the wall surface 201 and the type of the correction target 300. In addition, the identification object for identifying the type of the correction target 300 may be a one-dimensional symbol such as a barcode or a two-dimensional symbol such as a QR code (registered trademark). Such a symbol can contain more information than a graphic object 308.

Figure 7:
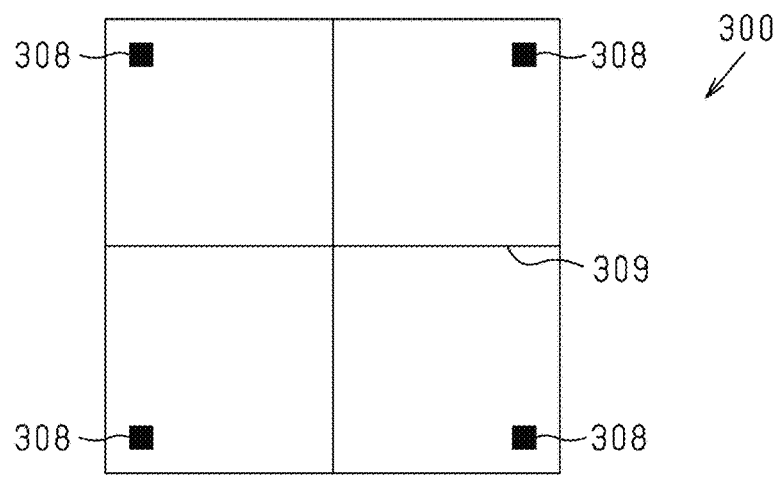
FIG. 7 is a diagram showing a correction target including a center index object.

As shown in FIG. 7, a correction target 300 may include a center index object 309 indicating the center. The center index object 309 is a cross-shaped object including two straight line objects intersecting at the center of the correction target 300. In one example, the center index object 309 allows the survey instrument 1 to be sighted manually by aligning the cross-line center of the reticle of the survey instrument 1 with the intersection of the center index object 309. The center index object 309 may be formed in a cross shape by solid lines or dotted lines. Further, the intersection part in the center or outer end parts may be partially omitted. That is, any pattern shape may be used as long as the center of the center index object 309 can be calculated by performing image processing on the image data captured by the survey instrument 1.

In addition, a graphic object 308 is set in each corner section. In one example, the graphic objects 308 in corner sections are arranged at upper, lower, right, and left target positions. This allows the controller 50 to identify the correction target by detecting the graphic objects 308 from external appearance image data captured by the survey instrument 1. In addition, the configuration allows the survey instrument 1 to be automatically sighted on the intersection of the center index object 309.

FIG. 8 is an example of a correction target 300 in which the elements shown in FIGS. 2A to 7 are combined. The correction target 300 has a square outline and is divided by the center index object 309 into four regions, first to fourth regions 304a to 304d. The first to fourth regions 304a to 304d each include a long-distance reference object 301b. Further, the first to fourth regions 304a to 304d surround a central region 304i including short-distance reference objects 301a. The short-distance reference objects 301a are smaller than the long-distance reference objects 301b. The center index object 309 is not present in the central region 304i. That is, since the central region 304i and the short-distance reference objects 301a are present, the center intersection of the center index object 309 is not displayed. However, the center intersection can be calculated by extending the vertical and horizontal lines of the center index object 309 across the central region 304i, enabling sighting of the survey instrument 1.

The first to fourth regions 304a to 304d each include one long-distance reference object 301b. Each of the long-distance reference objects 301b in the first to fourth regions 304a to 304d includes line segment objects 302 having different line widths.

In the central region 304i, the four short-distance reference objects 301a are arranged in a similar manner as the four long-distance reference objects 301b. That is, the central region 304i includes four regions, the fifth to eighth regions 304e to 304h, and one short-distance reference object 301a is set in each of the fifth to eighth regions 304e to 304h. Each of the short-distance reference objects 301a in the fifth to eighth regions 304e to 304h includes line segment objects 302 having different line widths.

Figure 8A:
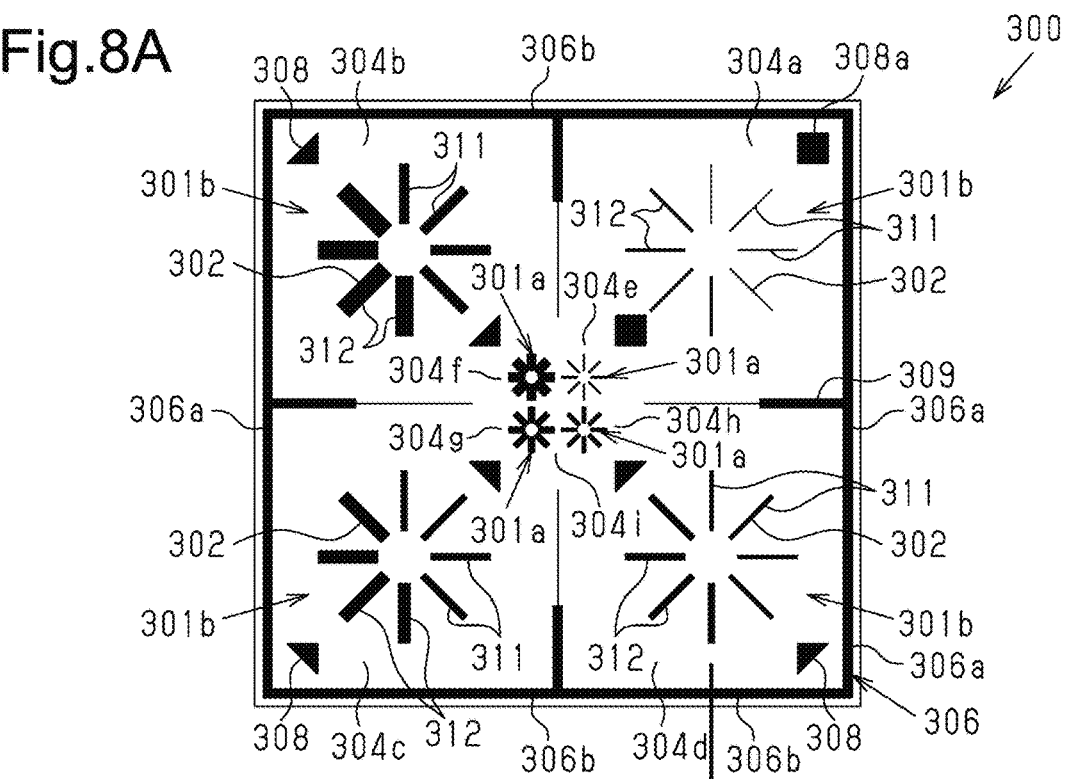
FIG. 8A is a diagram showing a correction target in which the elements shown in FIGS. 2A to 7 are combined.
Figure 8B:
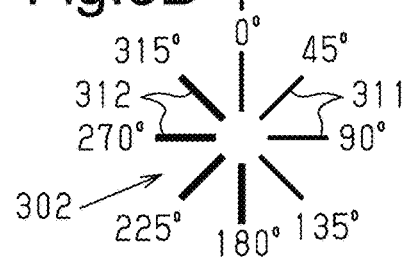
FIG. 8B is a diagram showing a reference object of the correction target shown in FIG. 8A.

As shown in FIG. 8B, the line segment objects 302 in each of the short-distance reference objects 301a and the long-distance reference objects 301b may be arranged radially. The line segment objects 302 at 0°, 45°, 90° and 135° are identical first line width sections 311, and the line segment objects 302 at 180°, 225°, 270° and 315° are second line width sections 312, which have a larger line width than the first line width sections 311. That is, the set of first line width sections 311 and the set of second line sections 312 in each of the four regions differ in line width from the sets in the other regions. In other words, the sets are different from one another.

In one example, in the long-distance reference object 301b in the first region 304a and the short-distance reference object 301a in the fifth region 304e, the first line width sections 311 have a line width of 0.1 mm, and the second line width sections 312 have a line width of 0.2 mm.

In the long-distance reference object 301b in the fourth region 304d and the short-distance reference object 301a in the eighth region 304h, the first line width sections 311 have a line width of 0.3 mm, and the second line width sections 312 has a line width of 0.4 mm.

In the long-distance reference object 301b in the third region 304c and the short-distance reference object 301a in the seventh region 304g, the first line width sections 311 have a line width of 0.5 mm, and the second line width sections 312 have a line width of 0.6 mm.

In the long-distance reference object 301b in the second region 304b and the short-distance reference object 301a in the sixth region 304f, the first line width sections 311 have a line width of 0.7 mm, and the second line width sections 312 have a line width of 0.8 mm.

In another example, in the long-distance reference object 301b in the first region 304a and the short-distance reference object 301a in the fifth region 304e, the first line width sections 311 have a line width of 0.3 mm, and the second line width sections 312 have a line width of 0.5 mm.

In the long-distance reference object 301b in the fourth region 304d and the short-distance reference object 301a in the eighth region 304h, the first line width sections 311 have a line width of 0.7 mm, and the second line width sections 312 have a line width of 0.9 mm.

In the long-distance reference object 301b in the third region 304c and the short-distance reference object 301a in the seventh region 304g, the first line width sections 311 have a line width of 1.2 mm, and the second line width sections 312 have a line width of 1.6 mm.

In the long-distance reference object 301b in the second region 304b and the short-distance reference object 301a in the sixth region 304f, the first line width sections 311 have a line width of 1.2 mm, and the second line width sections 312 have a line width of 2.4 mm.

In the examples described above, the dimensions of the set line widths of the first and second line width sections 311 and 312 are not scaled down. The first and second line width sections 311 and 312 are set so as to actually have the defined dimensions. Further, in the long-distance reference objects 301b and the short-distance reference objects 301a, line width sections that are defined to have the same dimension have the same line width. The setting of the line widths is not limited to the two examples described above.

In the examples described above, each of the long-distance reference objects 301b and the short-distance reference objects 301a in one correction target 300 includes line segment objects 302 of two line widths in each region. There are four regions for the short-distance reference objects 301 and four regions for long-distance reference objects 302b. Thus, the set of the long-distance reference objects 301b and the set of short-distance reference objects 301a in one correction target 300 each include line segment objects 302 of eight different line widths in total. The number of line segment objects 302 having different line widths can be increased by increasing the number of regions for each of the set of long-distance reference objects 301b and the set of short-distance reference objects 301a in one correction target 300. Further, each of the line segments shown in FIG. 8B may be divided into a thicker line segment and a thinner line segment (see FIG. 4A). This further increases the number of line segment objects 302 having different line widths.

The correction target 300 includes an inclination detection object 306 arranged along the periphery. Specifically, the inclination detection object 306 includes two actual vertical straight line objects 306a extending in the vertical direction parallel to each other and two actual lateral straight line objects 306b extending in the lateral direction parallel to each other. The controller 50 detects any inclination of the correction target 300 with respect to the survey instrument 1 by detecting the actual vertical straight line objects 306a and the actual lateral straight line objects 306b and their inclination by performing image processing on image data captured by the survey instrument 1. This allows the controller 50 to calculate the line widths of the line segment objects 302 taking the inclination into account.

Further, the correction target 300 includes graphic objects 308 (triangles at the top left, lower left, and lower right as viewed in FIG. 8) and a variant object 308a (a quadrangle at the upper right as viewed in FIG. 8) in corner sections at the periphery. The graphic objects 308 and the variant object 308a in the corner sections at the periphery of the correction target 300 are set for the long-distance reference objects 301b. When the correction target 300 is rotated in the plane including the first surface of the correction target 300 that directly faces the survey instrument 1 (in the plane perpendicular to the collimation axis O3 of the survey instrument 1), the position of the variant object 308a is different from that in the non-rotated state. The controller 50 stores the positions of the graphic objects 308 and the variant object 308a in the normal state (the state shown in FIG. 8) in the memory, and detects any change in the position of the variant object 308a to calculate the rotation state of the correction target 300 from the normal state.

Further, the arrangement pattern of the three triangular graphic objects 308 and the one quadrangular variant object 308a indicates the type of the correction target 300. This allows the controller 50 to identify the type of the correction target 300 by identifying the arrangement pattern through image processing on the image data captured by the survey instrument 1.

Three triangular graphic objects 308 and one quadrangular variant object 308a are also provided at the periphery of the central region 304i. The graphic objects 308 and the variant object 308a in the central region 304i are set for the short-distance reference objects 301a. When the short-distance reference objects 301a are used, the controller 50 detects any rotation of the correction target 300 from the graphic objects 308 and the variant object 308a in the central region 304i, and also identifies the type of the correction target 300.

The arrangement pattern of the graphic objects 308 and the variant object 308a that are placed at the periphery of the correction target 300 for the long-distance reference objects 301b may differ from the arrangement pattern of the graphic objects 308 and the variant object 308a that are placed in the central region 304i for the short-distance reference objects 301a.

The correction target 300 includes a center index object 309 indicating the center. The center index object 309 is a cross-shaped object including two straight line objects intersecting at the center of the correction target 300. In one example, the center index object 309 allows the survey instrument 1 to be sighted manually by aligning the cross-line center of the reticle of the survey instrument 1 with the intersection of the center index object 309. The center intersection of the center index object 309 is omitted in the central region 304i, but the survey instrument 1 can calculate the intersection by extending the two straight line segment objects to intersect.

The correction target 300 configured as described above may be affixed to a wall surface 201 of a structure and thus has the shape of a flat plate. In one example, the correction target 300 is flexible so as to conform to unevenness of the wall surface 201. In one example, the correction target 300 is affixed to the wall surface 201 by an adhesion member, such as a double-sided tape or an adhesive. In one example, the correction target 300 is made of a magnetic plate so as to be affixed to a metal member such, as a steel H-beam. In one example, the correction target 300 that is used only for a single defect detection operation is affixed to the wall surface 201 only for a short time. When used to inspect change in a defect over time, the correction target 300 may be affixed to the wall surface 201 for a long time (e.g., one year or longer). For this reason, the correction target 300 is preferably made of a material with a low linear expansion coefficient to limit peeling from the wall surface 201. In addition, to limit fading, a material with a high light resistance is preferably used. Examples of materials having these characteristics include polycarbonate resin, polycarbonate resin combined with glass fibers, polyester, polyester combined with glass fibers, acrylic resin, aluminum plate, and stainless steel plate. Further, a magnet sheet may be affixed to a plate made of these materials. The correction target 300 may also be suspended by a support member, for example.

Structures may vary in color. Some structures have exposed concrete, some structures have exterior materials such as tiles, and some structures are coated with paint. The correction target 300 preferably has a surface color that is similar to the surface color of the structure on which defect detection is actually performed. For a structure with exposed concrete, the correction target 300 preferably has a monochrome surface, for example. Structures with tiles or paint vary in color. As such, it may be desirable that the correction target 300 has color. In this case, the same or similar hue as the color of the structure is selected for the background color of the correction target 300, while the reference objects 301 have a color with a different lightness (e.g., a lower lightness). A defect may be shadowed and appear to be darker than the surrounding area. Accordingly, the correction target 300 is formed such that the reference objects 301 have a lower lightness than the background color.

Figure 8C:
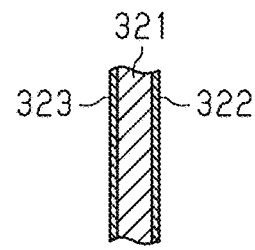
FIG. 8C is a cross-sectional view of the main part of the correction target.

As shown in FIG. 8C, the correction target 300 may be formed by printing an object layer 322 on the first surface of a substrate 321, which faces the survey instrument 1. The object layer 322 includes objects, such as reference objects 301, inclination detection objects 306, graphic objects 308, and variant objects 308a as described above. Alternatively, an original plate having the pattern of this object layer 322 may be used as a mask to form the pattern on the substrate 321 by vapor deposition. A magnet sheet 323 may be affixed to the second surface of the substrate 321, which is opposite to the object layer 322 and faces the wall surface 201.

Instead of the single-sided configuration, in which only one side (the first surface) has the object layer 322, the correction target 300 may have a double-sided configuration, in which both the first and second surfaces have object layers 322. In one example, the magnet sheet 323 is omitted, and the object layer 322 on the second surface is affixed to the substrate 321. Alternatively, the object layer 322 may be affixed to the magnet sheet 323. When the double-sided configuration is used, the two sides may have different types of pattern. In one example, one side may have short-distance reference objects 301a, and the other side may have long-distance reference objects 301b. When correction targets each having a combination of short-distance reference objects 301a and long-distance reference objects 301b as with the example in FIG. 8 are placed on the two sides, one side may differ from the other in the line widths of line segment objects 302 of the reference objects 301. In one example, line segment objects 302 with a large line width are used to detect a relatively thick defect, while line segment objects 302 with a small line width are used to detect a relatively thin defect.

Regardless of the single-sided or double-sided configuration, the correction target 300 may be fixed to the wall surface 201 using an adhesive or a double-sided tape, which may be set on the second surface. Alternatively, the correction target 300 may be fixed to the wall surface 201 by driving anchors into the wall surface 201 at the four corners of the correction target 300. When the wall surface 201 is a magnetically attractable material such as a steel frame, the magnet sheet 323 on the second surface is magnetically attracted to the wall surface 201. Further, a hook may be set on the wall surface 201 so as to suspend the correction target 300. Furthermore, when the correction target 300 is placed at a position near the ground, for example, the correction target 300 may be supported by a support member, such as a tripod, near the wall surface 201, instead of being directly fixed to the wall surface 201. Supporting the correction target 300 on a support member is desirable especially when the correction target 300 is placed in multiple positions at short and long distances to obtain correction data, or when the correction target 300 is placed in a position at a specified measurement distance.

[Structure of Survey Instrument]

Figure 9:
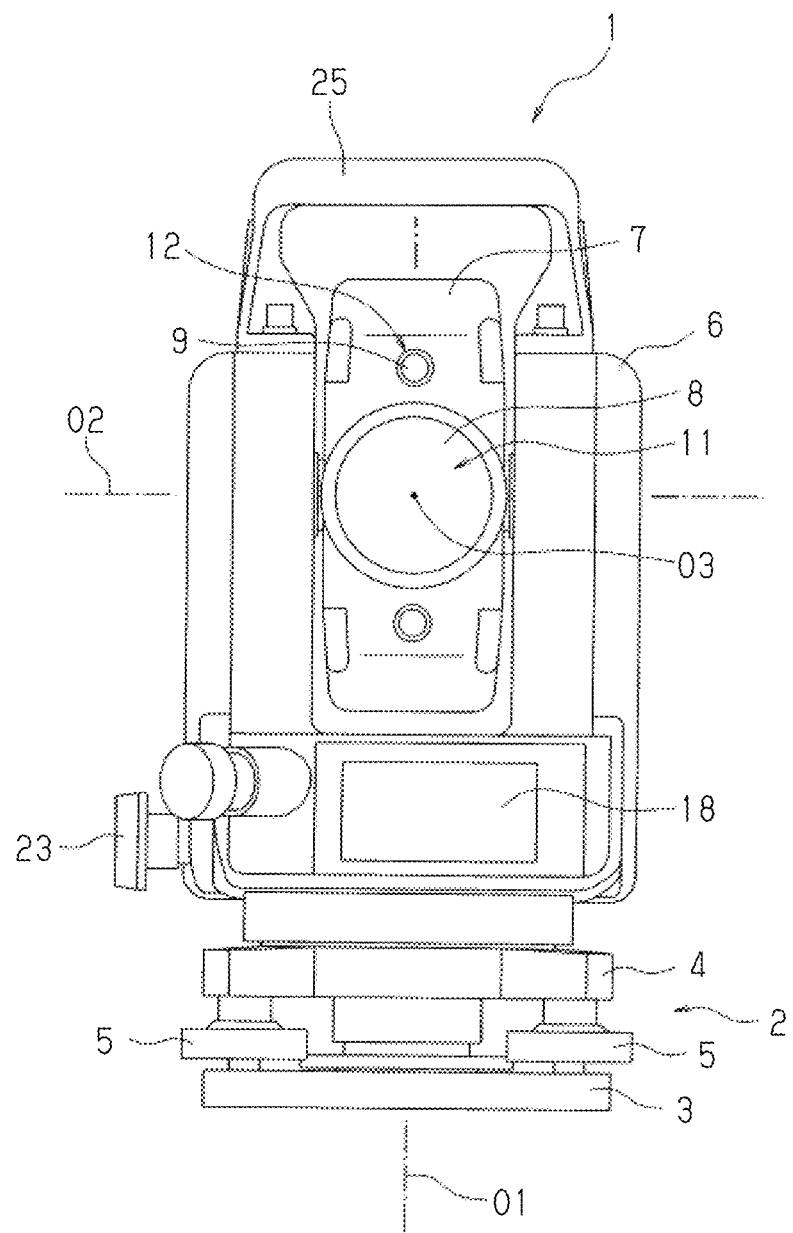
FIG. 9 is a front view of a survey instrument.

As shown in FIG. 9, the survey instrument 1 includes a leveling portion 2, a main body 6, and a photographic portion 7. The leveling portion 2 may be a tribrach. The leveling portion 2 includes a base plate 3, an upper plate 4, and a leveling screw 5. The base plate 3 is to be fixed to a tripod. The base plate 3 may be fixed to the upper end of tripod legs with screws or other fastener. The inclination of the upper plate 4 relative to the base plate 3 is adjustable with the leveling screw 5. The main body 6 is coupled to the upper plate 4. The inclination of the vertical axis O1 of the survey instrument 1, which serves as a first axis, is adjustable with the leveling screw 5.

Leveling refers to aligning the vertical axis of the survey instrument 1 with the vertical direction. The vertical axis O1 of the leveled survey instrument 1 extends in the vertical direction. When the survey instrument 1 is leveled, the vertical axis O1 extends in the vertical direction, and the horizontal axis O2 of the survey instrument 1, which serves as a second axis, is at right angles with the vertical axis O1.

Centering refers to aligning the center vertical line of the survey instrument 1 with the center of a second target (survey marker). Centering refers to aligning the mechanical center of the survey instrument 1 with the vertical line passing through the measurement point, such as a survey reference position (reference point) on the ground. The vertical axis O1 of the centered survey instrument 1 extends through the center of the second target. The vertical axis O1 of the centered survey instrument 1 extends through the center of the second target. The second target may be a target for instrument height measurement or a survey tack.

Figure 10:
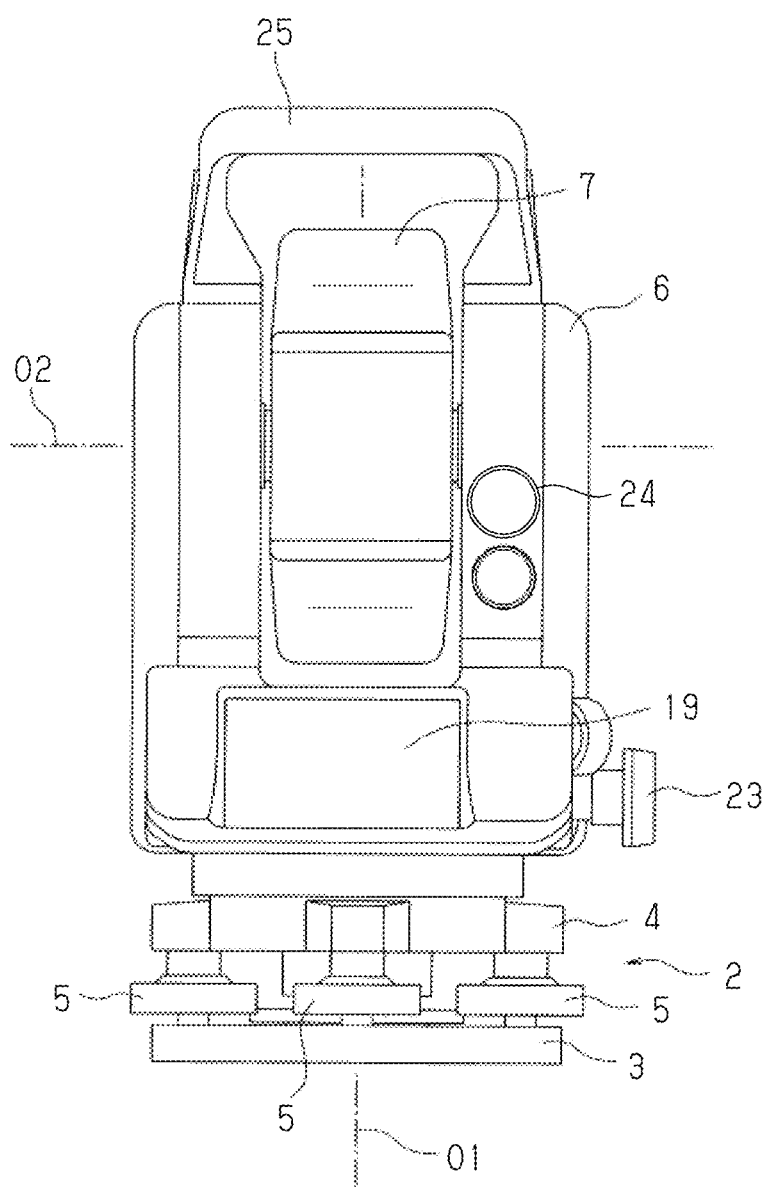
FIG. 10 is a back view of the survey instrument.

As shown in FIGS. 9 and 10, the main body 6 is supported by the leveling portion 2 so as to be rotatable about the vertical axis. The main body 6 is rotatable about the vertical axis relative to the leveling portion 2. The main body 6 is positioned above the leveling portion 2. The photographic portion 7 is supported by the main body 6 so as to be rotatable about the horizontal axis. The main body 6 functions as a support column and a bracket. The main body 6 has a first display portion 18, a second display portion 19, a horizontal-angle operation portion 23, a vertical-angle operation portion 24, a grip portion 25, and a third photographic portion 14 (see FIG. 11).

The first display portion 18 and the second display portion 19 have a display function of displaying images and objects. In one example, each of the first and second display portions 18 and 19 displays on its screen the images that are based on the image data generated by the photographic portion 7 and the information that is based on the observation data. In one example, the first and second display portions 18 and 19 may be liquid crystal displays or organic EL displays. In one example, the first display portion 18 is on the reverse side. In one example, the first display portion 18 is used for reverse observation. The second display portion 19 is on the direct side. In one example, the second display portion 19 is used for direct observation. In one example, the first and second display portions 18 and 19 each function as an operation portion operated by the user. In this case, the first and second display portions 18 and 19 may be capacitive touch panels or pressure-sensitive touch panels. In one example, the first display portion 18 is rotatable about the vertical axis. In one example, the second display portion 19 is rotatable about the vertical axis. In one example, the second display portion 19 can be tilted at different angles in the vertical direction.

The horizontal-angle operation portion 23 is operated by the user to rotate the main body 6 in the horizontal direction. When the user operates the horizontal-angle operation portion 23, the main body 6 and the photographic portion 7 are both rotated in the horizontal direction. The vertical-angle operation portion 24 is operated by the user to rotate the photographic portion 7 in the vertical direction. The horizontal-angle operation portion 23 and the vertical-angle operation portion 24 may be knobs. The grip portion 25 is held by the user to carry the survey instrument 1, for example. The grip portion 25 may be a carrying handle. The grip portion 25 is fixed to the upper surface of the main body 6, for example.

Figure 11:
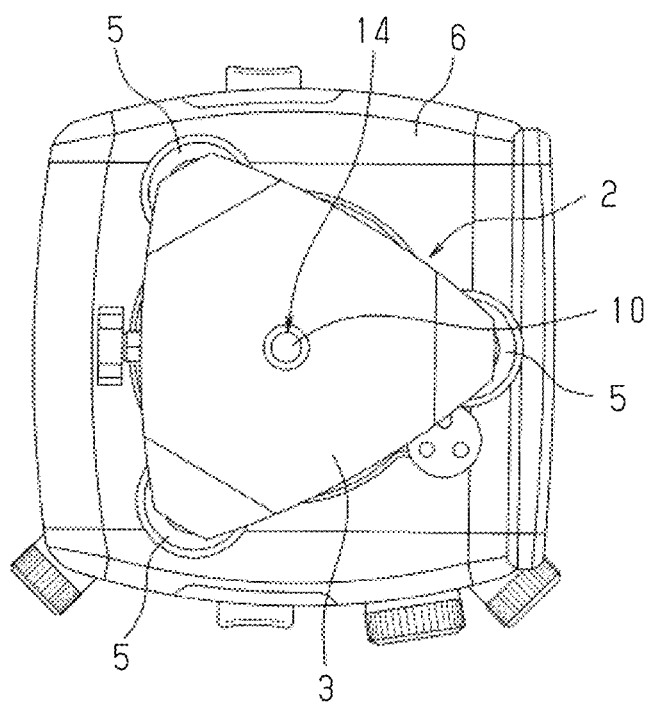
FIG. 11 is a bottom view of the survey instrument.

As shown in FIG. 11, the third photographic portion 14 includes a third optical system, which includes a third objective lens 10, and a third photographic element. The third optical system guides light from the second target to the third photographic element. The third photographic element photographs the second target to generate image data. The third photographic portion 14 photographs the area below the survey instrument 1 to generate image data. The third photographic portion 14 photographs the lower area including the vertical axis O1 to generate image data. The third photographic element may be a CCD or a CMOS. The image data generated by the third photographic portion 14 is output to an image processing portion 33. In one example, the third photographic portion 14 generates image data that is used to display the image of the area below the survey instrument 1 on the first and second display portions 18 and 19 when the user levels and centers the survey instrument 1. The third photographic portion 14 is fixed to the main body 6. In one example, the third photographic portion 14 is a centering camera. In one example, the third photographic portion 14 is a centering telescope.

The photographic portion 7 is supported by the main body 6 so as to be rotatable about the horizontal axis. The photographic portion 7 is rotatable about the horizontal axis O2. The photographic portion 7 is rotatable about the vertical axis O1 relative to the leveling portion 2. The photographic portion 7 is rotatable about the vertical axis O1 and the horizontal axis O2. The photographic portion 7 rotates in the horizontal direction according to the degree the user operates the horizontal-angle operation portion 23. The photographic portion 7 rotates in the vertical direction according to the degree the vertical-angle operation portion 24 is operated by the user.

The photographic portion 7 includes a first photographic portion 11 and a second photographic portion 12. Each of the first and second photographic portions 11 and 12 may be a CCD or a CMOS. The image data generated by the first and second photographic portions 11 and 12 is output to the image processing portion 33. In one example, for sighting, the first and second photographic portions 11 and 12 generate image data to display an image including the first target in the visual field on the first and second display portions 18 and 19. In a prism method, the first and second photographic portions 11 and 12 may photograph the first target, which is a survey object. In a non-prism method, the first and second photographic portions 11 and 12 may measure a measurement plane forming the external appearance of a structure. The visual field captured with the first and second photographic portions 11 and 12 differs from the visual field captured with the third photographic portion 14 and does not overlap with the visual field captured with the third photographic portion 14.

The first photographic portion 11 includes a first optical system, which includes a first objective lens 8, and a first photographic element. The first optical system guides the light in the view field (including the light from the first target, for example) to the first photographic element. The first photographic portion 11 may be a telescope camera. In one example, the first photographic portion 11 is a sighting camera. In one example, the first photographic portion 11 is a sighting telescope. In one example, the first photographic portion 11 has a first angle of view. In one example, the first photographic portion 11 has a first field of view.

The second photographic portion 12 includes a second optical system, which includes a second objective lens 9, and a second photographic element. The second optical system guides the light in the view field (including the light from the first target, for example) to the second photographic element. The second objective lens 9 is provided separately from the first objective lens 8. In one example, the second objective lens 9 is placed in the same plane as the first objective lens 8 in the photographic portion 7. In one example, the second objective lens 9 is placed in line with the first objective lens 8 in the vertical direction. In one example, the optical axis of the second objective lens 9 is parallel to the optical axis of the first objective lens 8. The second photographic portion 12 has a second angle of view, which is wider than the first angle of view of the first photographic portion 11. The first angle of view of the first photographic portion 11 is narrower than the second angle of view of the second photographic portion 12. The second viewing angle of the second photographic portion 12 is wider than the first viewing angle of the first photographic portion 11. The first viewing angle of the first photographic portion 11 is narrower than the second viewing angle of the second photographic portion 12. For sighting, the second photographic portion 12 may generate image data to display an image that includes the first target and has the second field of view, which is wider than the first field of view, on the first and second display portions 18 and 19. In one example, the second photographic portion 12 is a wide-angle camera. In one example, the second photographic portion 12 is a wide-angle telescope.

Sighting refers to aiming the objective lens at the target and aligning the collimation axis with the center of the target. The collimation axis passes through the optical center of the objective lens and intersects with the horizontal axis at right angles. The collimation axis passes through the optical center of the first objective lens 8 of the first photographic portion 11 and intersects with the horizontal axis O2 at right angles. The collimation axis passes through the center of the objective lens of the theodolite and is orthogonal to the horizontal axis. The collimation axis coincides with the optical axis of the first objective lens 8. When the survey instrument 1 is sighted, the first objective lens 8 faces the first target, and the collimation axis O3, which is the third axis of the survey instrument 1, is aligned with the center of the first target. The direction from the inside to the outside of the survey instrument 1 along the collimation axis may be referred to as the sighting direction.

[System Structure of Survey Instrument]

Figure 12:
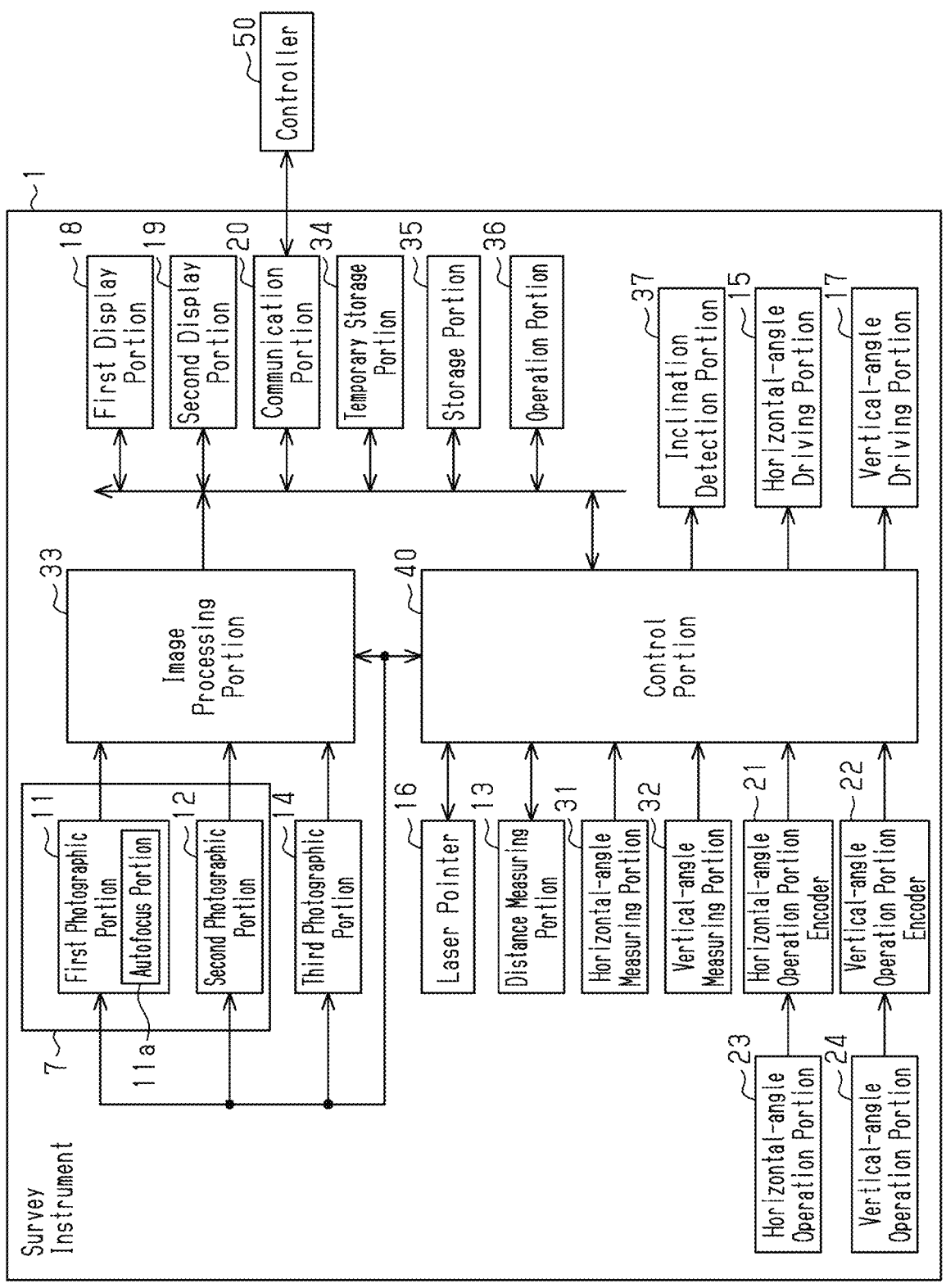
FIG. 12 is a block diagram showing the system structure of a survey instrument.

FIG. 12 is a block diagram showing the system structure of the survey instrument 1.

The survey instrument 1 has a photographic portion 7, which includes first and second photographic portions 11 and 12, and a third photographic portion 14. The survey instrument 1 also includes a distance measuring portion 13, a horizontal-angle driving portion 15, a laser pointer 16, a vertical-angle driving portion 17, a first display portion 18, a second display portion 19, a communication portion 20, a horizontal-angle operation portion encoder 21, a vertical-angle operation portion encoder 22, a horizontal-angle operation portion 23, a vertical-angle operation portion 24, a horizontal-angle measuring portion 31, a vertical-angle measuring portion 32, an image processing portion 33, a temporary storage portion 34, a storage portion 35, an operation portion 36, a control portion 40, and an inclination detection portion 37.

The first and second photographic portions 11 and 12 capture images according to the photographing conditions (e.g., gain and accumulation time (shutter speed)) set by the control portion 40 to generate image data, which are output to the image processing portion 33. The suitable exposure is automatically set by the control portion 40 for the first and second photographic portions 11 and 12 so that the images based on the image data generated by photographing have adequate brightness. The control portion 40 has an automatic exposure function for the first and second photographic portions 11 and 12. The first optical system in the first photographic portion 11 is configured such that the focusing lens driving portion can change the position of the focusing lens along the optical axis according to a focus adjustment command from the control portion 40. The third photographic portion 14 captures images according to the photographing conditions (e.g., gain and accumulation time (shutter speed)) set by the control portion 40 to generate third image data, which is output to the image processing portion 33. The first photographic portion 11 includes an autofocus portion 11a.

The image processing portion 33 performs image processing on the image data output from the first, second, and third photographic portions 11, 12 and 14. The image data processed by the image processing portion 33 is stored in the temporary storage portion 34. For example, in the live view mode, when the first, second, and third photographic portions 11, 12 and 14 capture images successively, the temporary storage portion 34 successively stores the image data pieces that are output.

The temporary storage portion 34 temporarily stores the image data. In one example, the temporary storage portion 34 is volatile memory. In one example, the temporary storage portion 34 is random access memory (RAM).

The image processing portion 33 performs image processing including a process of generating image data for display, a process of generating compressed image data, a process of generating image data for recording, and a process of extracting a part from an image based on the image data and electronically magnifying the part (digital zooming). The control portion 40 displays the image data for display, which is generated by the image processing portion 33, on the first and second display portions 18 and 19.

The survey instrument 1 may include an ocular optical system for sighting and an ocular optical system for centering.

The image data for recording, which is generated by the image processing portion 33, is stored in external memory via the communication portion 20. In one example, the external memory is nonvolatile memory. In one example, the external memory is flash memory, a hard disk, or an optical disk.

The distance measuring portion 13 is a survey portion, which may be an electro-optical distance measuring instrument including a light emitting element, a dichroic mirror, and a light receiving element. In one example, the light emitting element is a laser diode, such as a pulsed laser diode (PLD), or a light emitting diode, such as an infrared light emitting diode. In one example, the distance measuring light emitted from the light emitting element is converted by the dichroic mirror into a light beam coaxial with the first objective lens 8. The distance measuring portion 13 directs this light beam to the first target (e.g., a reflection prism or the measurement plane of a structure), which serves as the survey object. The light reflected by the survey object returns to the first objective lens 8, is separated from the distance measuring light by the dichroic prism, and is then incident on the light receiving element. The distance to the survey object is calculated from the time difference between when the reference light from the light emitting element is incident on the light receiving element in the distance measuring portion 13 and when the distance measuring light reflected from the survey object is incident on the light receiving element. The distance measuring portion 13 may be a phase-shift distance measuring system, which calculates the distance to the survey object based on the phase shift.

The laser pointer 16 transmits light to the first target to irradiate the first target. In one example, the laser pointer 16 is a light emitting diode of the distance measuring portion 13. In one example, the laser pointer 16 and the distance measuring portion 13 share a common light emitting diode. The laser pointer 16 transmits a light beam, which is coaxial with the first objective lens 8, toward the first target. In one example, the laser pointer 16 is a light emitting diode that is provided separately from the distance measuring portion 13.

The horizontal-angle measuring portion 31 detects the rotation angle of the collimation axis O3 in the horizontal direction (the angle about the vertical axis O1) and outputs a signal corresponding to the detected rotation angle to the control portion 40. In one example, the horizontal-angle measuring portion 31 is an encoder. In one example, the horizontal-angle measuring portion 31 is an absolute optical rotary encoder. The horizontal-angle measuring portion 31 is an angle detection portion that detects the horizontal angle.

The vertical-angle measuring portion 32 detects the rotation angle of the collimation axis O3 in the vertical direction (the up-down direction) (the angle about the horizontal axis O2). The vertical-angle measuring portion 32 outputs a detection signal corresponding to the detected angle to the control portion 40. In one example, the vertical-angle measuring portion 32 is an encoder. In one example, the vertical-angle measuring portion 32 is an absolute optical rotary encoder. The vertical-angle measuring portion 32 is an angle detection portion that detects the vertical angle.

The horizontal-angle operation portion encoder 21 detects the rotation angle of the horizontal-angle operation portion 23 and outputs a signal corresponding to the detected rotation angle to the control portion 40.

The horizontal-angle driving portion 15 rotates the main body 6 about the vertical axis O1 relative to the leveling portion 2. The horizontal-angle driving portion 15 rotates the main body 6 about the vertical axis O1 relative to the leveling portion 2, so that the photographic portion 7 rotates about the vertical axis O1 relative to the leveling portion 2. In one example, the horizontal-angle driving portion 15 is a motor.

In one example, the horizontal-angle driving portion 15 rotates the main body 6 about the vertical axis O1 relative to the leveling portion 2 according to the driving amount calculated by the control portion 40 based on the position in the touch panel of the first display portion 18 or the second display portion 19 that is touched by the user.

In one example, when receiving a rotation command from an external device, such as the controller 50, the horizontal-angle driving portion 15 rotates the main body 6 about the vertical axis O1 relative to the leveling portion 2 according to the driving amount calculated by the control portion 40 based on the rotation command from the external device.

In one example, when the horizontal-angle operation portion 23 is operated, the horizontal-angle driving portion 15 rotates the main body 6 about the vertical axis O1 of the survey instrument 1 relative to the leveling portion 2.

The vertical-angle operation portion encoder 22 detects the rotation angle of the vertical-angle operation portion 24 and outputs a signal corresponding to the detected rotation angle to the control portion 40. The vertical-angle operation portion encoder 22 outputs a signal corresponding to the detected rotation angle to the control portion 40.

The vertical-angle driving portion 17 rotates the photographic portion 7 about the horizontal axis O2 relative to the main body 6. The vertical-angle driving portion 17 may be a motor.

In one example, the vertical-angle driving portion 17 rotates the photographic portion 7 about the horizontal axis O2 relative to the main body 6 according to the driving amount calculated by the control portion 40 based on the position in the touch panel of the first display portion 18 or the second display portion 19 that is touched by the user.

In one example, when receiving a rotation command from an external device, the vertical-angle driving portion 17 rotates the photographic portion 7 about the horizontal axis O2 relative to the main body 6 according to the driving amount calculated by the control portion 40 based on the rotation command from the external device.

In one example, when the vertical-angle operation portion 24 is operated, the vertical-angle driving portion 17 rotates the photographic portion 7 about the horizontal axis O2 relative to the main body 6.

The communication portion 20 communicates with the controller 50, which is an external device. The communication portion 20 is an interface for inputting and outputting data to and from external devices. For example, the communication portion 20 may be a communication interface of the ActiveSync standard, a communication interface of the universal serial bus (USB) standard, a wireless communication interface of the Bluetooth (registered trademark) standard, or a communication interface of the RS-232C serial communication standard. The communication portion 20 sends image data captured by the survey instrument 1 and position data to the controller 50. The communication portion 20 also receives a command signal that is sent from the controller 50 to control the survey instrument 1. In one example, the communication portion 20 communicates directly with the server unit 60 without using the controller 50. In one example, the communication portion 20 sends image data captured by the survey instrument 1 and position data to the server unit 60.

The storage portion 35 stores programs, parameters, design data, which forms the basis of construction, and other data required to operate the survey instrument 1. The storage portion 35 stores the programs, parameters, and design data such that they are not deleted while the survey instrument 1 is not operating. The storage portion 35 may be nonvolatile memory or a hard disk. In one example, the storage portion 35 is read-only memory (ROM). In one example, the storage portion 35 stores image data of a measurement plane captured by the survey instrument 1. In one example, the storage portion 35 stores a defect detection program. The defect detection program may be executed by the survey instrument 1. The storage portion 35 stores the inclination state (inclination data) of the vertical axis of the survey instrument 1 detected by the inclination detection portion 37. The inclination data stored in the storage portion 35 may be transmitted to the controller 50 and used when the controller 50 orthorectifies image data captured and generated by the survey instrument 1. The controller 50 orthorectifies image data captured and generated by the survey instrument 1 based on the inclination state of the vertical axis of the survey instrument 1. In one example, the storage portion 35 stores a correction program, which calculates the first line width data of line segment objects 302 from target image data on a correction target 300, and corrects defect data on a defect detected by the defect detection program.

The operation portion 36 may be a mechanical operation member, such as a push button, a volume switch, and a slide switch arranged on the housing. In one example, the operation portion 36 is a touch panel arranged in the screen of the first display portion 18 or the second display portion 19. When operated by the user, a mechanical operation member outputs to the control portion 40 a command signal for performing the function associated with the operation member. When an object displayed on the touch panel is touched, the touch panel outputs to the control portion 40 a command signal for performing the function associated with the object.

The control portion 40 controls the overall operation of the survey instrument 1.

In one example, the control portion 40 rotates the main body 6 about the vertical axis O1 relative to the leveling portion 2 in response to a command signal from the operation portion 36 or an external device. In one example, the control portion 40 rotates the photographic portion 7 about the horizontal axis O2 relative to the main body 6 in response to a command from the operation portion 36 or an external device. In one example, the control portion 40 rotates the photographic portion 7 about the vertical axis O1 relative to the main body 6 when the user operates the horizontal-angle operation portion 23.

In one example, the control portion 40 operates the first and second photographic portions 11 and 12 and photographs the first target, which may be a reflection prism or a measurement plane forming the external appearance of a structure, based on the set photographing conditions. The image data thus generated is output to the image processing portion 33. In addition, the control portion 40 outputs target image data of the correction target 300 to the image processing portion 33.

In one example, when receiving a drive command signal from the controller 50, the control portion 40 drives the first photographic portion 11 (including the autofocus portion 11a), the second photographic portion 12, the third photographic portion 14, the photographic portion 7, the horizontal-angle driving portion 15, and the vertical-angle driving portion 17 according to the command signal.

In one example, the control portion 40 outputs to the controller 50 the image data and the observation data generated by the photographic portion 7 from the communication portion 20.

[System Structure of Controller]

Figure 13:
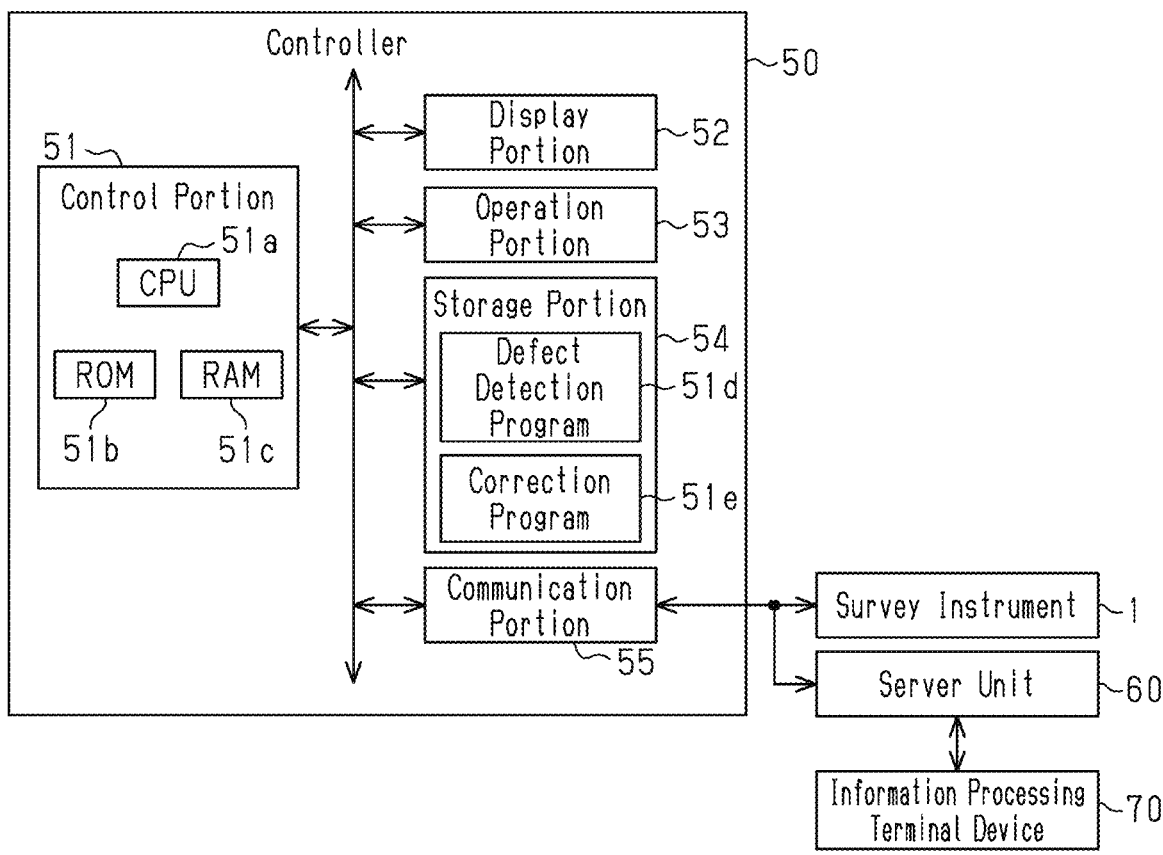
FIG. 13 is a block diagram of a controller.

FIG. 13 is a block diagram showing the system structure of the controller 50.

The controller 50 includes a control portion 51, a display portion 52, an operation portion 53, a storage portion 54, and a communication portion 55.

The control portion 51 has a configuration similar to that of a computer and includes a CPU 51a, ROM 51b, and RAM 51c, which are connected to one another via a bus. In one example, the control portion 51 executes a defect detection program 51d, which may be installed in a hard disk serving as the storage portion 54. In one example, the control portion 51 functions as a display control portion that controls the display portion 52 to display images. The control portion 51 controls the display portion 52 to display images that are based on image data generated by the photographic portion 7 and information that is based on observation data. In one example, the control portion 51 controls the display portion 52 to display images of a measurement plane forming the external appearance of a structure. In one example, the control portion 51 functions as a defect detection portion that detects a defect of the structure from external appearance image data. The control portion 51 functions as a calculation portion that calculates defect data on a defect detected by the defect detection portion using the coordinate data associated with the external appearance image data. In one example, the control portion 51 outputs to the survey instrument 1 command signals for driving the first photographic portion 11, the second photographic portion 12, the third photographic portion 14, the photographic portion 7, the horizontal-angle driving portion 15, and the vertical-angle driving portion 17, for example, via the communication portion 55. In one example, a correction program 51e is executed. The correction program 51e has the known second line width data of the reference objects 301 of each correction target 300. The control portion 51 detects reference objects 301 from the target image data of a correction target 300. The control portion 51 functions as a calculation portion that calculates the first line width data of the reference objects 301, compares it with the second line width data, and calculates correction data for correction of defect width data. In addition, the control portion 51 functions as a correction portion that applies correction data to defect width data.

The display portion 52 has a display function of displaying images and objects. The display portion 52 may be a liquid crystal display, an organic EL display, or a CRT. In one example, the display portion 52 displays, on its screen, the images that are based on image data generated by the first and second photographic portions 11 and 12 and information that is based on observation data.

The operation portion 53 may be a keyboard, a mouse, or a touch panel arranged on the screen of the display portion 52. When an object on the display portion 52 is selected, the operation portion 53 outputs to the control portion 51 a command for performing the function associated with the object.

The storage portion 54 stores programs and parameters such that they are not deleted while the survey instrument 1 is not operating. In one example, the storage portion 54 may be nonvolatile memory or a hard disk. In one example, the storage portion 54 stores the defect detection program 51d, the correction program 51e, and the design data forming the basis of construction. In one example, the storage portion 54 stores external appearance image data of a measurement plane forming the external appearance of a structure and target image data obtained by photographing a correction target 300. In one example, the storage portion 54 stores map data created using a global coordinate system.

The communication portion 55 communicates with the communication portion 20 of the survey instrument 1. In one example, the communication portion 55 receives the image data captured with the survey instrument 1 and the position information, and outputs a command signal for controlling the survey instrument 1. In one example, the communication portion 55 communicates with an external device via a network, such as a wide area network or a local area network. In one example, the communication portion 55 communicates with a server unit, which is an external device. In one example, the communication portion 55 sends and saves defect data in the server unit 60. In one example, the communication portion 55 sends image data of a measurement plane forming the external appearance of a structure to the server unit 60.

[System Structure of Server Unit]

Figure 14:
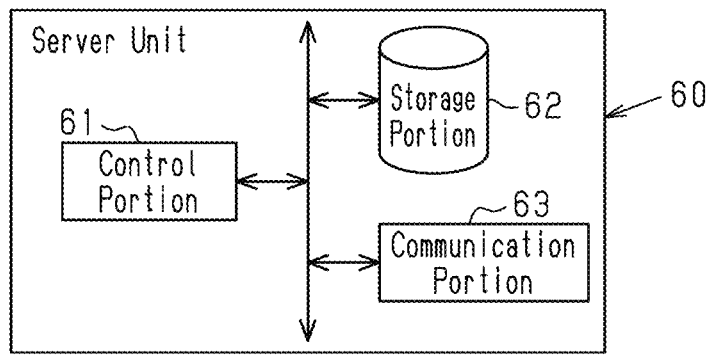
FIG. 14 is a block diagram of a server.

FIG. 14 is a block diagram showing the system structure of the server unit 60.

The server unit 60 includes a control portion 61, a storage portion 62, and a communication portion 63. The control portion 61 has a structure similar to that of a computer, and includes a CPU, ROM, and RAM, which are connected to one another via a bus. The storage portion 62 may be a large-capacity hard disk. The control portion 61 saves and reads various data in the storage portion 62. In one example, the control portion 61 saves target image data of a correction target 300, which is captured by the survey instrument 1, in association with the survey instrument identification data of the survey instrument 1 by which the target image data is captured, which serves as first survey instrument identification data, and the data on the photographing date and time. In one example, the control portion 61 stores external appearance image data of a structure, which is captured by the survey instrument 1, in association with the survey instrument identification data of the survey instrument 1 by which the external appearance image data is captured, which serves as second survey instrument identification data, and the data on the photographing date and time. In one example, the control portion 61 detects a reference object 301 from the target image data of the correction target 300. Then, the control portion 61 calculates the first line width data of the reference object 301, compares it with the known second line width data of the reference object 301, calculates correction data for correcting defect width data, and saves the correction data in the storage portion 62. In one example, the control portion 61 applies the correction data to defect data and saves the corrected defect data.

The communication portion 63 communicates with the communication portion 20 of the survey instrument 1 and the communication portion 55 of the controller. In one example, the communication portion 63 communicates with an external device via a network, such as a wide area network or a local area network.

[Outline of Defect Detection on Structure]

Figure 15A:
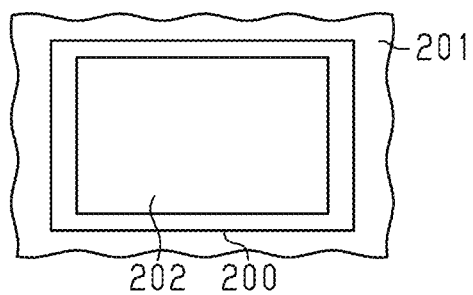
FIG. 15A is a diagram showing the relationship between a measurement plane and a measurement area.
Figure 15B:
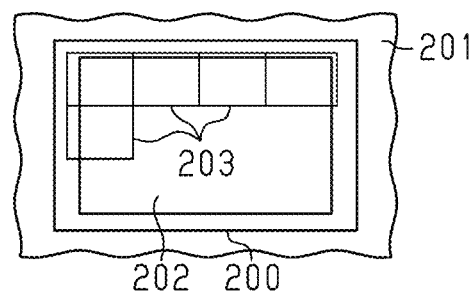
FIG. 15B is a diagram showing the relationship between a measurement plane, a measurement area, and image areas.

FIGS. 15A and 15B are diagrams showing the outline of defect detection on a structure. FIG. 15A is a diagram showing the relationship between a measurement plane and a measurement area.

In defect detection, at least two arbitrary points on a wall surface 201 of a structure are observed (subjected to sighting and distance measurement) to obtain observation data (distance measurement data obtained by the distance measuring portion 13, horizontal angle data obtained by the horizontal-angle measuring portion 31, and vertical angle data obtained by the vertical-angle measuring portion 32). A measurement plane 200 is defined based on the observation data. In defining a measurement plane 200, the first and second display portions 18 and 19 may display images based on the image data generated by photographing with the second photographic portion 12, or the laser pointer 16 may transmit light. This allows the user to identify which part of the structure is to be observed with the survey instrument 1.

A measurement area 202 is set by measuring angles (horizontal and vertical angles) to at least two arbitrary points on the structure. When the measurement plane 200 is already defined before the setting of a measurement area 202, the measurement area 202 can be set without measuring the distances to at least two arbitrary points on the structure. Since the measurement plane 200 is already set, the measurement area 202 can be defined simply by measuring the angles to the two points. When the measurement plane 200 is already defined before the setting of a measurement area 202, the measurement area 202 can be set only using horizontal angle data obtained by the horizontal-angle measuring portion 31 and vertical angle data obtained by the vertical-angle measuring portion 32 for at least two arbitrary points on the structure. The measurement area 202 can be set without using distance measurement data obtained by the distance measuring portion 13.

The two points observed when defining the measurement plane 200 and the two points on which angle measurement is performed when setting the measurement area 202 may be different observation points or the same observation points.

FIG. 15B is a diagram showing the relationship between a measurement plane, a measurement area, and an image area. In order to obtain the external appearance image data of the entire set measurement area 202, the survey instrument 1 successively photographs the measurement area 202 with the first photographic portion 11 and successively generates external appearance image data of each image area 203 having a first angle of view. Since the measurement plane 200 is already defined, the position of an arbitrary pixel in an external appearance image, which is a digital image based on external appearance image data, can be specified using the coordinate data that is obtained by converting the angles of the pixel from the observation point, which is sighted when the image is captured. Defect detection is performed on each piece of external appearance image data. The position of a detected defect is specified with coordinate data, which is defect data. In one example, position data of external appearance image data and defect data indicating the position of a defect, for example, are global coordinate data. Each piece of the captured external appearance image data of the measurement area 202 is subjected to orthorectification and then to stitching, and saved in the storage portion 54, for example.

Figure 16:
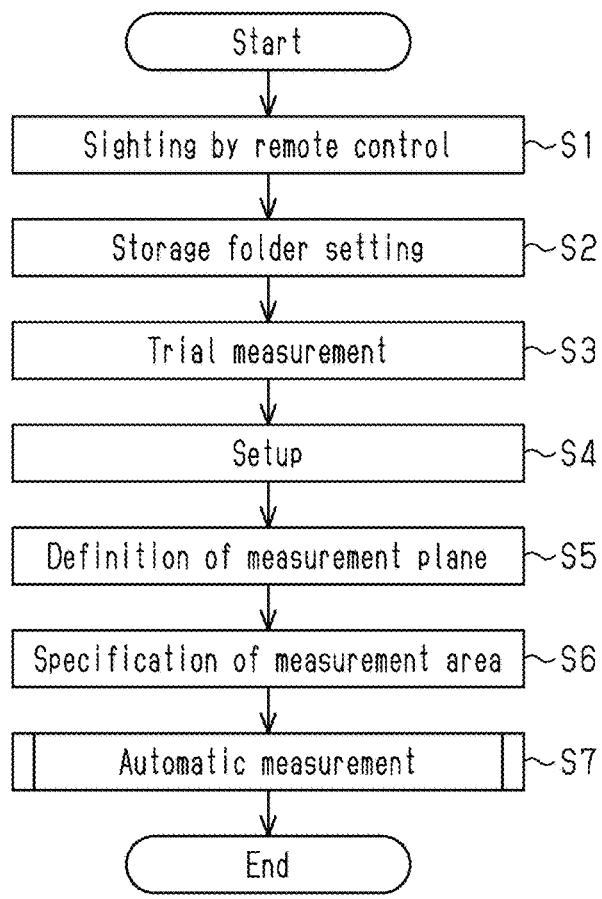
FIG. 16 is a flowchart showing a procedure for detecting a defect of a structure.

FIG. 16 is a flowchart showing the procedure of defect detection of a structure.

At step S1, the control portion 51 of the controller 50 starts remote control of the survey instrument 1 and sights the survey instrument 1 on a measurement plane 200 of a structure, for example. In one example, through the control portion 40 of the survey instrument 1, the control portion 51 can control the first and second photographic portions 11 and 12 to change the angle of view, to capture images, to measure distances, and to activate and deactivate the autofocus, manual exposure, white balance, and the laser pointer 16, for example. In one example, the control portion 51 controls the display portion 52 to display measured angle values and the leveling state.

At step S2, the control portion 51 creates, in the storage portion 54, a storage folder for storing external appearance image data.

At step S3, the survey instrument 1 performs trial measurement according to the control of the control portion 51. In one example, in the trial measurement, the first photographic portion 11 or the second photographic portion 12 of the survey instrument 1 captures an image that includes a defect in the external appearance of the structure on which the user intends to perform defect detection. In one example, the controller 50 detects a defect by performing image analysis and measuring contrast in external appearance image data generated by photographing with the first photographic portion 11 or the second photographic portion 12. The control portion 51 controls the display portion 52 to display an external appearance image created based on external appearance image data generated by photographing with the first photographic portion 11 or the second photographic portion 12. The user looks at the external appearance image displayed on the display portion 52 and operates the operation portion 53. The control portion 51 adjusts the setting of the first photographic portion 11, such as the sensitivity and exposure, via the control portion 40 so as to detect a defect in the external appearance image. In one example, the trial measurement is performed in multiple positions. In one example, the survey instrument 1 is set up in a position that is found through the trial measurement to have a desirable measurement environment.

Figure 17:
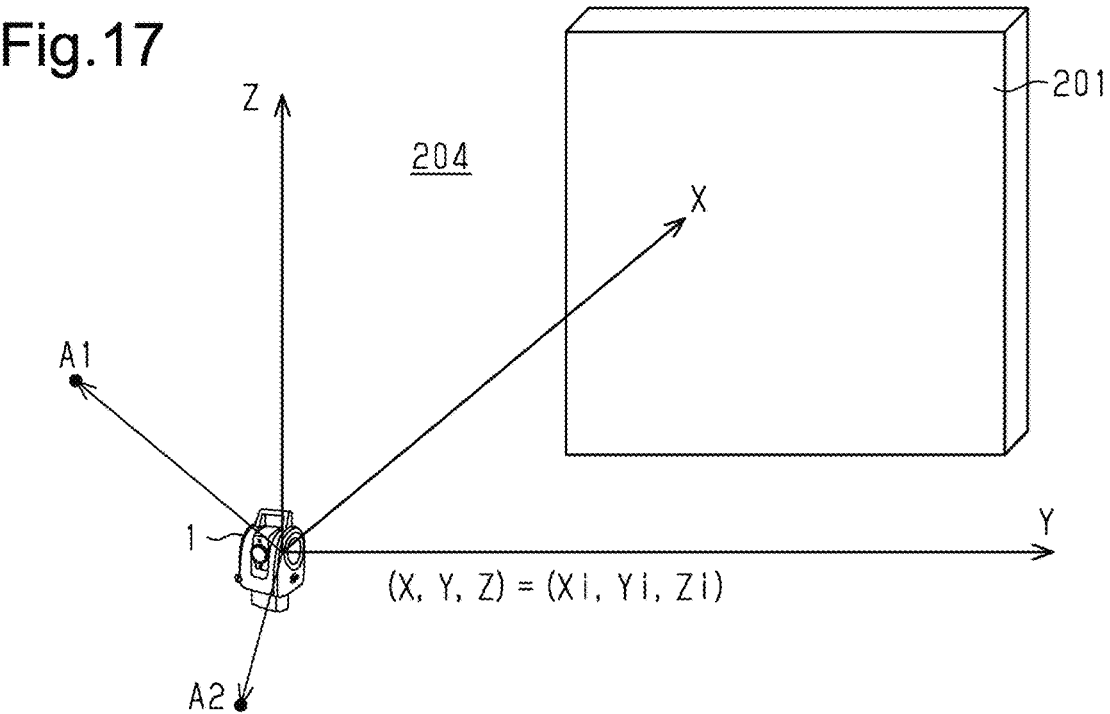
FIG. 17 is a diagram for illustrating setup.

At step S4, the survey instrument 1 is set up. FIG. 17 is a diagram for illustrating setup. In setup, the survey instrument 1 is leveled and centered by photographing the second target with the third photographic portion 14. In one example, according to the control of the control portion 51, the survey instrument 1 measures the angles and distance to each of two known points A1 (X1, Y1, Z1) and A2 (X2, Y2, Z2). As shown in FIG. 17, the setup enables calculation of the coordinate values ((X, Y, Z)=(Xi, Yi, Zi)) indicating the position of the survey instrument 1 in a global coordinate system 204. The survey instrument 1 is thus set in the global coordinate system 204.

In one example, the trial measurement is performed before setup. In one example, the trial measurement is performed after setup. In one example, the user sets the order of trial measurement and setup using the controller 50. When the user sets the order of trial measurement and setup, the display portion 52 may display objects for selection between trial measurement and setup, enabling selection using the operation portion 53. Setup is time consuming and therefore preferably performed after trial measurement.

At step S5, according to the control of the control portion 51, the survey instrument 1 defines a measurement plane 200. In one example, the survey instrument 1 measures the angles and distances to at least two arbitrary points on the external appearance of a structure (e.g., a wall surface 201) and defines a plane including the two arbitrary points as a measurement plane 200. The position of the survey instrument 1 is specified in the global coordinate system 204 through setup. Thus, defining the measurement plane 200 allows the survey instrument 1 to specify any observation point on the measurement plane 200 in the global coordinate system 204.

Figure 18:
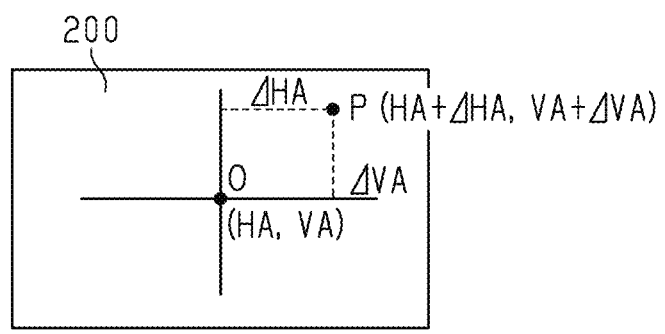
FIG. 18 is a diagram for illustrating the coordinate data of an arbitrary pixel in a digital image.

FIG. 18 is a diagram for illustrating the position data of an arbitrary pixel in a digital image, which can be specified through the definition of the measurement plane 200.

As described above, the definition of the measurement plane 200 enables calculation of the angles to the observation point O (HA, VA), which is indicted by the center of the cross-shaped reticle, in an image area 203 captured by the survey instrument 1.

The angles of an arbitrary pixel (P) in the image area 203 from the observation point O can be converted into global coordinate data. Thus, the position of any pixel in the external appearance image data can be specified with global coordinate data, which is position data, producing the same result as when the pixel is observed for angle measurement. In one example, the first photographic element of the first photographic portion 11 may have 1920×1080 pixels, and a position in a digital image may be specified with the accuracy that corresponds to the number of pixels of the first photographic element.

The method for defining a measurement plane 200 will be described in detail below.

At step S6, according to the control of the control portion 51, the survey instrument 1 specifies a measurement area 202 in which defect detection is performed on the defined measurement plane 200 of the structure.

The details of the definition of the measurement area 202 will be described below.

At step S7, according to the control of the control portion 51, the survey instrument 1 drives the horizontal-angle driving portion 15 to rotate the photographic portion 7 about the vertical axis O1, and drives the vertical-angle driving portion 17 to rotate the photographic portion 7 about the horizontal axis O2. According to the control of the control portion 51, the survey instrument 1 automatically measures the measurement area 202. The survey instrument 1 successively photographs the measurement area 202 with the first photographic portion 11 while changing the sighting direction for each image. External appearance image data, which is captured successively, is input to the controller 50 together with its position data. The control portion 51 detects a defect in the external appearance image data input from the survey instrument 1.

The automatic measurement using the first photographic portion 11 will be described in detail below.

[Definition of Measurement Plane (Step S5)]

In one example, the external appearance of a structure to be measured is a plane. Examples of the type of plane include a vertical plane, a horizontal plane, and an inclined plane.

Figure 19:
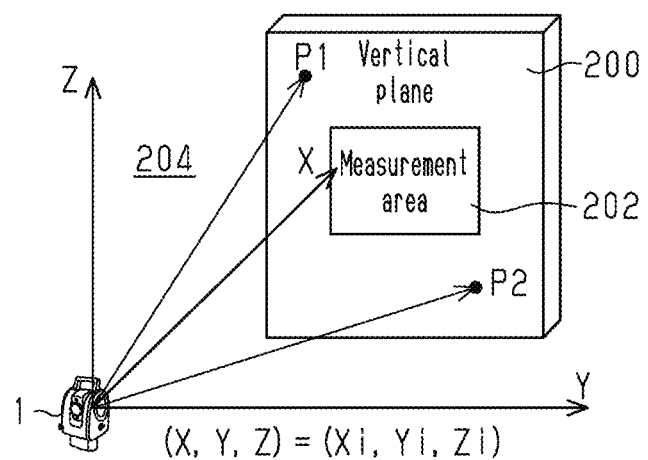
FIG. 19 is a diagram showing a definition method used when a measurement plane is a vertical plane.

FIG. 19 is a diagram showing how a vertical measurement plane 200 is defined. To define a vertical measurement plane 200, two arbitrary observation points P1 and P2 on the vertical measurement plane 200 are specified using the laser pointer 16 while the observation points P1 and P2 are photographed with the second photographic portion 12. The observation points P1 and P2 are observed by measuring their angles and distances. According to the control of the control portion 51, the survey instrument 1 defines the vertical plane including the arbitrary observation points P1 and P2, on which sighting and distance measurement are performed, as the measurement plane 200.

Figure 20:
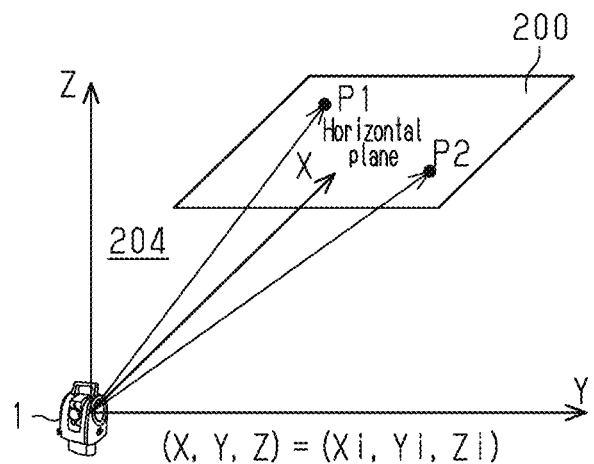
FIG. 20 is a diagram showing a definition method used when a measurement plane is a horizontal plane.

FIG. 20 is a diagram showing how a horizontal measurement plane 200 is defined. To define a horizontal measurement plane 200, two arbitrary observation points P1 and P2 on the horizontal measurement plane 200 may be specified using the laser pointer 16 while the observation points P1 and P2 are photographed with the second photographic portion 12. The observation points P1 and P2 are observed by measuring their angles and distances. According to the control of the control portion 51, the survey instrument 1 defines the horizontal plane including the arbitrary observation points P1 and P2, on which sighting and distance measurement are performed, as the measurement plane 200.

The number of arbitrary observation points on a vertical plane and a horizontal plane may be any number that is greater than or equal to two.

Figure 21:
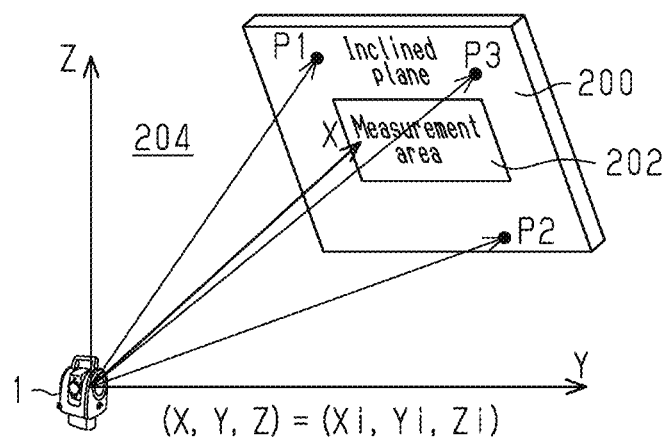
FIG. 21 is a diagram showing a definition method used when a measurement plane is an inclined plane.

FIG. 21 is a diagram showing how an inclined measurement plane 200 is defined. To define an inclined measurement plane 200, three arbitrary observation points P1, P2 and P3 on the inclined measurement plane 200 may be specified using the laser pointer 16 while the observation points P1 to P3 are photographed with the second photographic portion 12. The observation points P1 to P3 are observed by measuring their angles and distances. According to the control of the control portion 51, the survey instrument 1 defines the inclined plane including the observation points P1, P2 and P3, on which sighting and distance measurement are performed, as the measurement plane 200.

The number of arbitrary observation points on an inclined plane may be any number that is greater than or equal to three.

In one example, according to the control of the control portion 51, the survey instrument 1 always performs angle and distance measurement on at least three points when defining a measurement plane 200. Based on the observation data on these the three points, the survey instrument 1 determines whether the measurement plane 200 is vertical, horizontal, or inclined.

[Definition of Measurement Area (Step S6)]

Figure 22A:
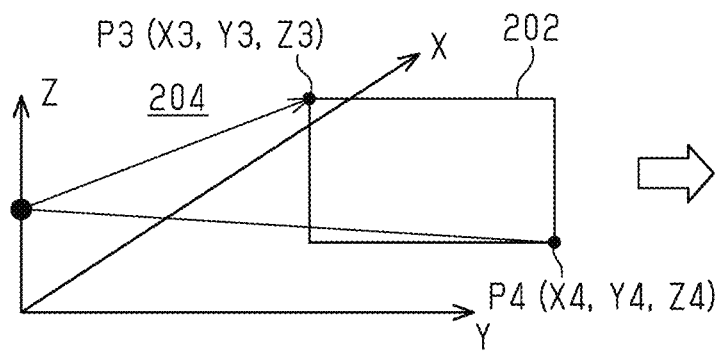
FIGS. 22A and 22B are diagrams showing a method for specifying a measurement area that does not directly face the survey instrument.

As shown in FIG. 22A, when the measurement plane 200 including a measurement area 202 is a vertical plane, according to the control of the control portion 51, the survey instrument 1 specifies two arbitrary observation points P3 and P4 on the measurement plane 200 using the laser pointer 16 while the observation points P3 and P4 are photographed with the second photographic portion 12. The survey instrument 1 measures the angles to the observation points P3 and P4. Since the measurement plane 200 is defined, the global coordinate data (P3 (X3, Y3, Z3) and P4 (X4, Y4, Z4)) of the angle measurement positions is obtained. The measurement area 202 is not merely an area that is set with the specified observation points P3 and P4, but an area that is projected onto the defined measurement plane 200. When the measurement area 202 directly faces the survey instrument 1, the measurement area 202 is rectangular and has the observation points P3 and P4 at diagonally opposite corners.

Figure 22B:
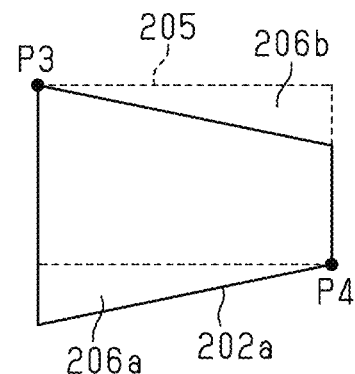

As shown in FIG. 22B, when the measurement area 202 does not directly face the survey instrument 1, simply drawing a rectangle 205 based on the measured angles of the observation points P3 and P4 creates a region 206a that will not be observed. The rectangle 205 also includes an unnecessary region 206b that is not a part of the measurement area 202. According to the control of the control portion 51, the survey instrument 1 calculates and sets the measurement area 202a that is projected onto the defined measurement plane 200. The measurement area 202a is a quadrangle in which the side farther from the survey instrument 1 is shorter than the side closer to the survey instrument 1.

In one example, the two arbitrary observation points P1 and P2 specified when defining the measurement plane 200 are used as the observation points P3 and P4 for specifying a measurement area.

The measurement area 202 is not limited to one rectangle. Two or more measurement areas 202 may be set, and it is also possible to exclude a part of a specified measurement area.

Figure 23A:
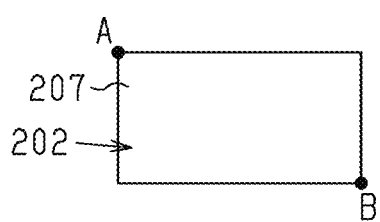
FIG. 23A is a diagram for illustrating a method for defining a measurement area, showing a state in which two points are specified to set the measurement area.

FIG. 23A is a diagram showing a case where a measurement area is set by specifying two points. When two points A and B are specified, the measurement area 202 is a rectangle 207 having the specified two points A and B at diagonally opposite corners. In one example, this measurement area 202 includes a defect 401. In one example, this measurement area 202 includes a correction target 300. In one example, this measurement area 202 includes a defect 401 and a correction target 300.

Figure 23B:
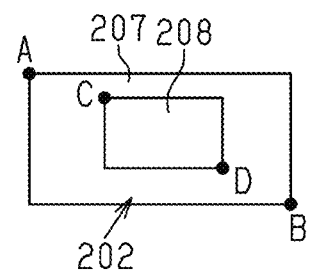
FIG. 23B is a diagram showing a case where a part of a set measurement area is excluded.

FIG. 23B is a diagram showing a case where a part of a set measurement area is excluded from the measurement area. When two specification points C and D are additionally set inside a rectangle 207, a rectangle 208 having the two points C and D at diagonally opposite corners is set inside the rectangle 207. In one example, this rectangle 208 is set as a region to be excluded from the rectangle 207 of the measurement area 202. In one example, the region of the measurement area 202 excluding the rectangle 207 includes a defect 401. In one example, a correction target 300 is included. In one example, a defect 401 and a correction target 300 are included.

Figure 23C:
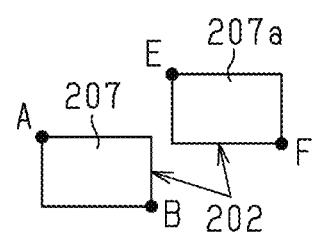
FIG. 23C is a diagram showing a state in which measurement areas are set in a plurality of positions.

FIG. 23C is a diagram showing a case where measurement areas are set in multiple positions. When two points E and F are further specified outside a rectangle 207 that is set by specifying points A and B, a rectangle 207a having two points E and F at diagonally opposite corners is set as an additional measurement area 202. In one example, the rectangle 207 is a measurement area for detecting a defect, and the rectangle 207a is a measurement area on which a correction target 300 is affixed.

Figure 23D:
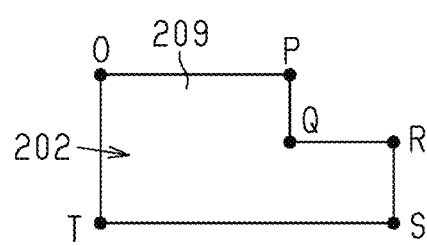
FIG. 23D is a diagram showing a state in which six points are specified to set a measurement area.

FIG. 23D is a diagram showing a case where six points are specified to set a measurement area. In one example, a measurement area 202 that has a shape 209 other than a rectangle is set by specifying six points O, P, Q, R, S and T as specification point. The number of specification points is not limited, and setting three or more specification points allows for setting of a measurement area 202 with a variety of shapes according to the number of the points. In one example, this measurement area 202 includes a defect 401. In one example, this measurement area 202 includes a correction target 300. In one example, this measurement area 202 includes a defect 401 and a correction target 300.

Figure 23E:
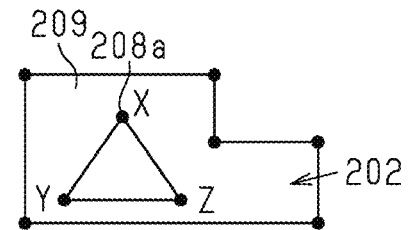
FIG. 23E is a diagram showing a case where a part of a set measurement area is excluded and deleted from the measurement area.

FIG. 23E is a diagram showing a case where a part of a measurement area set by specifying six points is excluded. Three specification points X, Y and Z are specified inside a measurement area 202 having a shape 209 other than a rectangle, so that a triangle 208a is set as a region to be excluded. Setting three or more specification points allows the region to be excluded to have a shape other than a triangle. In one example, the region of the measurement area 202 excluding the triangle 208a includes a defect 401. In one example, a correction target 300 is included. In one example, a defect 401 and a correction target 300 are included.

In one example, when three or more points are specified, adjacent specification points can be connected by a curved line, instead of a straight line. In one example, the user can select a straight line or a curved line by operating the operation portion 53.

[Automatic Measurement (Step S7)]

Depending on the size of the set measurement area 202, it may not be possible to photograph the entire set measurement area 202 in a single image using the first photographic portion 11. In one example, according to the control of the control portion 51, the survey instrument 1 drives the horizontal-angle driving portion 15 and the vertical-angle driving portion 17 such that the image areas overlap without causing the overlapping regions to be larger than necessary. According to the control of the control portion 51, the survey instrument 1 photographs the entire measurement area 202.

Figure 24:
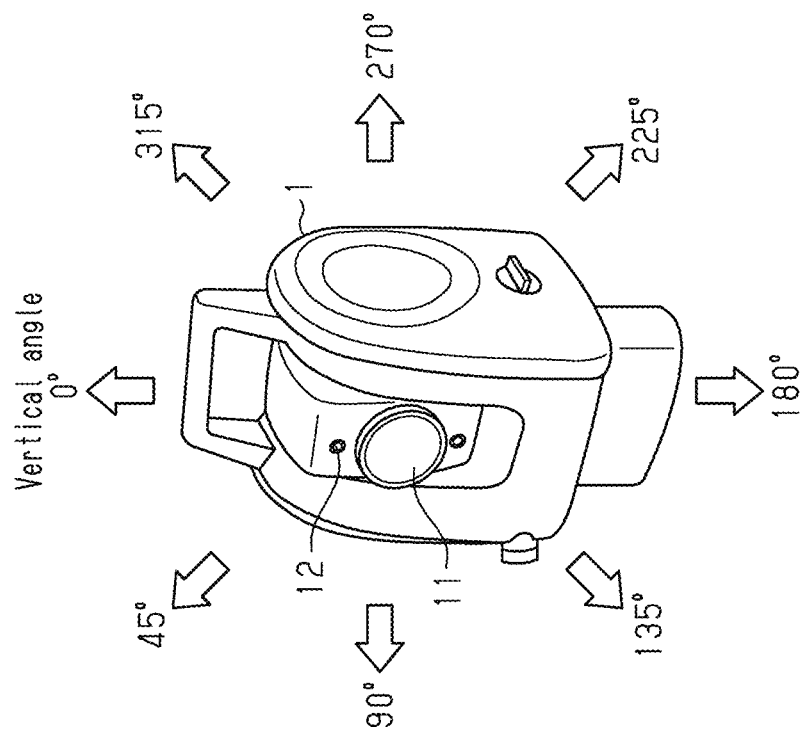
FIG. 24 is a diagram for illustrating the range of rotational movement of the survey instrument about the horizontal axis.

FIG. 24 is a diagram for illustrating the rotation range of the survey instrument 1 about the horizontal axis. The rotation of the vertical-angle driving portion 17 of the survey instrument 1 about the horizontal axis O2 is controlled as follows.

In one example, when the measurement plane 200 is a vertical plane or an inclined plane, the photographic portion 7 is generally rotated about the horizontal axis O2 at a vertical angle of between 45° and 135° inclusive. In one example, when the measurement plane 200 is a vertical plane or an inclined plane, the photographic portion 7 is generally rotated about the horizontal axis O2 at a vertical angle of between 225° and 315° inclusive.

In one example, when the measurement plane 200 is a ceiling surface, the photographic portion 7 is generally rotated about the horizontal axis O2 at a vertical angle of between 0° and 45° inclusive. In one example, when the measurement plane 200 is a ceiling surface, the photographic portion 7 is generally rotated about the horizontal axis O2 at a vertical angle of between 315° and 360° inclusive.

The vertical angle is a rotation angle of the photographic portion 7 about the horizontal axis O2. The vertical angle is 0° when the sighting direction of the survey instrument 1 is toward the zenith. The vertical angle is 90° when the sighting direction is horizontal.

Figure 25:
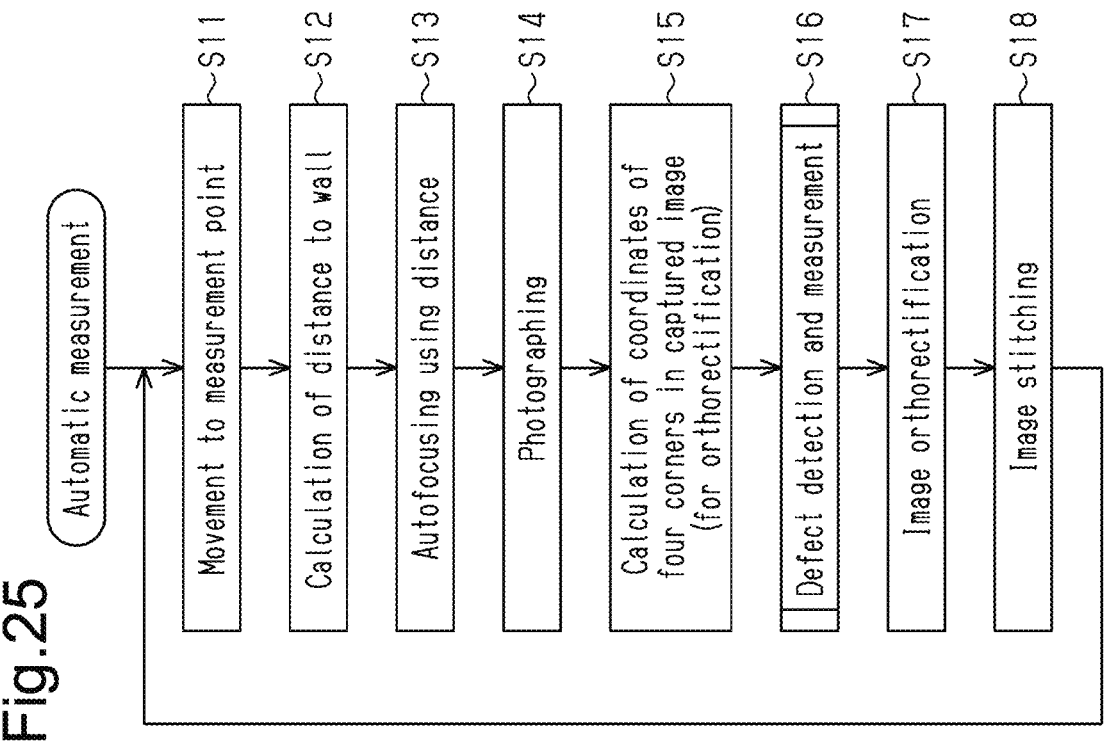
FIG. 25 is a flowchart illustrating a procedure for automatic measurement.

FIG. 25 is a flowchart for illustrating the details of the procedure of automatic measurement shown in step S7.

At step S11, according to the control of the control portion 51, the survey instrument 1 controls the horizontal-angle driving portion 15 and the vertical-angle driving portion 17 to rotate the photographic portion 7 and successively photograph images areas in the measurement area 202. According to the control of the control portion 51, the survey instrument 1 photographs the current image area in the measurement area 202 and then continually moves to an adjacent image area, so that the entire region of the measurement area 202 is automatically measured with the first photographic portion 11.

The automatic measurement of the survey instrument 1 will be described in detail below.

At step S12, according to the control of the control portion 51, the survey instrument 1 calculates the distance to each image area. At step S13, according to the control of the control portion 51, the survey instrument 1 performs autofocus control of the first photographic portion 11. The autofocus control moves the focusing lens, which forms the first optical system of the first photographic portion 11, in the optical axis direction according to the focus adjustment instruction from the control portion 40 so that the light focuses on the first photographic element.

In one example, the autofocus control calculates the distance between the observation point and the survey instrument 1 from the global coordinate data of the measurement point and the global coordinate data indicating the position of the survey instrument 1. The autofocus control then moves the focusing lens in the optical axis direction based on the calculated distance.

In one example, the autofocus control uses the distance measuring portion 13 to measure the distance between the survey instrument 1 and the observation point and moves the focusing lens in the optical axis direction based on the measured distance.

In one example, the autofocus control uses contrast detection, which moves the focusing lens to the point where maximal contrast is detected.

The measurement plane 200 is often a concrete wall surface, on which contrast is not easily detected. As such, the autofocus control preferably uses the distance measured at step S12.

At step S14, according to the control of the control portion 51, the survey instrument 1 photographs each image area 203 of the first angle of view in the measurement area 202. According to the control of the control portion 51, the survey instrument 1 calculates the angles (HA, VA) to the observation point O indicated by the center of the cross-line center of the reticle in each image area 203. According to the control of the control portion 51, the survey instrument 1 calculates the global coordinate data of each pixel of the captured external appearance image data by converting the angles of the pixel from the observation point O at the observation center. Each pixel in the image area 203 is thus converted into global coordinate data.

In one example, when a defect is detected in external appearance image data, the survey instrument 1 calculates the global coordinate data of the pixels at the start point and the end point of the defect by converting the angles of the pixels from the observation point O at the observation center, which is position data.

The survey instrument 1 sends to the controller 50 external appearance image data in which the positions of the pixels are specified with global coordinate data. The control portion 51 controls the display portion 52 to successively display external appearance images based on the external appearance image data.

In one example, the survey instrument 1 calculates the global coordinate data of all pixels as the position data of the captured external appearance image data, and outputs the calculated data to the controller 50.

At step S15, according to the control of the control portion 51, the survey instrument 1 calculates coordinate data of the four corners of the captured external appearance image for orthorectification. The coordinate data of the four corners is the coordinate data of the pixels at the four corners of the external appearance image data.

At step S16, the control portion 51 performs detection of a defect, such as a crack or depression, on each piece of the captured external appearance image data and measures the position, length, and width of a defect.

The detect detection will be described in detail below.

At step S17, the control portion 51 orthorectifies each external appearance image data piece. In one example, the control portion 51 functions as an orthorectification portion that orthorectifies external appearance image data.

At step S18, the control portion 51 performs stitching to combine different pieces of external appearance image data. In one example, the control portion 51 functions as a stitching portion that performs stitching to combine first orthorectified external appearance image data and second orthorectified external appearance image data.

The orthorectification and stitching will be described in detail below.

[Automatic Measurement of Survey Instrument 1 (Step S7)]

When the wall surface used as the measurement plane 200 is a vertical plane or an inclined plane, the photographic portion 7 is generally rotated about the horizontal axis O2 at a vertical angle of between 45° and 135° inclusive. Alternatively, when the wall surface used as the measurement plane 200 is a vertical plane or an inclined plane, the photographic portion 7 is generally rotated about the horizontal axis O2 at a vertical angle of between 225° and 315° inclusive.

Figure 26:
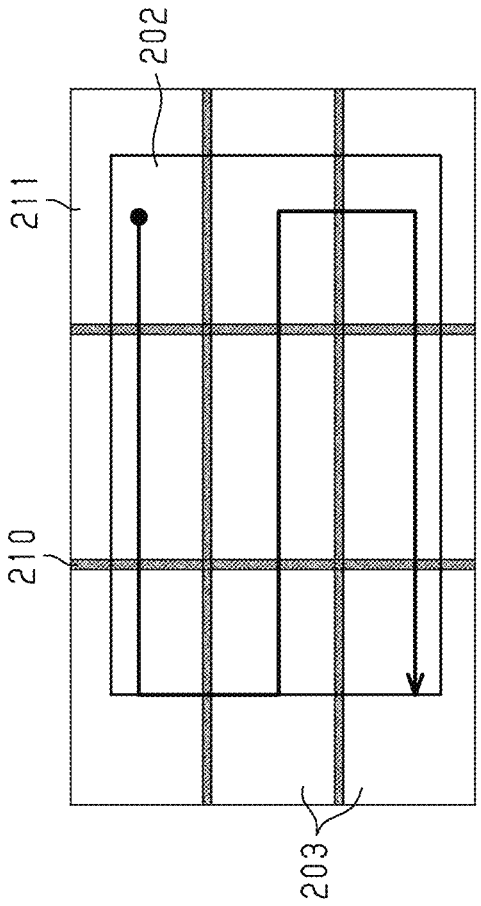
FIG. 26 is a diagram for illustrating a state in which a measurement area on a vertical plane is automatically measured in the manner of tiles.

FIG. 26 is a diagram illustrating a state in which a measurement area 202 on a vertical plane is automatically measured in the manner of tiles.

In one example, the measurement area 202 is rectangular. In one example, the measurement area 202 does not include a region to be excluded from measurement. According to the control of the control portion 51, the survey instrument 1 photographs a total image area 211, which is rectangular and larger than the measurement area 202, with the first photographic portion 11. The automatic measurement uses the first photographic portion 11 with the first angle of view. The first photographic portion 11 photographs the total image area 211 while avoiding overlapping of the major sections of the image areas 203 of the first angle of view. In one example, each image area 203 has an overlapping section 210 where the image area 203 overlaps with the image areas 203 that are adjacent in the vertical and horizontal directions. In one example, the image areas 203 are rectangles of the same size. In one example, the image areas 203 may be squares of the same size. The survey instrument 1 photographs the total image area 211 such that the image areas 203 are arranged in the manner of tiles. In one example, the survey instrument 1 moves the first photographic portion 11 in an S-shape in the total image area 211 to photograph the total image area 211. The photographing may start at any end of the S-shaped route. In one example, the survey instrument 1 successively photographs the total image area 211 along a route that allows for sequential photographing. In one example, the survey instrument 1 successively photographs the total image area 211 along a route that minimizes the movement of the photographic portion 7 driven by the horizontal-angle driving portion 15 and the vertical-angle driving portion 17. In one example, the survey instrument 1 prioritizes an image area 203 adjacent to the current image area 203 as the next image area 203 to be photographed after the current image area 203.

[Defect Detection and Measurement (Step S16)]

Figure 27:
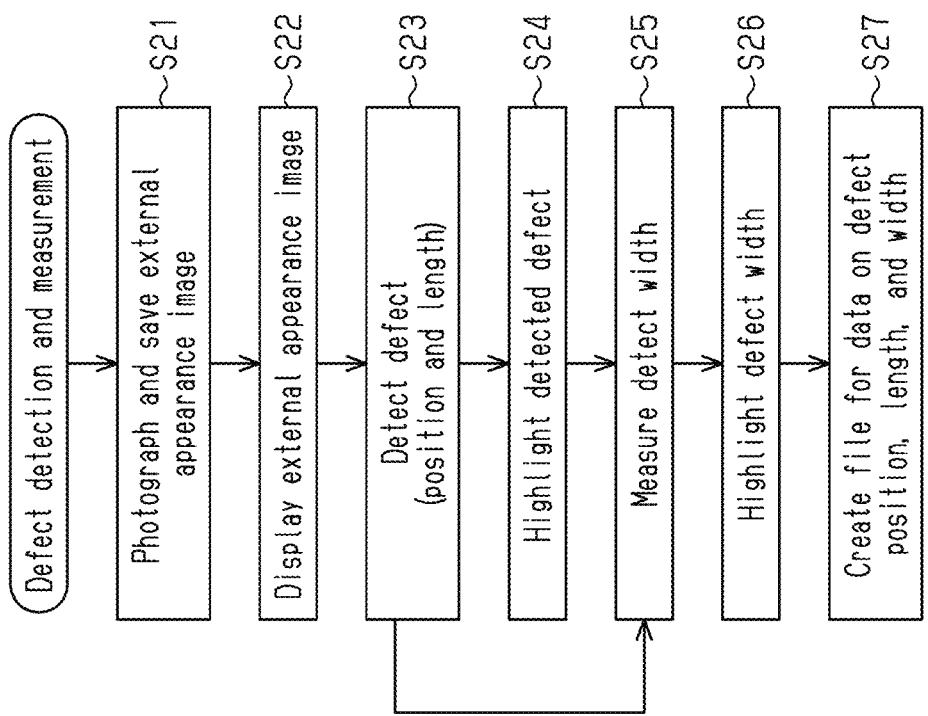
FIG. 27 is a flowchart showing a procedure for detecting and measuring a crack, which is an example of a defect.

FIG. 27 is a flowchart showing the procedure of detection and measurement of a defect, which is an example of a defect.

At step S21, according to the control of the control portion 51, the survey instrument 1 photographs each image area 203 in the measurement area 202. In one example, according to the control of the control portion 51, each time an image area 203 is photographed, the survey instrument 1 calculates the angles (HA, VA) of the observation point indicated by the cross-line center of the cross-shaped reticle. The survey instrument 1 calculates the global coordinate data of each pixel by converting the angles (HA, VA) of the pixel from the central observation point. The survey instrument 1 sends to the controller 50 the global coordinate data as the position data that is associated with the captured external appearance image data and the pixels.

Figure 28A:
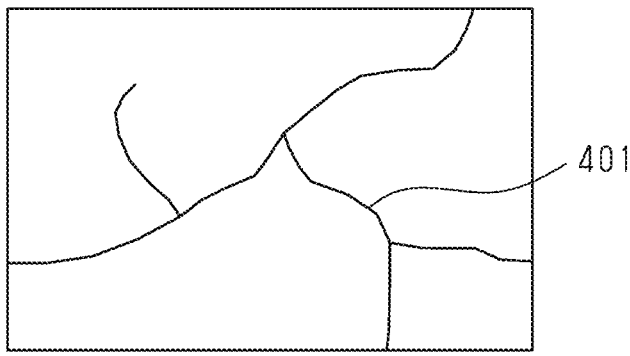
FIG. 28A is a diagram showing an external appearance image including a crack.

At step S22, the control portion 51 of the controller 50 sequentially displays on the display portion 52 an external appearance image based on the external appearance image data. FIG. 28A shows an example of an external appearance image having a defect 401.

At step S23, the control portion 51 functions as a defect detection portion. The control portion 51 performs defect detection on each piece of external appearance image data. To detect a defect, the control portion 51 detects contrast in each external appearance image. When detecting a defect, the control portion 51 calculates the defect data indicating the position of the defect. In one example, the defect data is coordinate data specified using a global coordinate system. The defect data is coordinate data that is obtained by converting the position data, which is the angles from the observation point O indicated by the cross-line center of the reticle. The coordinate data specifies the position of the defect. Specifically, the control portion 51 identifies the global coordinate data corresponding to the pixel at the start point of the defect 401. The control portion 51 also identifies the global coordinate data corresponding to the pixel at the end point of the defect 401. The control portion 51 calculates the distance between the start point and the end point of the defect as the defect length data of the defect. The control portion 51 controls the display portion 52 to display the information based on the defect data, together with the external appearance image based on the external appearance image data.

In one non-limiting example, the width of a crack or a depression to be detected may be 0.2 mm or more, or 0.1 mm or more.

In one example, the detection of the defect 401 may be performed by the survey instrument 1.

Figure 28B:
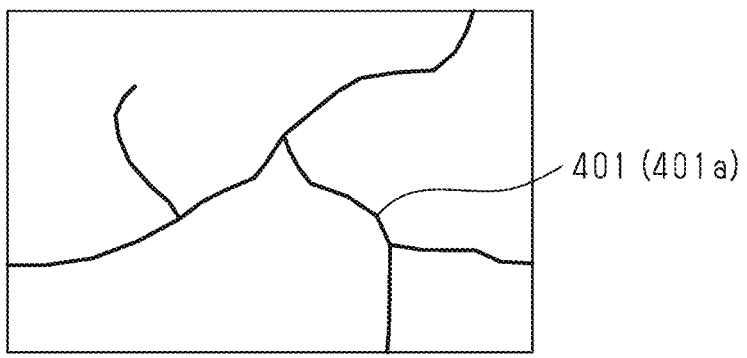
FIG. 28B is a diagram showing an external appearance image in which the crack is highlighted.

At step S24, the control portion 51 highlights the detected defect. As shown in FIG. 28B, in one example, the detected defect is highlighted by superimposing a line object 401a, which has a different color from the surrounding color, or a different line type. In one example, step S24 may be omitted.

At step S25, the control portion 51 calculates the defect width data of the detected defect. In one example, the defect width data is the distance between a specific point on a first side edge of the defect 401 extending in the direction in which the defect 401 extends and a specific point that is located on a second side edge and on the normal to the tangent of the first side edge. In one example, the distance between the two points is calculated based on the global coordinate data of the two points. In one example, the distance is calculated based on the number of pixels located between the two points. Step S24 and the subsequent steps may be omitted when the purpose of the operation is only to detect the defect 401.

Figure 28C:
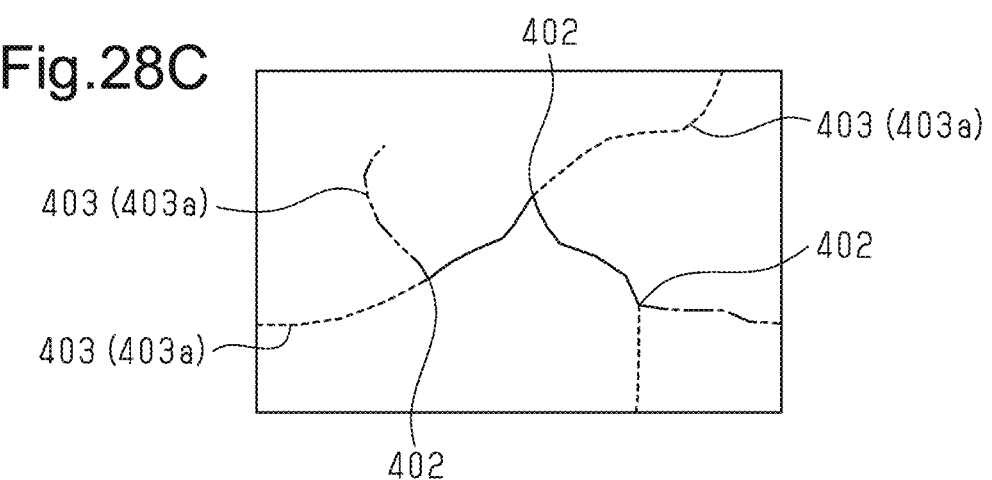
FIG. 28C is a diagram showing an external appearance image in which the crack is divided into segments, which are individually highlighted.

At step S26, the control portion 51 detects a change point 402, which is a position where the crack of the defect bends, or a position where the width changes. The control portion 51 handles a segment 403 between adjacent change points 402 as one unit. The control portion 51 identifies the global coordinate data corresponding to the pixels at the start point and the end point of each segment 403 as data on the defect. The control portion 51 calculates the distance between the start point and the end point of each segment 403 as the defect length data of the segment 403. Further, the control portion 51 calculates the defect width data of each segment 403. As shown in FIG. 28C, in one example, the control portion 51 highlights different segments 403 in different manners. In one example, the control portion 51 highlights each set of segments 403 having the same width in a manner different from the other sets. In one example, a segment 403 is highlighted by superimposing a line object 403a, which has a different color from the surrounding color, or a different line type.

At step S27, the control portion 51 creates a data file for storing the defect data on the defect, and stores the data file in a folder of the storage portion 54.

Figure 29:
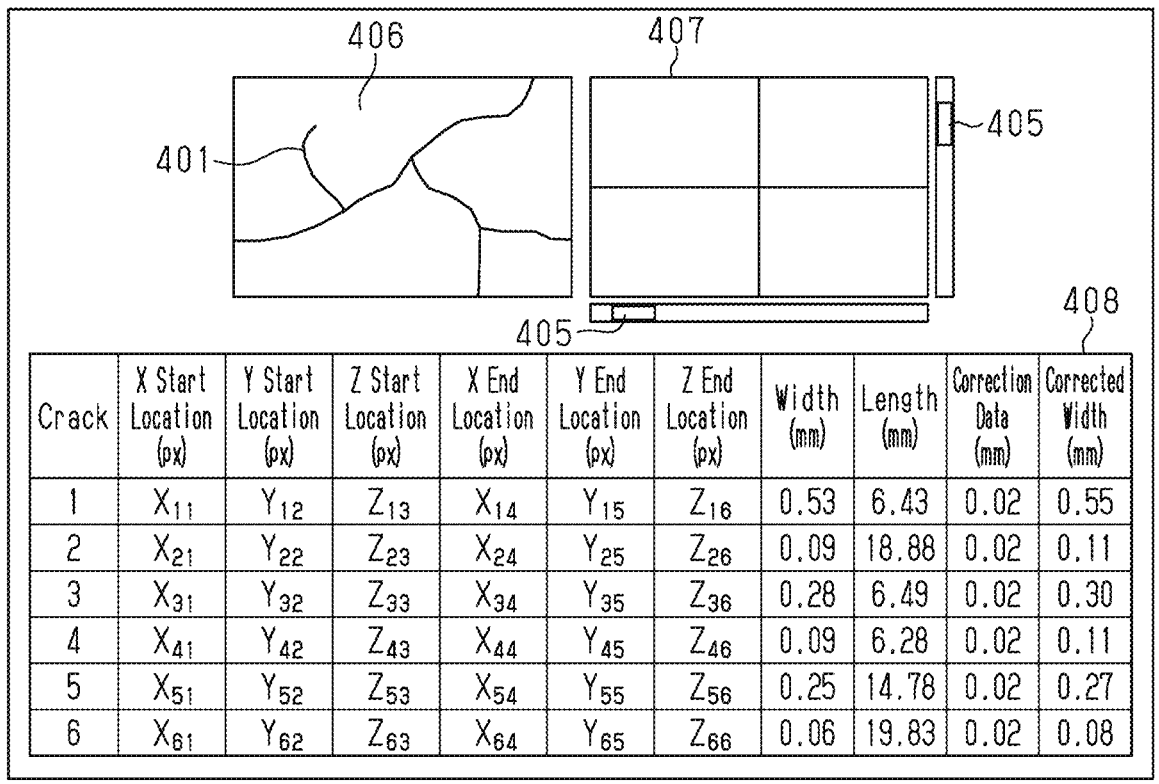
FIG. 29 is a diagram showing an example of a screen displayed on a display portion of a defect detection device.
Figure 30:
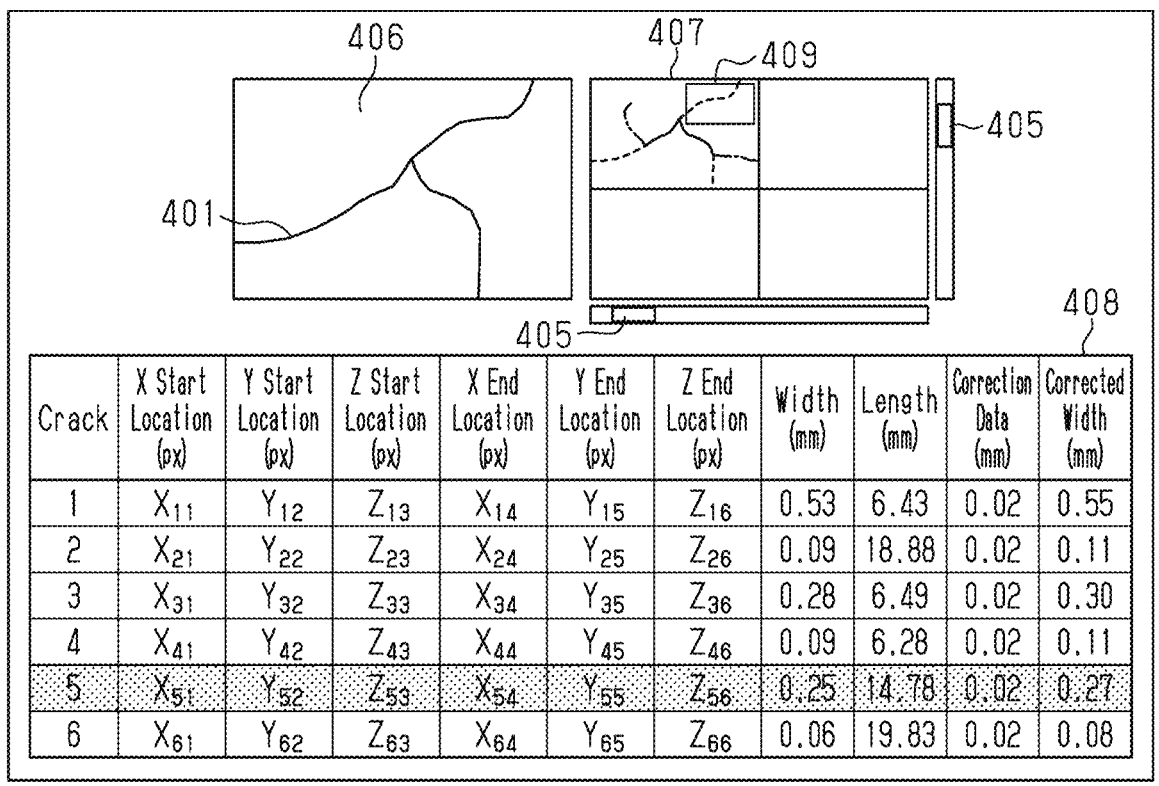
FIG. 30 is a diagram showing a state displayed after the inspection screen shown in FIG. 29.

FIGS. 29 and 30 show examples of an inspection screen displayed on the display portion 52 of the controller 50. As shown in FIG. 29, the inspection screen of the display portion 52 includes an external appearance image display object 406, a stitched image display object 407, and a list display object 408.

The external appearance image display object 406 displays an external appearance image based on the piece of external appearance image data captured by the survey instrument 1 most recently. The external appearance image display object 406 displays external appearance images based on external appearance image data in the order they are captured.

As shown in FIG. 30, when the next external appearance image data to be displayed in the external appearance image display object 406 is input to the controller 50, the external appearance image that has been displayed in the external appearance image display object 406 is moved to the stitched image display object 407. In one example, the stitched image display object 407 sequentially displays adjacent external appearance images in the order they are captured. In one example, the stitched image display object 407 displays vertical and lateral scroll bars 405. When a large number of external appearance images based on external appearance image data are displayed, the control portion 51 scrolls the stitched image display object 407 in the vertical and lateral directions in response to an operation on the scroll bar 405 using the operation portion 36. This allows the user to view the desired external appearance image. In one example, the control portion 51 automatically scrolls so that the stitched image display object 407 displays the newly added external appearance image. In one example, the control portion 51 displays in the stitched image display object 407 a progress status indicating how many images have been displayed among the total number of images.

In one example, when stitching is not performed on first external appearance image data and second external appearance image data, which are successively captured and generated by the survey instrument, the external appearance image display object 406 displays a first external appearance image that is based on the orthorectified first external appearance image data. When stitching is performed on the first external appearance image data and the second external appearance image data, the control portion 51 displays in the stitched image display object 407 the stitched external appearance images based on the stitched external appearance image data.

In one example, when stitching is not performed on first external appearance image data and second external appearance image data, which are successively captured and generated by the survey instrument, the external appearance image display object 406 displays a first external appearance image that is based on the orthorectified first external appearance image data. In addition, the list display object 408 displays first defect information that is based on first defect data relating to the first external appearance image data. When stitching is performed on the first external appearance image data and the second external appearance image data, the control portion 51 displays in the stitched image display object 407 the stitched external appearance images based on the stitched external appearance image data. In addition, the control portion 51 displays in the list display object 408 the first defect information, which is based on the first defect data relating to the first external appearance image data, and second defect information that is based on second defect data relating to the second external appearance image data.

In one example, when a piece of external appearance image data is moved to the stitched image display object 407, defect detection and orthorectification have already been performed on this external appearance image data piece. A defect 401 and segments 403 may be highlighted when they are displayed in the external appearance image display object 406 or when they are displayed in the stitched image display object 407.

The list display object 408 assigns a number, which serves as identification data, to each segment 403 of the detected defect 401. The list display object 408 displays the X coordinate data of the start point coordinate data, the Y coordinate data of the start point coordinate data, the Z coordinate data of the start point coordinate data, the X coordinate data of the end point coordinate data, the Y coordinate data of the end point coordinate data, and the Z coordinate data of the end point coordinate data, which are defect data. Further, the list display object 408 displays the defect width data and the defect length data of each segment 403 of the detected defect 401.

In the external appearance image display object 406 and the stitched image display object 407, when one segment 403 is selected using the operation portion 53, the control portion 51 highlights the selected segment 403 by enclosing the segment 403 with a selection frame 409, which may be quadrangular. In addition, the control portion 51 highlights the data on the selected segment 403 in the list display object 408 by shading the data, for example. When one or more segments 403 are selected using the operation portion 53 in the list display object 408, the control portion 51 encloses the selected segments 403 with a quadrangular selection frame 409. In one example, the selection frame 409 may be circular or triangular. In one example, the shape of the selection frame 409 is changed according to the length and the shape of the segment 403. In one example, the control portion 51 encloses connecting segments 403 of the same width with a selection frame 409. In one example, when a plurality of connecting segments 403 is selected, the control portion 51 highlights the data on the selected segments 403 by shading the data, for example. In one example, the control portion 51 automatically detects, as defect data, the continuity of the defect 401 based on the start point coordinate data and the end point coordinate data of the segments 403. In one example, when the segment 403 of the start point and the segment 403 of the end point are selected, the connecting segments 403 between the start point of the first segment 403 and the end point of the last segment 403 are detected and selected.

[Orthorectification (Step S17)]

Figure 31A:
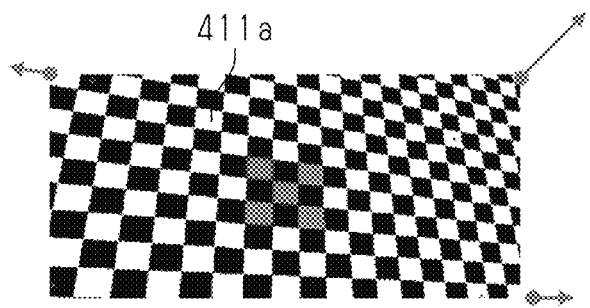
FIG. 31A is a diagram showing a state before orthorectification.
Figure 31B:
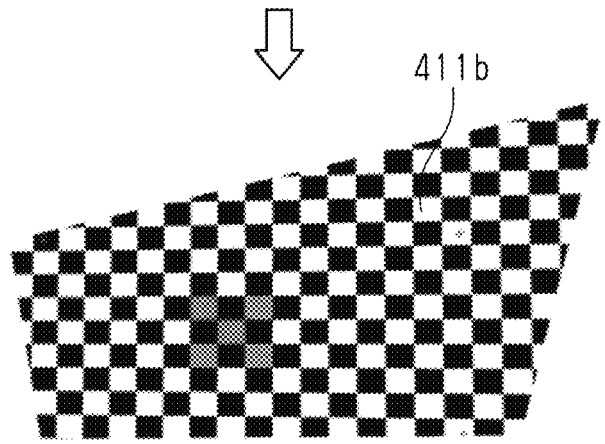
FIG. 31B is a diagram showing a state after orthorectification.

FIGS. 31A and 31B are diagrams showing orthorectification. FIG. 31A shows a state before orthorectification, and FIG. 31B shows a state after orthorectification (orthographic projection correction).

As shown in FIG. 31A, when the measurement plane 200 does not directly face the survey instrument 1, an external appearance image 411a based on external appearance image data is distorted. Each pixel of the captured external appearance image data can be specified with global coordinates. The control portion 51 performs orthorectification in which the external appearance image data is projected onto the measurement plane 200 using the global coordinate data of the pixels. In one example, the control portion 51 calculates the global coordinate data of the four corners of the external appearance image data. The control portion 51 performs orthorectification in which the external appearance image data is projected onto the measurement plane 200 based on the global coordinate data of the pixels at the four corners. The orthorectification is performed with consideration given to the inclination data on the inclination of the first photographic element and the first optical system of the first photographic portion 11, which is stored in the storage portion 54. The entire section of the orthorectified external appearance image 411b is the same as in an image captured when the measurement plane 200 directly faces the survey instrument 1. The control portion 51 also performs orthorectification on the detected defect 401.

In one example, orthorectification is performed after detection and measurement of a crack, since orthorectification slightly degrades the external appearance image. The control portion 51 detects a defect from external appearance image data that is not orthorectified. In one example, orthorectification may be performed before width detection and measurement.

[Stitching (Step S18)]

Each of the pixels in orthorectified external appearance image data has global coordinate data.

In one example, when combining external appearance image data pieces adjacent to each other, the control portion 51 combines the data pieces such that the pixels having the same coordinate values in the adjacent external appearance image data pieces are layered over each other.

In one example, instead of combining adjacent external appearance image data pieces, the control portion 51 sets external appearance image data pieces in the coordinate system based on the global coordinate data of each piece of the external appearance image data. In this case, the control portion 51 sets each piece of the external appearance image data using the global coordinate data of a plurality of pixels, such as the global coordinate data at the center of the external appearance image data and the global coordinate data of an arbitrary pixel.

In one example, adjacent external appearance image data pieces have overlapping sections. The overlapping sections have the same global coordinate data. In stitching process, the control portion 51 deletes the overlapping section of one of the external appearance image data pieces, which is specified with the global coordinate data.

Figure 32:
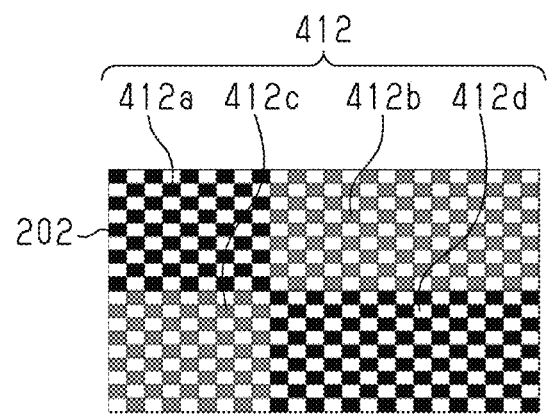
FIG. 32 is a diagram showing a complete external appearance image after stitching.

FIG. 32 is a diagram showing a complete external appearance image 412 obtained by stitching four external appearance images 412a to 412d, each based on external appearance image data. The control portion 51 combines different external appearance image data pieces captured by photographing the measurement area 202 and forms the complete external appearance image 412 based on the complete external appearance image data of the measurement area 202.

In one example, the control portion 51 performs stitching in which first orthorectified external appearance image data is combined with second orthorectified external appearance image data using the first coordinate data corresponding to the first external appearance image data and the second coordinate data corresponding to the second external appearance image data.

[Saving (step S47)]

The storage portion 54 has a folder for storing a plurality of captured external appearance image data pieces. The folder also stores, as the position data associated with each external appearance image data piece, the global coordinate data of the pixels forming the external appearance image data piece. External appearance image data may be saved in JPEG format or bitmap format, and coordinate data may be saved in a text file. Further, external appearance image data and coordinate data may be saved in EXIF format. External appearance image data may be saved in a data format other than JPEG format.

In a folder of the storage portion 54, the control portion 51 may save external appearance image data, which is actually photographed. In a folder of the storage portion 54, the control portion 51 may save data such as orthorectified external appearance image data and complete external appearance image data, which is obtained by stitching orthorectified external appearance image data pieces. In a folder of the storage portion 54, the control portion 51 may save data such as complete external appearance image data obtained by stitching external appearance image data pieces that are not orthorectified, external appearance image data in which a defect is highlighted, and defect data. The control portion 51 also saves in the storage portion 62 of the server unit 60 the same data as the data saved in the storage portion 54.

[Correction Data Generation and Application 1 (Preset Method)]

Measurement areas of structures subjected to defect detection are not only places where an operator can easily operate, but often are places that are difficult for an operator to access, such as high places. As shown in FIG. 1A, when it is impossible to place a correction target 300 on the wall surface 201 that is the measurement plane on which defect detection is actually performed, the correction target 300 is placed on an equivalent wall surface 201a, which is similar to the measurement area on which defect detection is actually performed. In one example, the equivalent wall surface 201a is a wall surface located in a different place away from the actual measurement area. In one example, the equivalent wall surface 201a is a wall surface in an experiment facility or a research facility. In one example, the equivalent wall surface 201a is located in the structure on which defect measurement is performed but is separated from the measurement area.

The control portion 51 of the controller 50 calculates the line widths of line segment objects 302 in a correction target 300 set on the equivalent wall surface 201a, and calculates correction data from the calculated line width data. The correction data is used to correct the defect width data in the defect data of a defect 401. Specifically, the controller 50 detects the line segment objects 302 in reference objects 301 from the target image data of the correction target 300 captured by the survey instrument 1. Then, the controller 50 calculates the first line width data of the reference objects 301, compares the first line width data with the known second line width data, and calculates correction data used to correct defect width data. Further, the control portion 51 applies the correction data to defect width data. The processes of calculating correction data and applying the correction data to defect width data may be performed by the control portion 61 of the server unit 60 or the control portion of the information processing terminal device 70 instead of the control portion 51 of the controller 50. Further, the processes of calculating correction data and applying the correction data to defect width data may be performed by the survey instrument 1.

Figure 33A:
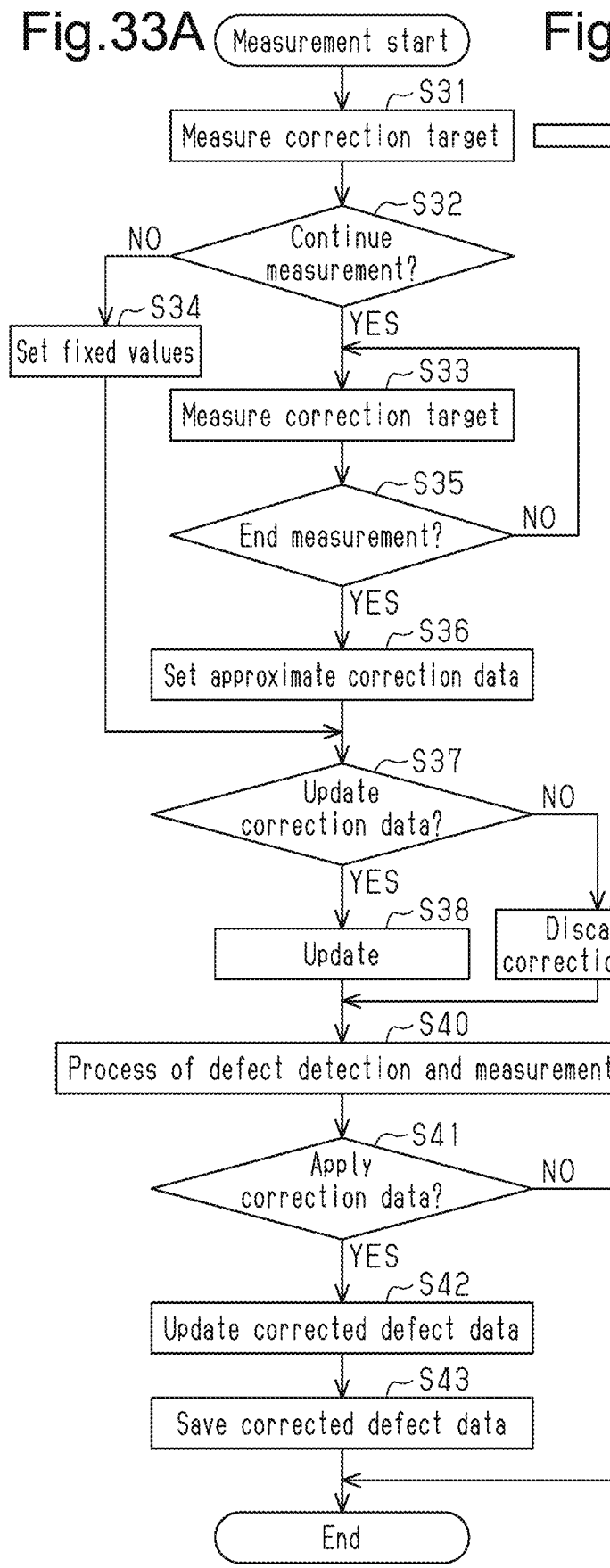
FIGS. 33A and 33B are flowcharts showing a process of correction data generation and application.
Figure 33B:
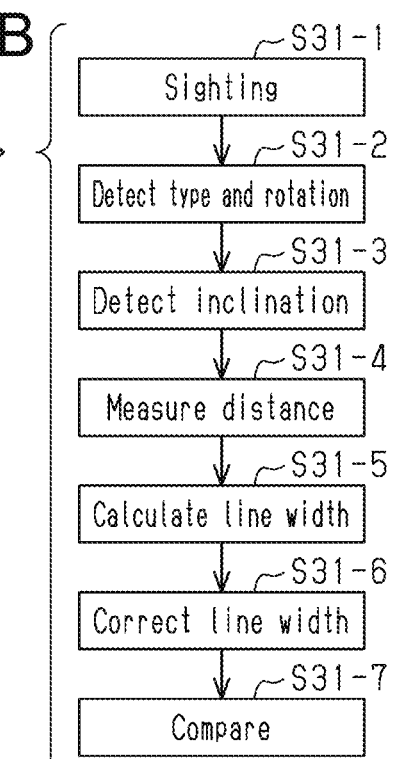

As shown in FIGS. 33A and 33B, at step S31, the control portion 51 starts measurement of the correction target 300. Specifically, the survey instrument 1 is manually or automatically sighted on the correction target 300 at step S31-1. In manual sighting, the cross-line center of the reticle of the survey instrument 1 is aligned with the intersection of the center index object 309. Alternatively, with the correction target 300 located within the angle of view of the first photographic portion 11 or the second photographic portion 12, the survey instrument 1 detects the graphic objects 308, which are arranged at upper, lower, right, and left target positions, from the target image data, and is automatically sighted. In one example, the survey instrument 1 is automatically sighted by detecting the center index object 309 from the target image data. Then, the control portion 51 photographs the correction target 300 and saves, in the storage portion 54, the target image data in association with the survey instrument identification data of the survey instrument 1 by which the correction target 300 is photographed.

At step S31-2, when image data captured by the survey instrument 1 is input as shown in FIG. 8A, the control portion 51 detects the graphic objects 308 and the variant object 308a of the correction target 300 through image processing. The control portion 51 detects the arrangement pattern of the graphic objects 308 and the variant object 308a, accesses a table containing the associations between arrangement patterns and types of survey instrument 1, and identifies the type of the correction target 300. In addition, the control portion 51 detects any rotation of the correction target 300 on the equivalent wall surface 201a, which includes the first surface of the correction target 300 directly facing the survey instrument 1 (in a plane perpendicular to the collimation axis O3 of the survey instrument 1). By detecting rotation of the correction target 300 on the equivalent wall surface 201a including the first surface, the control portion 51 can identify the long-distance reference objects 301b, which are located in the first to fourth regions 304a to 304d, and the short-distance reference objects 301a, which are located in the fifth to eighth regions 304e to 304h. That is, the control portion 51 identifies the dimensions of line widths defined for the long-distance reference object 301b and the short-distance reference object 301a in each region. At step S31-3, the control portion 51 detects the inclination detection object 306, and detects any inclination of the imaginary vertical straight line objects 307a and the imaginary lateral straight line object 307b. Any inclination of the correction target with respect to the survey instrument 1 is thus detected. At step S31-4, the control portion 51 measures the distance between the survey instrument 1 and the correction target 300. In a first method, the distance between the survey instrument 1 and the correction target 300 is measured by the distance measuring portion 13 of the survey instrument 1. In a second method, this distance is calculated based on the distance (e.g., the number of pixels) between a graphic object 308 and the variant object 308a that are adjacent to each other.

Then, at step S31-5, the control portion 51 detects line segment objects 302, calculates the line widths of the detected line segment objects 302, and generates line width data. The line width data is calculated based on the number of pixels between a first side edge and a second side edge of each line segment object 302 extending in the direction in which the line segment object 302 extends. In one example, the line width data is the distance between a specific point on the first side edge of the line segment object 302 and a specific point on the second side edge that intersects the normal to the first side edge. In one example, the distance between two points is calculated based on the number of pixels. In one example, the distance is calculated based on the global coordinate data of the two points. In one example, the line segment objects 302 forming a reference object 301 include objects having different line widths. The control portion 51 calculates line width data for each of the line segment objects 302 having different line widths.

At step S31-6, the control portion 51 corrects the line width data. Specifically, the control portion 51 corrects the line width data of the line segment objects 302 considering any inclination of the correction target with respect to the survey instrument 1, and generates first line width data. In one example, the control portion 51 corrects the line width data for each of the line segment objects 302 having different line widths, and generates first line width data.

At step S31-7, the control portion 51 reads the second line width data of the line segment objects 302 of the correction target 300 set in the correction program 51e. The second line width data is known data, and the correction program 51e includes the second line width data of the line segment objects 302 of each correction target 300. The control portion 51 reads the second line width data corresponding to the type of the identified correction target 300. The control portion 51 compares the calculated first line width data with the known second line width data. Then, the control portion 51 calculates the difference between the first line width data and the second line width data and generates correction data. Alternatively, the ratio of the first line width data to the second line width data is calculated to generate correction data.

Figure 34A:
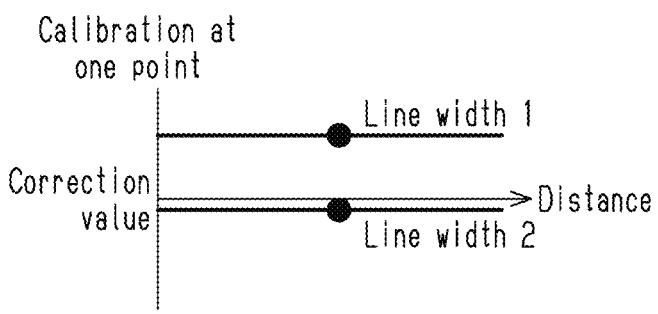
FIG. 34A is a diagram showing a case where correction data relative to distance is fixed values.

As shown in FIG. 34A, one correction target 300 that is placed on the equivalent wall surface 201a may be measured only once in one position (FIG. 1A). Such a measurement generates only the correction data for the line widths of the line segment objects 302 of this correction target 300. This correction data is used for the single distance between the survey instrument 1 and the correction target 300. In this case, the correction data is fixed values. In one example, when one correction target 300 includes line segment objects 302 of two line widths, correction data of fixed values is generated for each of the first line width and the second line width. Then, regardless of the distance between the survey instrument 1 and the measurement area 202, these fixed values are used as the correction data.

Structures may expand and contrast depending largely on the temperature, and the degree of expansion and contraction of a structure in summer may differ significantly from that in winter. In addition, the temperature may vary significantly between morning, day, and night. Even when fixed values are used as the correction data, a table may be prepared for each time frame (such as a season, morning, day, and night) so that correction data may be selected from the table selected according to the time of measurement of the defect data to which the correction data is applied.

Figure 35:
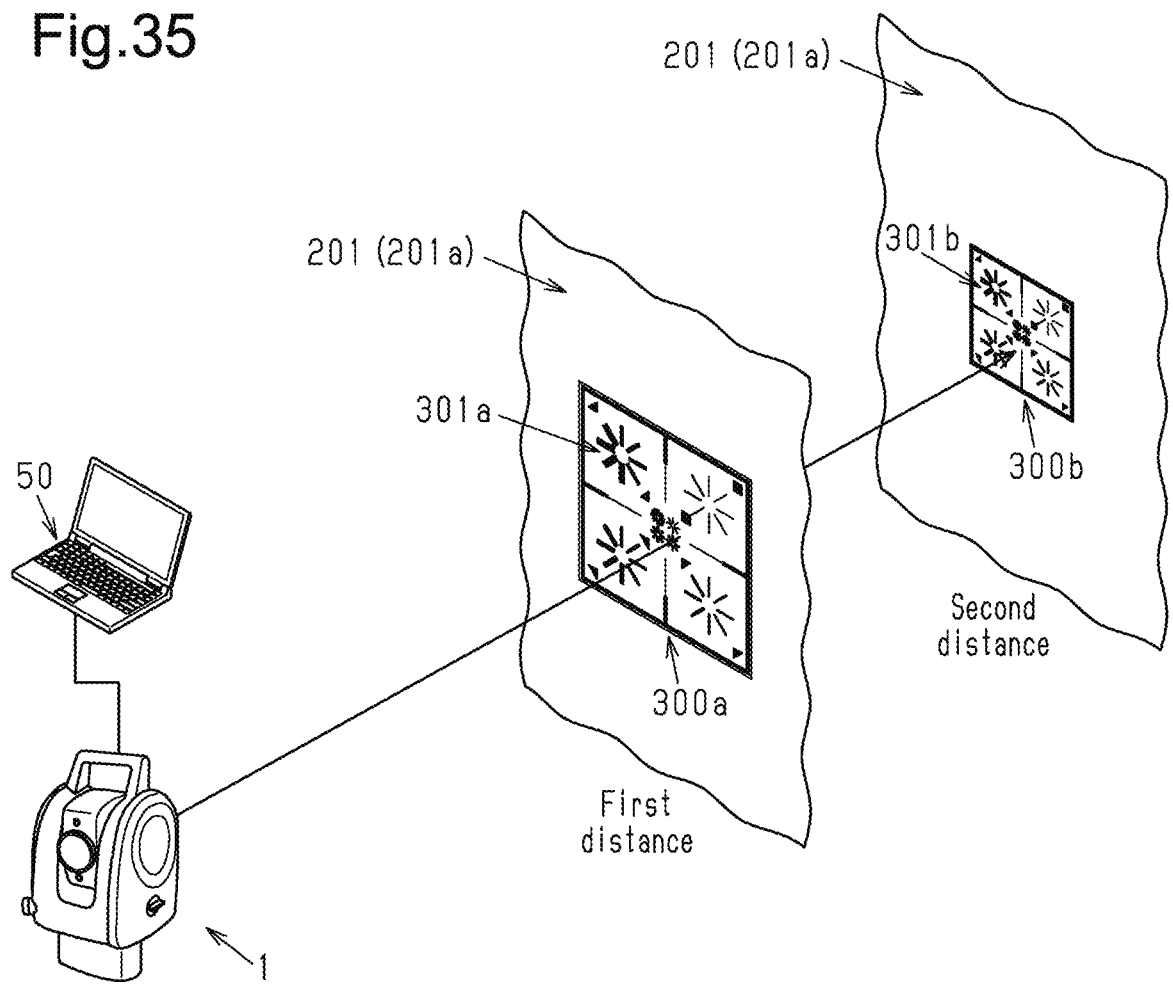
FIG. 35 is a diagram showing a state in which correction targets are set at a first distance and at a second distance.

In another example, as shown in FIG. 35, correction targets 300 may be set in multiple positions at different distances from the survey instrument 1, and measurement may be performed on each of the correction targets 300. These correction target 300 are placed in positions at a short distance and a long distance from the survey instrument 1 to obtain correction data, because different measurement planes may have different measurement environments, which may result in different correction data pieces.

Figure 34B:
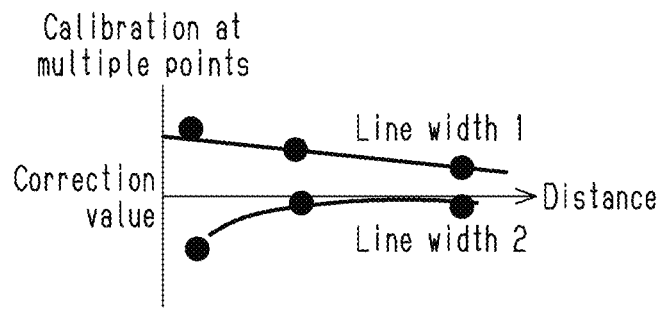
FIG. 34B is a diagram showing a case where correction data corresponding to a distance is calculated using an approximate curve or an approximate straight line.

In FIG. 35, a short-distance correction target 300a is placed at a first distance, and a long-distance correction target 300b is placed at a second distance, which is longer than the first distance. In this case, as shown in FIG. 34B, correction data for the line widths of the line segment objects 302 of the short-distance reference objects 301a is generated from the short-distance correction target 300a, and correction data for the line widths of the line segment objects 302 of the long-distance reference objects 301b is generated from the long-distance correction target 300b. That is, for each line width, correction data is calculated corresponding to each of the distance between the survey instrument 1 and the correction target 300a and the distance between the survey instrument 1 and the correction target 300b. The number of correction data pieces each corresponding to a different distance can be increased by placing correction targets 300 at a greater number of distances. In one example, measurement is performed at intervals of 5 m to 10 m. In this case, for each line width, a correction function can be defined between correction data and distances to the correction targets 300a and 300b from the survey instrument 1. In one example, an approximate line, such as an approximate straight line or an approximate curve, of relations between correction data and distance is set. The distance between the survey instrument 1 and the defect whose defect data is to be corrected with correction data may vary, but the approximate line allows for calculation of the correction data corresponding to the distance between the defect and the survey instrument 1. The calculated correction data is applied to the defect width data. In addition, for a defect located at a distance where no correction target 300 is actually set, correction data corresponding to this distance can be calculated using the correction function.

In the example of FIG. 34B, a plurality of correction data pieces may be prepared for each time frame (such as a season, morning, day, and night) so that correction data may be selected according to the time of measurement of the defect data to which the correction data is applied.

When a correction target 300 is set on an equivalent wall surface 201a, the correction target 300 is set on the equivalent wall surface 201a at the distance corresponding to the distance to the measurement plane on which actual measurement is performed, and correction data is generated corresponding to the distance between the survey instrument 1 and the correction target 300. In one example, the correction target 300 used here may be a correction target including short-distance reference objects 301a and long-distance reference objects 301b (see FIG. 8A). Further, in one example, a short-distance correction target 300a including only short-distance reference objects 301a and a long-distance correction target 300b including only long-distance reference objects 301b may be used. When the correction target 300 is set in only one position, the correction data is fixed values. When correction targets 300 are set in a plurality of positions at different distances from the survey instrument 1, correction data that is calculated using a correction function is used.

In view of the above, at step S32, the control portion 51 determines whether to continue the measurement on a correction target 300. When continuing the measurement, the control portion 51 proceeds to step S33 and repeats measurement of a correction target 300 in the same manner as step S31. That is, a correction target 300 in a different position is measured in the process of steps S31-1 to S31-7. When ending the measurement after one position, the control portion 51 proceeds to step S34 and sets fixed values as correction data.

At step S35, the control portion 51 determines whether to end the measurement of correction targets 300. When ending the measurement, the process proceeds to step S36. If not, step S33 is repeated. At step S36, the control portion 51 uses the approximate line shown in FIG. 34B to set the correction data corresponding to the distance between the survey instrument 1 and the correction target 300. Then, at step S37, when the operator performs an operation for updating the correction data, the control portion 51 updates the correction data at step S38 and proceeds to step S40. When an update operation is not performed, the control portion 51 discards the correction data at step S39 and then proceeds to step S40.

Then, at step S40, the process of defect detection and measurement shown FIG. 27, the orthorectification shown in FIG. 31, and the stitching shown in FIG. 32 are performed. When detecting an operation for applying correction data at step S41, the control portion 51 applies the correction data to the defect width data in the defect data at step S42. Specifically, in one example, the control portion 51 calculates the corrected defect width data by adding the correction data to the defect width data before correction. In one example, the control portion 51 calculates the corrected defect width data by multiplying the defect width data before correction by the correction data (the ratio of the first line width data to the second line width data). Before applying the correction data to the defect width data, the control portion 51 determines whether the survey instrument identification data of the survey instrument 1 associated with the defect data is identical with the survey instrument identification data of the survey instrument 1 associated with the correction data to be applied. When they are identical, the control portion 51 applies the correction data to the defect width data. Different survey instruments 1 may have slight variation in the photographic portions, which affects the values of correction data and defect data. As such, the control portion 51 applies the correction data to the defect width data when the same survey instrument 1 is used to capture the external appearance image data and the target image data. This allows the operator to accurately obtain the defect width data before correction and the defect width data after correction.

Then, as shown in FIGS. 29 and 30, the control portion 51 displays in the list display object 408 the correction data and the corrected defect width data as defect information, in addition to the defect width data of the defect. This allows the operator to check the correction data and the corrected defect width data. Then, when a saving operation is performed, at step S43, the control portion 51 saves the correction data and the corrected defect width data in the storage portion 54 and the storage portion 62 of the server unit 60. In one example, the control portion 51 saves the defect width data before correction and the defect width data after correction such that they are distinguished from each other.

The list display object 408 may display the corrected defect width data without the defect width data before correction, and the defect width data may be displayed with an indication showing whether the data is before or after correction.

The correction data generation and application may be performed by the server unit 60, instead of the controller 50. Further, the correction data generation and application may be performed by the information processing terminal device 70 or the survey instrument 1.

The application of correction data to defect width data as described above may be performed after the process of defect detection and measurement. In this case, the control portion 51 of the survey instrument 1, the controller 50, or the information processing terminal device 70 accesses the server unit 60 and perform an editing process to apply correction data to defect width data. In one example, the control portion 61 of the server unit 60 performs an editing process to apply correction data to defect width data. The result of the editing may be downloaded to the survey instrument 1, the controller 50, or the information processing terminal device 70. In one example, the application of correction data to defect width data may be performed by the survey instrument 1, the controller 50, or the information processing terminal device 70 by downloading the defect data including the defect width data from the server unit 60 to the survey instrument 1, the controller 50, or the information processing terminal device 70.

Figure 36:
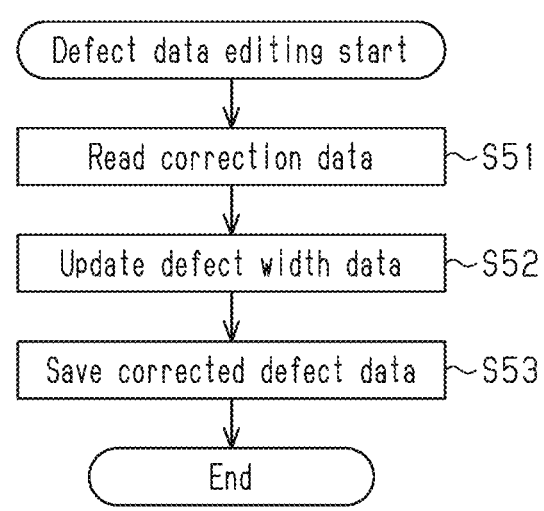
FIG. 36 is a flowchart showing a process of editing defect data.

In the example described below, an editing process of applying correction data to defect width data is performed. As shown in FIG. 36, when the control portion 61 of the server unit 60 receives an operation signal for applying correction data to defect width data from the survey instrument 1, the controller 50, or the information processing terminal device 70, the control portion 61 accesses the storage portion 62 at step S51 and reads the defect data and the correction data included in the operation signal into the memory. When the survey instrument identification data of the survey instrument 1 that has captured the external appearance image data from which the defect data is generated is identical with the survey instrument identification data of the survey instrument 1 that has captured the target image data from which the correction data is generated, the control portion 61 applies the correction data to the defect width data. At step S52, the control portion 61 may calculate the corrected defect width data by adding the correction data to the defect width data before correction, and updates the corrected defect width data. In one example, the control portion 61 calculates the corrected defect width data by multiplying the defect width data before correction by the correction data (the ratio of the first line width data to the second line width data) and updates the corrected defect width data.

Then, in the display portion 52 of the survey instrument 1, the controller 50, or the information processing terminal device 70, the control portion 61 displays the list display object 408 and displays, as defect information, the correction data and the corrected defect width data together with the defect width data of the defect. This allows the survey instrument 1, the controller 50, or the information processing terminal device 70 to be used to check the defect data including the defect width data to which the correction data is applied at any time and from any place. When receiving an operation signal for saving the defect data including the calculated and corrected defect width data from the survey instrument 1, the controller 50, or the information processing terminal device 70, the control portion 61 updates, at step S53, the defect data to which the correction data is applied.

The list display object 408 may display the corrected defect width data without the defect width data before correction, and the defect width data may be displayed with an indication showing whether the data is before or after correction.

[Correction Data Generation and Application 2 (Parallel Method)]

As shown in FIG. 1B, the correction target 300 may be set on a wall surface 201b on which detection of a defect 401 is actually performed. In this case, the correction data generation and application is performed in a sequence after the process of defect detection and measurement shown in FIG. 27, the orthorectification shown in FIG. 31, and the stitching shown in FIG. 32.

Figure 37:
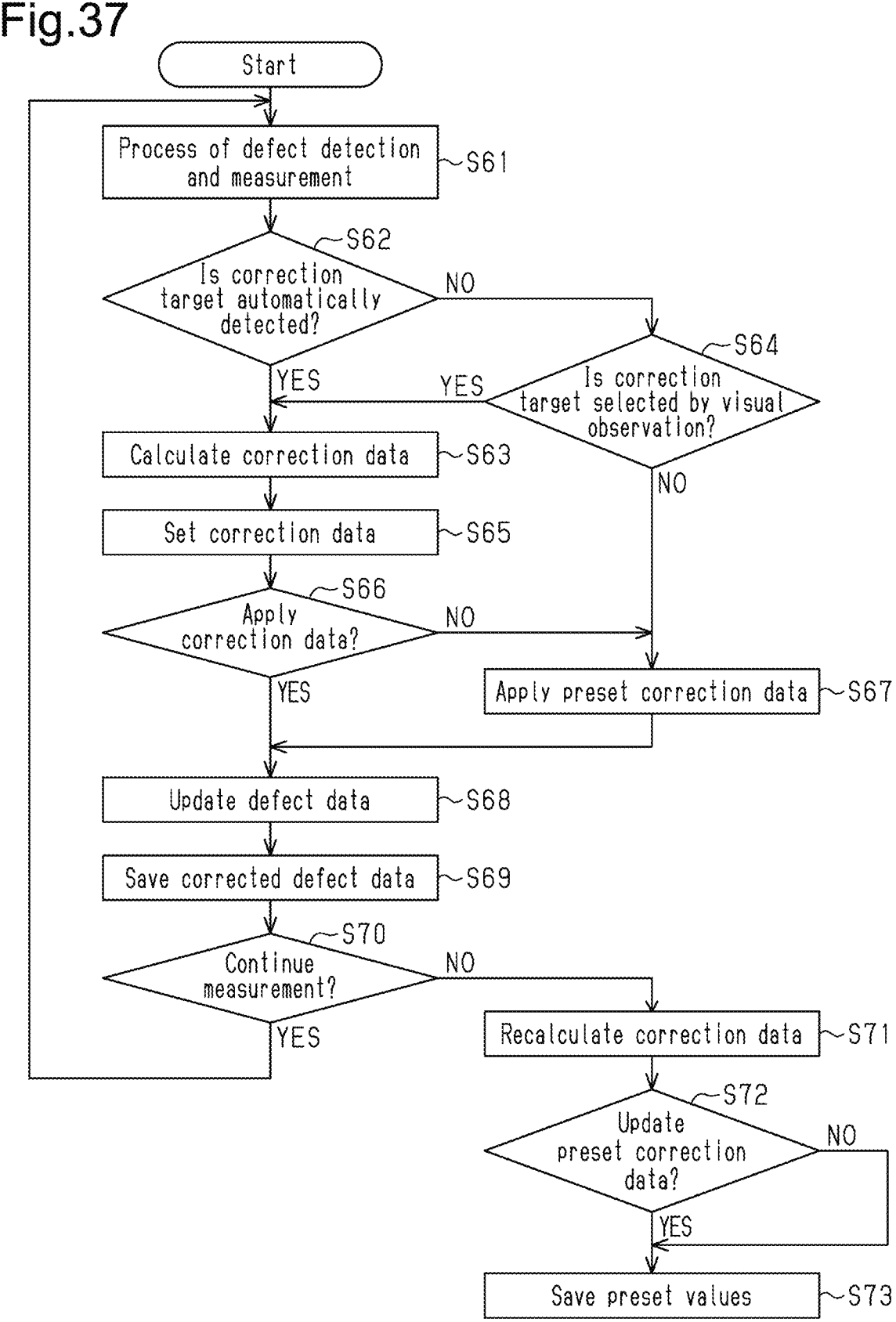
FIG. 37 is a flowchart showing a process of correction data generation and application.

Specifically, as shown in FIG. 37, at step S61, the control portion 51 performs the process of defect detection and measurement shown in FIG. 27, and then performs the orthorectification shown in FIG. 31 and the stitching shown in FIG. 32. Here, a measurement area 202 is set so as to include a correction target 300 on the wall surface 201 (see FIG. 23 for the measurement area 202). The measurement area 202 including a defect and the measurement area 202 including the correction target 300 may be the same area or different areas.

Figure 38A:
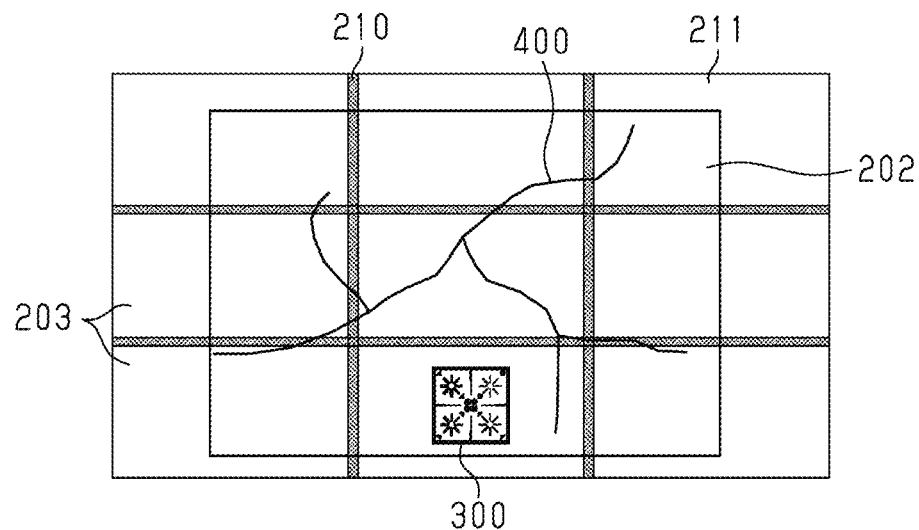
FIG. 38A is a diagram showing a case where a correction target is placed in the measurement area.
Figure 38B:
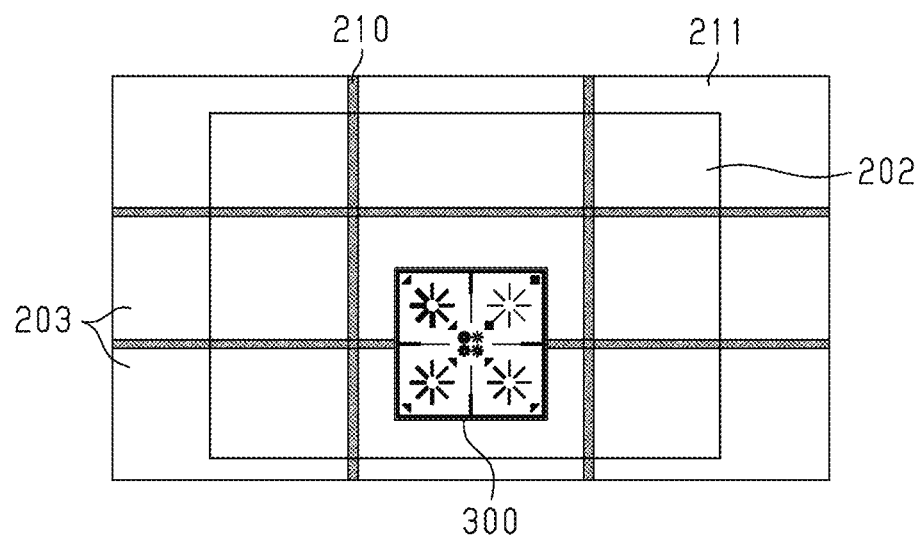
FIG. 38B is a diagram showing a case where a correction target extends over a plurality of image areas.

When the stitching is completed, at step S62, the control portion 51 determines whether the correction target 300 is detected from the stitched external appearance images. Specifically, the control portion 51 detects the correction target 300 by detecting the graphic objects 308, which are arranged at upper, lower, right, and left target positions, from the stitched external appearance images. The detected image is a target image. As shown in FIG. 38A, the correction target 300 may be located in the measurement area 202 and in the image area 203 of one external appearance image. Alternatively, as shown in FIG. 38B, the correction target 300 may extend over the images areas 203 of a plurality of adjacent external appearance images within one measurement area 202. For this reason, the control portion 51 detects the correction target 300 from the stitched external appearance images.

When the correction target 300 is detected, the control portion 51 proceeds to step S63. When the correction target 300 is not detected, the control portion 51 proceeds to step S64. When the correction target 300 is not detected, the survey instrument 1 is adjusted manually by visual observation to bring the correction target 300 within the angle of view of the first photographic portion 11 or the second photographic portion 12. Then, the graphic objects 308 or the center index object 309 is detected to select the correction target 300. When the correction target cannot be selected, the control portion 51 proceeds to step S67.

At step S63, the control portion 51 detects line segment objects 302, calculates the line widths of the detected line segment objects 302, and generates first line width data. The control portion 51 detects line segment objects 302 in the same manner as the defect 401. Then, the control portion 51 reads the second line width data of the line segment objects 302 of the correction target 300 set in the correction program 51e. The second line width data is known data, and the correction program 51e includes the second line width data of the line segment objects 302 of each correction target 300. The control portion 51 compares the calculated first line width data with the known second line width data, calculates the difference between the first line width data and the second line width data, and generates correction data. Alternatively, the ratio of the first line width data to the second line width data is calculated to generate correction data. Then, at step S65, the control portion 51 sets the generated correction data.

When the correction target 300 cannot be selected at step S64, the control portion 51 sets preset correction data at step S67. In one example, the preset correction data is correction data that is set in advance corresponding distances between the survey instrument 1 and the correction target 300 (for example, 10 m, 20 m, and 30 m). The distance between the survey instrument 1 and the correction target 300 may be set to the value of the distance between the survey instrument 1 and the measurement plane that is measured by the survey instrument 1. In one example, as shown in FIG. 34B, the preset correction data is correction data that corresponds to a distance and is calculated using the correction function between distance and correction data.

At step S68, the control portion 51 applies the correction data to the defect width data in the defect data. Specifically, the control portion 51 may calculate the corrected defect width data by adding the correction data to the defect width data before correction, and updates the corrected defect width data. In one example, the control portion 51 calculates the corrected defect width data by multiplying the defect width data before correction by the correction data (the ratio of the first line width data to the second line width data) and updates the corrected defect width data.

Then, as shown in FIGS. 29 and 30, the control portion 51 displays in the list display object 408 the correction data and the corrected defect width data as defect information, in addition to the defect width data of the defect. This allows the operator to check the correction data and the corrected defect width data. Then, when a saving operation is performed, at step S69, the control portion 51 saves the correction data and the corrected defect width data in the storage portion 54 and the storage portion 62 of the server unit 60. In one example, the control portion 51 saves the defect width data before correction and the defect width data after correction such that they are distinguished from each other.

The list display object 408 may display the corrected defect width data without the defect width data before correction, and the defect width data may be displayed with an indication showing whether the data is before or after correction.

When a plurality of measurement areas 202 are set and the measurement continues, the control portion 51 returns to step S61 to continue the process of defect detection and measurement on the next measurement area 202. When not continuing the process of defect detection and measurement, the control portion 51 recalculates correction data at step S71. That is, in one example, as shown in FIG. 34B, an approximate line, such as an approximate straight line or an approximate curve, of relations between correction data and distance is set again. Then, at step S72, the control portion 51 updates the preset correction data according to the reset approximate line. At step S73, the updated preset correction data is saved in the storage portion 54 and the storage portion 62 of the server unit 60. In one example, the control portion 51 automatically saves the preset correction data in the storage portion 54 and the storage portion 62. Alternatively, when a saving operation is performed, the control portion 51 saves the data in the specified storage destination (the storage portion 54 and/or the storage portion 62). In one example, the control portion 51 permits automatic or manual saving of the preset correction data in the storage portion 54 and the storage portion 62 only when the preset correction data is within the allowable range.

In the second method of correction data generation and application (parallel method), the editing process of applying correction data to defect width data, which is shown in FIG. 36, can also be performed by the survey instrument 1, the controller 50, or the information processing terminal device 70.

Figure 39:
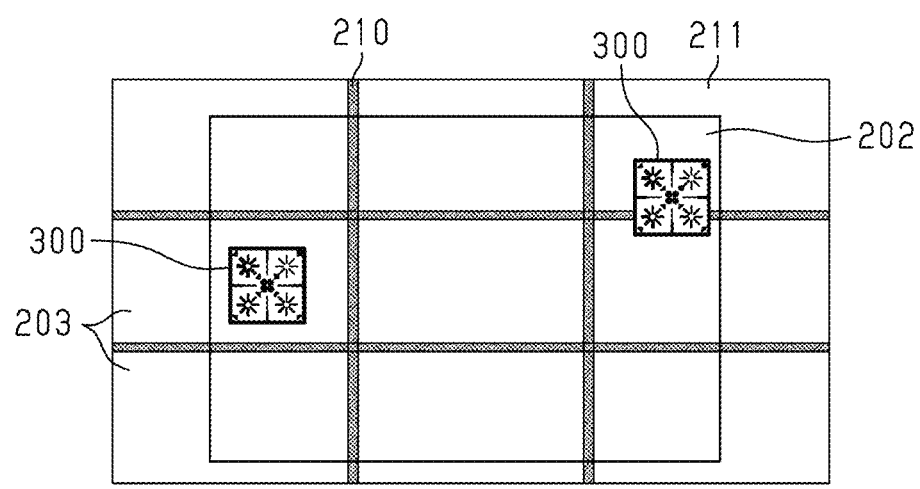
FIG. 39 is a diagram showing a case where a plurality of correction targets is placed in one measurement area.

As shown in FIG. 39, one measurement area 202 may include a plurality of correction targets 300. In one example, the correction targets 300 in one measurement area are preferably located as far as possible from each other. In one example, the correction data calculated from the line segment objects 302 in one of the correction targets 300 may differ from the correction data calculated from the line segment objects 302 in the other correction target 300. In one example, when one of the correction targets 300 is under the sun and the other is under the shade, their correction data pieces may be different from each other. In this case, the defect width data included in the defect data of a defect located between the two correction targets 300 may be set using the values between the two different correction data pieces. That is, values between the two different correction data pieces are set according to the position of the defect.

The above-described the controller 50 has the following advantages.

(1) The calculation system detects reference objects 301 through image processing from target image data generated by photographing a correction target 300 set on the measurement plane 200 with the survey instrument 1, and calculates the first line width data of the reference objects 301. Then, the calculation system compares the first line width data with the known second line width data, which is the actual line widths of the reference objects 301, to calculate correction data. Storing the correction data and defect width data in the server unit 60, for example, allows the controller 50 and the information processing terminal device 70 to access the server unit 60 to apply the correction data to the defect width data and check the corrected defect width data.

(2) The controller 50 or the server unit 60 can correct the defect width data using the correction data in succession to the process of defect detection and measurement.

(3) In one example, even when the wall surface 201 subjected to defect detection is located in a place that is difficult for an operator to access, such as a high place, correction data can be calculated by setting a correction target 300 in a position outside the measurement area 202, that is, on an equivalent wall surface 201a different from the measurement area 202.

(4) When the correction target 300 is placed in the measurement area 202, the correction target 300 is near a defect 401 to be detected. This increases the accuracy of the correction data.

(5) When the correction data generation and application is performed in succession to the process of defect detection and measurement, the use of stitched images ensures that the correction target 300 is detected even if the correction target 300 extends over a plurality of image areas 203.

(6) When the correction target 300 is located in one image area 203, the correction target 300 can be detected without performing stitching.

(7) When the defect 401 and the correction target 300 are in the same external appearance image, that is, in one image area 203, the proximity of the defect 401 and the correction target 300 increases the accuracy of the correction data.

(8) Applying correction data to defect width data increases the accuracy of the defect width data.

(9) Since the line segment objects 302 are line segments having different inclinations, defect width data is corrected using the correction data generated from the line segment objects 302 that extend in the same or similar direction as the direction in which the defect 401 extends.

(10) The type of the correction target 300 can be identified from the pattern of the graphic objects 308 and the variant object 308a.

(11) The rotation of the correction target 300 on the wall surface 201 in the plane including the first surface directly facing the survey instrument 1 (in the plane perpendicular to the collimation axis O3 of the survey instrument 1) about the collimation axis O3 can be detected by identifying the position of the variant object 308a in the graphic objects 308.

(12) Detecting any inclination of the inclination detection object 306 or the imaginary inclination detection object 307 enables detection of inclination of the correction target 300 with respect to the survey instrument 1. The detected inclination is taken into account to accurately calculate the line widths of line segment objects 302.

(13) The sizes of a measurement area 202 and an image area 203 vary depending on the distance to the survey instrument 1. However, since a correction target 300 may include a short-distance reference object 301a and a long-distance reference object 301b, the reference object 301 that corresponds to the size of the measurement area can be used.

(14) By storing the defect data including the defect width data, the correction data, and the corrected defect width data to which the correction data is applied in the server unit 60, the corrected defect data can be viewed from various terminals.

(15) The first survey instrument identification data of the survey instrument 1 that has photographed the correction target 300 is saved in the storage portion 54 of the controller 50 and the storage portion 62 of the server unit 60 in association with the correction data. In addition, the second survey instrument identification data of the survey instrument 1 that has photographed the external appearance of the structure is saved in the storage portion 54 of the controller 50 and the storage portion 62 of the server unit 60 in association with the defect data. Then, when the first survey instrument identification data is identical with the second survey instrument identification data, the correction data is applied to the defect data to correct the defect data. Thus, the application of the correction data to the defect data is not affected by the slight variation in photographic portions.

(16) When correction data is calculated repeatedly using correction targets 300, it is possible to obtain an approximate line, such as an approximate straight line or an approximate curve, so that the defect width data can be corrected with the correction data that corresponds to the distance.

The above-described calculation system may be modified as follows.

The correction target 300 is usable for purposes other than calculation of correction data. In one example, the correction target 300 may be used to evaluate the width of a defect, or as a reference for observing a change over time. In one example, the correction target 300 is placed near a defect 401 for a long period, such as one year. The line widths of the line segment objects 302 of the long-distance reference objects 301b and the short-distance reference objects 301a in the correction target 300 will not change even after a long time. This allows the operator to identify any change in the defect 401 over time by visually comparing the line segments of the line segment objects 302 of the correction target 300 and the defect 401 using the survey instrument 1. For example, the operator can check whether the width of the defect has increased over time. In this manner, the operator can use the correction target 300 as a reference when checking any change in the defect 401 over time. That is, the correction target 300 may be used for other applications as long as the calculation system can generate correction data.

The detection of a defect 401 may be performed by the controller 50 or by the survey instrument 1.

As the coordinates, local coordinate data may be used instead of global coordinate data.

The method of stitching is not limited.

A defect 401 may be a crack or depression in a road or a runway, as well as a crack in a wall surface. Further, a defect 401 may be a crack or other damage caused by deterioration of a steel frame forming a structure, such as a bridge girder. A defect 401 is not limited to a crack or a depression and may be any phenomenon that is detectable from contrast using a photographing device.

DESCRIPTION OF THE REFERENCE NUMERALS

1 . . . Survey Instrument; 2 . . . Leveling Portion; 3 . . . Base Plate; 3 . . . Image Data; 4 . . . Upper Plate; 5 . . . Leveling Screw; 6 . . . Main Body; 7 . . . Photographic Portion; 8 . . . First Objective Lens; 9 . . . Second Objective Lens; 10 . . . Third Objective Lens; 11 . . . First Photographic Portion; 11a . . . Autofocus Portion; 12 . . . Second Photographic Portion; 13 . . . Distance Measuring Portion; 14 . . . Third Photographic Portion; 15 . . . Horizontal-angle Driving Portion; 16 . . . Laser Pointer; 17 . . . Vertical-angle Driving Portion; 18 . . . First Display Portion; 19 . . . Second Display Portion; 20 . . . Communication Portion; 21 . . . Horizontal-angle Operation Portion Encoder; 22 . . . Vertical-angle Operation Portion Encoder; 23 . . . Horizontal-angle Operation Portion; 24 . . . Vertical-angle Operation Portion; 25 . . . Grip Portion; 31 . . . Horizontal-angle Measuring Portion; 32 . . . Vertical-angle Measuring Portion; 33 . . . Image Processing Portion; 34 . . . Temporary Storage Portion; 35 . . . Storage Portion; 36 . . . Operation Portion; 37 . . . Inclination Detection Portion; 40 . . . Control Portion; 50 . . . Controller; 51 . . . Control Portion; 51a . . . CPU; 51b . . . ROM; 51c . . . RAM; 51d . . . Defect Detection Program; 51e . . . Correction Program; 52 . . . Display Portion; 53 . . . Operation Portion; 54 . . . Storage Portion; 55 . . . Communication Portion; 60 . . . Server Unit; 61 . . . Control Portion; 62 . . . Storage Portion; 63 . . . Communication Portion; 70 . . . Information Processing Terminal Device; 200 . . . Measurement Plane; 201 . . . Wall Surface; 201a . . . Equivalent Wall Surface; 201b . . . Wall Surface; 202 . . . Measurement Area; 202a . . . Measurement Area; 203 . . . Image Area; 204 . . . Global Coordinate System; 205 . . . Rectangle; 206a . . . Region; 206b . . . Region; 207 . . . Rectangle; 207a . . . Rectangle; 208 . . . Rectangle; 208a . . . Triangle; 209 . . . Shape; 210 . . . Overlapping Section; 211 . . . Total Image Area; 300 . . . Correction Target; 300a . . . Short-Distance Correction Target; 300b . . . Long-Distance Correction Target; 301 . . . Reference Object; 301a . . . Short-Distance Reference Object; 301b . . . Long-Distance Reference Object; 302 . . . Line Segment Object; 302a . . . First Line Width Section; 302b . . . Second Line Width Section; 302c . . . Third Line Width Section; 302d . . . Fourth Line Width Section;

302e . . . First Line Width Section; 302f . . . Second Line Width Section; 302g . . . Third Line Width Section; 302h . . . Fourth Line Width Section; 302i . . . Fifth Line Width Section; 302j . . . Sixth Line Width Section; 304a . . . First Region; 304b . . . Second Region; 304c . . . Third Region; 304d . . . Fourth Region; 304e . . . Fifth Region; 304f . . . Sixth Region; 304g . . . Seventh Region; 304h . . . Eighth Region; 304i . . . Central Region; 306 . . . Inclination Detection Object; 306a . . . Actual Vertical Straight Line Object; 306b . . . Actual Lateral Straight Line Object; 307 . . . Imaginary Inclination Detection Object; 307a . . . Imaginary Vertical Straight Line Object; 307b . . . Imaginary Lateral Straight Line Object; 308 . . . Graphic Object; 308a . . . Variant Object; 309 . . . Center Index Object; 311 . . . First Line Width Section; 312 . . . Second Line Width Section; 321 . . . Substrate; 322 . . . Object Layer; 323 . . . Magnet Sheet; 401 . . . Defect; 401a . . . Line Object; 402 . . . Change Point; 403 . . . Segment; 403a . . . Line Object; 405 . . . Scroll Bar; 406 . . . External Appearance Image Display Object; 407 . . . Stitched Image Display Object; 408 . . . List Display Object; 409 . . . Selection Frame; 411a . . . External Appearance Image; 411b . . . External Appearance Image; 412 . . . Complete External Appearance Image; 412a-412d . . . External Appearance Image

The invention claimed is:

1. A calculation system comprising:
a first calculation portion configured to detect, through image processing, a reference object, which has a known size, from target image data, which is generated by photographing a target including the reference object using a survey instrument, to calculate first size data on dimensions of the reference object;
a second calculation portion configured to detect, through image processing, a defect from external appearance image data, which is generated by photographing an external appearance of a structure using the survey instrument, to calculate defect data on dimensions of the defect;
a correction data calculation portion configured to compare the first size data with second size data on actual dimensions of the reference object to calculate correction data, which is used to correct the defect data; and
a correction portion configured to apply the correction data to the defect data to correct the defect data.

2. The calculation system according to claim 1, wherein the target is located outside a measurement area that is photographed by the survey instrument.

3. The calculation system according to claim 1, wherein the survey instrument photographs a measurement area by successively photographing the measurement area,
the target is located in the measurement area, and
the target extends over image areas of external appearance images that are adjacent to each other or is located in an image area of one external appearance image.

4. The calculation system according to claim 1, wherein the defect and the target are located in a measurement area that is photographed by the survey instrument.

5. The calculation system according to claim 1, wherein the reference object includes a line segment object,
the first size data is first line width data on a line width of the line segment object detected by the first calculation portion,
the second size data is second line width data on an actual line width of the line segment object, and
the line segment object is one of a plurality of line segments having different inclinations.

6. The calculation system according to claim 1, wherein the target includes an identification object that indicates a type of the target, and
the correction data calculation portion is configured to compare the first size data with the second size data of the reference object of a target of the type indicated by the identification object to calculate the correction data.

7. The calculation system according to claim 6, wherein the target includes a plurality of graphic objects, and
the graphic objects form the identification object.

8. The calculation system according to claim 1, wherein the target includes a plurality of graphic objects and a variant object that is different from the graphic objects.

9. The calculation system according to claim 1, wherein the target includes an inclination detection object, and
the first calculation portion is configured to detect an inclination of the inclination detection object and calculate the first size data according to the inclination.

10. The calculation system according to claim 1, wherein the reference object is one of a plurality of reference objects, and
the target includes:
a region including one of the reference objects that is used for a short distance and detected by the first calculation portion when the target is at a first distance from the survey instrument; and
a region including one of the reference objects that is used for a long distance and detected by the first calculation portion when the target is at a second distance from the survey instrument, the second distance being longer than the first distance.

11. The calculation system according to claim 1, further comprising a storage portion configured to store the first size data, the defect data, and the correction data via a network.

12. The calculation system according to claim 11, wherein the storage portion is configured to store the first size data and the correction data in association with first survey instrument identification data of the survey instrument by which the target image data has been captured and generated,
the storage portion is configured to store the defect data in association with second survey instrument identification data of the survey instrument by which the external appearance image data has been captured and generated, and
the correction portion is configured to apply the correction data to the defect data to correct the defect data when the first survey instrument identification data is identical with the second survey instrument identification data.

13. The calculation system according to claim 12, wherein the storage portion is configured to store defect data corrected by the correction portion.

14. The calculation system according to claim 1, wherein the correction data is one of a plurality of correction data pieces each corresponding to a different distance to the target from the survey instrument,
the correction portion is configured to calculate, based on the correction data pieces, a correction function between the correction data and distances to the target from the survey instrument, and
the correction portion is configured to calculate, using the correction function, the correction data corresponding to an actual distance to the target from the survey instrument to correct the defect data.

15. The calculation system according to claim 1, further comprising the survey instrument, wherein the survey instrument includes:

a survey portion configured to survey the structure;

a photographic portion configured to photograph the structure;

a horizontal-angle driving portion configured to rotate the survey portion and the photographic portion about a vertical axis of the survey instrument;

a vertical-angle driving portion configured to rotate the survey portion and the photographic portion about a horizontal axis of the survey instrument;

an angle detection portion configured to detect an angle in a sighting direction with respect to a reference direction; and a control portion configured to control the horizontal-angle driving portion and the vertical-angle driving portion and control the photographic portion so as to photograph the structure and generate the external appearance image data.

16. A calculation method comprising:

preparing a target including a reference object of a known size;

detecting, through image processing, the reference object from target image data, which is generated by photographing the target using a survey instrument, to calculate first size data on dimensions of the reference object;

detecting, through image processing, a defect from external appearance image data, which is generated by photographing an external appearance of a structure using the survey instrument, to calculate defect data on dimensions of the defect;

comparing the first size data with second size data on actual dimensions of the reference object to calculate correction data, which is used to correct the defect data; and applying the correction data to the defect data to correct the defect data.

17. A non-transitory computer-readable storage media comprising a program that, when executed by a computer, causes the computer to execute a method comprising:

a step of detecting, through image processing, a reference object, which has a known size, 5 from target image data, which is generated by photographing a target including the reference object using a survey instrument, to calculate first size data on dimensions of the reference object;

a step of detecting, through image processing, a defect from external appearance image data, which is generated by photographing an external appearance of a structure using the survey 10 instrument, to calculate defect data on dimensions of the defect; and a step of comparing the first size data with second size data on actual dimensions of the reference object to calculate correction data, which is used to correct the defect data;

a correction portion configured to apply the correlation data to the defect data to correct the defect data.

* * * * *